(12) United States Patent
Cassapakis et al.

(10) Patent No.: US 8,578,361 B2
(45) Date of Patent: Nov. 5, 2013

(54) UPDATING AN ELECTRONIC DEVICE WITH UPDATE AGENT CODE

(75) Inventors: Chris Cassapakis, Laguna Niguel, CA (US); Bindu Rama Rao, Laguna Niguel, CA (US)

(73) Assignee: Palm, Inc., Sunnyvale, CA (US)

( * ) Notice: Subject to any disclaimer, the term of this patent is extended or adjusted under 35 U.S.C. 154(b) by 91 days.

(21) Appl. No.: 13/035,987

(22) Filed: Feb. 27, 2011

(65) Prior Publication Data

US 2011/0173598 A1 Jul. 14, 2011

Related U.S. Application Data

(62) Division of application No. 11/111,276, filed on Apr. 21, 2005, now Pat. No. 7,904,895.

(60) Provisional application No. 60/564,503, filed on Apr. 21, 2004.

(51) Int. Cl.
*G06F 9/44* (2006.01)

(52) U.S. Cl.
USPC ............ 717/168; 717/169; 717/170; 717/171

(58) Field of Classification Search
None
See application file for complete search history.

(56) References Cited

U.S. PATENT DOCUMENTS

| | | |
|---|---|---|
| 4,337,376 A | 6/1982 | Gruenberg |
| 4,344,091 A | 8/1982 | Gardner et al. |
| 4,429,387 A | 1/1984 | Kaminski |
| 4,493,083 A | 1/1985 | Kinoshita |
| 4,645,916 A | 2/1987 | Raisleger |
| 4,783,841 A | 11/1988 | Crayson |
| 4,807,182 A | 2/1989 | Queen |
| 4,809,170 A | 2/1989 | Leblang et al. |
| 5,084,816 A | 1/1992 | Boese et al. |
| 5,155,847 A | 10/1992 | Kirouac et al. |
| 5,204,960 A | 4/1993 | Smith et al. |
| 5,261,055 A | 11/1993 | Moran et al. |
| 5,274,823 A | 12/1993 | Brenner et al. |
| 5,325,531 A | 6/1994 | McKeeman et al. |

(Continued)

FOREIGN PATENT DOCUMENTS

| | | |
|---|---|---|
| CA | 2339923 | 3/2000 |
| CA | 2414281 | 5/2002 |

(Continued)

OTHER PUBLICATIONS

"Focus on OpenView A guide to Hewlett-Packard's Network and Systems Management Platform", Nathan J. Muller, pp. 1-291, CBM Books, published 1995.

(Continued)

*Primary Examiner* — Insun Kang

(57) ABSTRACT

Updating an electronic device using first update agent code resident in the non-volatile memory is disclosed. The electronic device comprises non-volatile memory containing at least one of: firmware and software. An example method includes determining whether the first update agent code is a current version. The method also includes replacing the first update agent code with an updated version of the first update agent code from a removable memory card operatively coupled to the electronic device. The method also includes updating at least one: firmware and software in the electronic device using the updated version of the first update agent code, and first update information associated with the at least one of: firmware and the software.

20 Claims, 4 Drawing Sheets

(56) References Cited

U.S. PATENT DOCUMENTS

| | | |
|---|---|---|
| 5,333,320 A | 7/1994 | Seki |
| 5,392,353 A | 2/1995 | Morales |
| 5,394,534 A | 2/1995 | Kulakowski et al. |
| 5,410,703 A | 4/1995 | Nilsson et al. |
| 5,418,837 A | 5/1995 | Johannson et al. |
| 5,420,616 A | 5/1995 | Suemitsu et al. |
| 5,421,006 A | 5/1995 | Jablon et al. |
| 5,442,771 A | 8/1995 | Filepp et al. |
| 5,444,765 A | 8/1995 | Marui et al. |
| 5,450,589 A | 9/1995 | Maebayashi et al. |
| 5,455,576 A | 10/1995 | Clark, II et al. |
| 5,463,766 A | 10/1995 | Schieve et al. |
| 5,471,592 A | 11/1995 | Gove et al. |
| 5,479,637 A | 12/1995 | Lisimaque et al. |
| 5,479,654 A | 12/1995 | Squibb |
| 5,481,713 A | 1/1996 | Wetmore et al. |
| 5,491,807 A | 2/1996 | Freeman et al. |
| 5,491,821 A | 2/1996 | Kilis |
| 5,535,357 A | 7/1996 | Moran et al. |
| 5,537,483 A | 7/1996 | Stapleton et al. |
| 5,563,931 A | 10/1996 | Bishop et al. |
| 5,579,522 A | 11/1996 | Christeson et al. |
| 5,586,304 A | 12/1996 | Stupek, Jr. et al. |
| 5,586,328 A | 12/1996 | Caron et al. |
| 5,590,277 A | 12/1996 | Fuchs et al. |
| 5,594,903 A | 1/1997 | Bunnell et al. |
| 5,596,738 A | 1/1997 | Pope |
| 5,598,531 A | 1/1997 | Hill |
| 5,598,534 A | 1/1997 | Haas |
| 5,600,844 A | 2/1997 | Shaw et al. |
| 5,606,693 A | 2/1997 | Nilsen et al. |
| 5,608,910 A | 3/1997 | Shimakura |
| 5,623,604 A | 4/1997 | Russell et al. |
| 5,628,016 A | 5/1997 | Kukol |
| 5,638,066 A | 6/1997 | Horiuchi et al. |
| 5,649,112 A | 7/1997 | Yeager et al. |
| 5,649,200 A | 7/1997 | Leblang et al. |
| 5,666,293 A | 9/1997 | Metz et al. |
| 5,666,364 A | 9/1997 | Pierce et al. |
| 5,675,628 A | 10/1997 | Hokkanen |
| 5,677,708 A | 10/1997 | Matthews, III |
| 5,684,944 A | 11/1997 | Lubbers |
| 5,689,712 A | 11/1997 | Heisch |
| 5,694,538 A | 12/1997 | Okazaki et al. |
| 5,699,275 A | 12/1997 | Kennedy, III et al. |
| 5,699,548 A | 12/1997 | Choudhury et al. |
| 5,704,031 A | 12/1997 | Mikami et al. |
| 5,708,709 A | 1/1998 | Rose |
| 5,708,776 A | 1/1998 | Kikinis |
| 5,715,462 A | 2/1998 | Iwamoto et al. |
| 5,717,737 A | 2/1998 | Doviak et al. |
| 5,721,824 A | 2/1998 | Taylor |
| 5,724,526 A | 3/1998 | Kunita |
| 5,727,202 A | 3/1998 | Kucala |
| 5,729,735 A | 3/1998 | Meyering |
| 5,751,231 A | 5/1998 | Iverson |
| 5,752,039 A | 5/1998 | Tanimura |
| 5,752,042 A | 5/1998 | Cole et al. |
| 5,764,658 A | 6/1998 | Sekiguchi et al. |
| 5,765,211 A | 6/1998 | Luck |
| 5,768,382 A | 6/1998 | Schneier et al. |
| 5,774,715 A | 6/1998 | Madany et al. |
| 5,778,440 A | 7/1998 | Yiu et al. |
| 5,781,921 A | 7/1998 | Nichols |
| 5,790,800 A | 8/1998 | Gauvin et al. |
| 5,790,860 A | 8/1998 | Wetmore et al. |
| 5,790,974 A | 8/1998 | Tognazzini |
| 5,794,254 A | 8/1998 | McClain |
| 5,802,338 A | 9/1998 | Rechtschaffen et al. |
| 5,802,554 A | 9/1998 | Caceres et al. |
| 5,805,899 A | 9/1998 | Evans et al. |
| 5,809,251 A | 9/1998 | May et al. |
| 5,812,753 A | 9/1998 | Chiariotti |
| 5,812,768 A | 9/1998 | Page et al. |
| 5,815,722 A | 9/1998 | Kalwitz et al. |
| 5,822,578 A | 10/1998 | Frank et al. |
| 5,822,692 A | 10/1998 | Krishan et al. |
| 5,826,012 A | 10/1998 | Lettvin |
| 5,832,000 A | 11/1998 | Lin et al. |
| 5,832,520 A | 11/1998 | Miller |
| 5,835,777 A | 11/1998 | Staelin |
| 5,835,911 A | 11/1998 | Nakagawa et al. |
| 5,838,981 A | 11/1998 | Gotoh |
| 5,845,077 A | 12/1998 | Fawcett |
| 5,848,064 A | 12/1998 | Cowan |
| 5,864,681 A | 1/1999 | Proctor et al. |
| 5,875,404 A | 2/1999 | Messiet |
| 5,878,124 A | 3/1999 | Griesmer et al. |
| 5,878,256 A | 3/1999 | Bealkowski et al. |
| 5,881,292 A | 3/1999 | Sigal et al. |
| 5,887,253 A | 3/1999 | O'Neil et al. |
| 5,896,566 A | 4/1999 | Averbuch et al. |
| 5,901,310 A | 5/1999 | Rahman et al. |
| 5,901,330 A | 5/1999 | Sun et al. |
| 5,903,669 A | 5/1999 | Hirabayashi |
| 5,909,581 A | 6/1999 | Park |
| 5,913,021 A | 6/1999 | Masubuchi |
| 5,913,027 A | 6/1999 | Matsuda et al. |
| 5,919,247 A | 7/1999 | Van Hoff et al. |
| 5,930,504 A | 7/1999 | Gabel |
| 5,931,909 A | 8/1999 | Taylor |
| 5,933,498 A | 8/1999 | Schneck et al. |
| 5,933,604 A | 8/1999 | Inakoshi |
| 5,937,019 A | 8/1999 | Padovani |
| 5,943,406 A | 8/1999 | Leta et al. |
| 5,944,839 A | 8/1999 | Isenberg |
| 5,946,686 A | 8/1999 | Schmuck et al. |
| 5,950,199 A | 9/1999 | Schmuck et al. |
| 5,953,653 A | 9/1999 | Josenhans et al. |
| 5,954,817 A | 9/1999 | Janssen et al. |
| 5,960,189 A | 9/1999 | Stupek, Jr. et al. |
| 5,960,445 A | 9/1999 | Tamori et al. |
| 5,968,182 A | 10/1999 | Chen et al. |
| 5,973,626 A | 10/1999 | Berger et al. |
| 5,974,179 A | 10/1999 | Caklovic |
| 5,974,250 A | 10/1999 | Angelo et al. |
| 5,974,311 A | 10/1999 | Lipsit |
| 5,974,312 A | 10/1999 | Hayes, Jr. et al. |
| 5,974,454 A | 10/1999 | Apfel et al. |
| 5,974,574 A | 10/1999 | Lennie et al. |
| 5,983,289 A | 11/1999 | Ishikawa et al. |
| 5,987,325 A | 11/1999 | Tayloe |
| 5,987,477 A | 11/1999 | Schmuck et al. |
| 5,987,506 A | 11/1999 | Carter et al. |
| 5,999,740 A | 12/1999 | Rowley |
| 5,999,978 A | 12/1999 | Angal et al. |
| 6,006,034 A | 12/1999 | Heath et al. |
| 6,009,274 A | 12/1999 | Fletcher et al. |
| 6,009,497 A | 12/1999 | Wells et al. |
| 6,011,973 A | 1/2000 | Valentine et al. |
| 6,014,561 A | 1/2000 | Molne |
| 6,018,747 A | 1/2000 | Burns et al. |
| 6,021,275 A | 2/2000 | Horwat |
| 6,021,415 A | 2/2000 | Cannon et al. |
| 6,021,428 A | 2/2000 | Miloslavsky |
| 6,029,004 A | 2/2000 | Bortnikov et al. |
| 6,029,065 A | 2/2000 | Shah |
| 6,029,196 A | 2/2000 | Lenz |
| 6,031,830 A | 2/2000 | Cowan |
| 6,032,044 A | 2/2000 | Shannon et al. |
| 6,032,216 A | 2/2000 | Schmuck et al. |
| 6,038,636 A | 3/2000 | Brown, III et al. |
| 6,040,781 A | 3/2000 | Murray |
| 6,041,333 A | 3/2000 | Bretschneider et al. |
| 6,044,270 A | 3/2000 | Raith |
| 6,044,403 A | 3/2000 | Gerszberg |
| 6,047,071 A | 4/2000 | Shah |
| 6,047,242 A | 4/2000 | Benson |
| 6,047,279 A | 4/2000 | Barrack et al. |
| 6,052,531 A | 4/2000 | Waldin et al. |
| 6,052,600 A | 4/2000 | Fette et al. |
| 6,058,435 A | 5/2000 | Sassin et al. |
| 6,064,814 A | 5/2000 | Capriles et al. |
| 6,070,012 A | 5/2000 | Eitner et al. |

(56) References Cited

U.S. PATENT DOCUMENTS

| | | |
|---|---|---|
| 6,070,142 A | 5/2000 | McDonough et al. |
| 6,073,206 A | 6/2000 | Piwonka et al. |
| 6,073,214 A | 6/2000 | Fawcett |
| 6,077,315 A | 6/2000 | Greenbaum et al. |
| 6,080,207 A | 6/2000 | Kroening et al. |
| 6,081,518 A | 6/2000 | Bowman-Amuah |
| 6,081,731 A | 6/2000 | Boltz et al. |
| 6,088,759 A | 7/2000 | Hasbun et al. |
| 6,097,942 A | 8/2000 | Laiho |
| 6,097,966 A | 8/2000 | Hanley |
| 6,104,506 A | 8/2000 | Hirokawa |
| 6,105,063 A | 8/2000 | Hayes, Jr. |
| 6,106,570 A | 8/2000 | Mizuhara |
| 6,112,024 A | 8/2000 | Almond et al. |
| 6,112,197 A | 8/2000 | Chatterjee et al. |
| 6,115,693 A | 9/2000 | McDonough et al. |
| 6,115,737 A | 9/2000 | Ely et al. |
| 6,117,187 A | 9/2000 | Staelin |
| 6,123,737 A | 9/2000 | Sadowsky |
| 6,126,327 A | 10/2000 | Bi et al. |
| 6,128,695 A | 10/2000 | Estakhri et al. |
| 6,128,713 A | 10/2000 | Eisler et al. |
| 6,131,096 A | 10/2000 | Ng et al. |
| 6,134,530 A | 10/2000 | Bunting et al. |
| 6,138,002 A | 10/2000 | Alperovich et al. |
| 6,138,239 A | 10/2000 | Veil |
| 6,138,249 A | 10/2000 | Nolet |
| 6,141,564 A | 10/2000 | Bruner et al. |
| 6,144,849 A | 11/2000 | Nodoushani et al. |
| 6,145,012 A | 11/2000 | Small |
| 6,148,192 A | 11/2000 | Ahvenainen |
| 6,148,441 A | 11/2000 | Woodward |
| 6,151,643 A | 11/2000 | Cheng et al. |
| 6,157,559 A | 12/2000 | Yoo |
| 6,163,274 A | 12/2000 | Lindgren |
| 6,167,567 A | 12/2000 | Chiles et al. |
| 6,178,452 B1 | 1/2001 | Miyamoto |
| 6,189,096 B1 | 2/2001 | Haverty |
| 6,195,546 B1 | 2/2001 | Leung et al. |
| 6,195,946 B1 | 3/2001 | Lott et al. |
| 6,198,946 B1 | 3/2001 | Shin et al. |
| 6,199,203 B1 | 3/2001 | Saboff |
| 6,199,204 B1 | 3/2001 | Donohue |
| 6,202,207 B1 | 3/2001 | Donohue |
| 6,202,208 B1 | 3/2001 | Holiday |
| 6,209,111 B1 | 3/2001 | Kadyk et al. |
| 6,209,127 B1 | 3/2001 | Mori et al. |
| 6,212,281 B1 | 4/2001 | Vanstone |
| 6,212,489 B1 | 4/2001 | Klein et al. |
| 6,212,557 B1 | 4/2001 | Oran |
| 6,212,659 B1 | 4/2001 | Zehavi |
| 6,223,039 B1 | 4/2001 | Holm et al. |
| 6,223,301 B1 | 4/2001 | Santeler et al. |
| 6,223,343 B1 | 4/2001 | Hopwood et al. |
| 6,230,190 B1 | 5/2001 | Edmonds et al. |
| 6,230,319 B1 | 5/2001 | Britt, Jr. et al. |
| 6,233,332 B1 | 5/2001 | Anderson et al. |
| 6,247,168 B1 | 6/2001 | Green |
| 6,249,817 B1 | 6/2001 | Nakabayashi et al. |
| 6,256,497 B1 | 7/2001 | Chambers |
| 6,260,156 B1 | 7/2001 | Garvin et al. |
| 6,262,973 B1 | 7/2001 | Shiraishi et al. |
| 6,263,214 B1 | 7/2001 | Yazaki et al. |
| 6,266,513 B1 | 7/2001 | Briancon |
| 6,266,809 B1 | 7/2001 | Craig et al. |
| 6,266,810 B1 | 7/2001 | Tanaka et al. |
| 6,272,333 B1 | 8/2001 | Smith |
| 6,272,545 B1 | 8/2001 | Flanagan et al. |
| 6,278,449 B1 | 8/2001 | Sugiarto et al. |
| 6,279,153 B1 | 8/2001 | Bi et al. |
| 6,282,709 B1 | 8/2001 | Reha et al. |
| 6,289,509 B1 | 9/2001 | Kryloff |
| 6,292,492 B1 | 9/2001 | Bonomi et al. |
| 6,292,934 B1 | 9/2001 | Davidson et al. |
| 6,301,710 B1 | 10/2001 | Fujiwara |
| 6,308,061 B1 | 10/2001 | Criss et al. |
| 6,311,322 B1 | 10/2001 | Ikeda et al. |
| 6,314,425 B1 | 11/2001 | Serbinis et al. |
| 6,317,872 B1 | 11/2001 | Gee et al. |
| 6,317,880 B1 | 11/2001 | Chamberlain et al. |
| 6,321,263 B1 | 11/2001 | Luzzi et al. |
| 6,321,348 B1 | 11/2001 | Kobata |
| 6,324,402 B1 | 11/2001 | Waugh et al. |
| 6,324,693 B1 | 11/2001 | Brodersen et al. |
| 6,330,715 B1 | 12/2001 | Razzaghe |
| 6,333,980 B1 | 12/2001 | Hollatz et al. |
| 6,334,212 B1 | 12/2001 | Nakajima |
| 6,343,379 B1 | 1/2002 | Ozawa et al. |
| 6,345,288 B1 | 2/2002 | Reed et al. |
| 6,347,331 B1 | 2/2002 | Dutcher et al. |
| 6,349,205 B1 | 2/2002 | Fang et al. |
| 6,353,737 B1 | 3/2002 | Herzog |
| 6,357,021 B1 | 3/2002 | Kitagawa et al. |
| 6,360,362 B1 | 3/2002 | Fichtner et al. |
| 6,360,366 B1 | 3/2002 | Heath et al. |
| 6,363,524 B1 | 3/2002 | Loy |
| 6,366,584 B1 | 4/2002 | Gulliford et al. |
| 6,366,777 B1 | 4/2002 | Uusitalo |
| 6,367,072 B1 | 4/2002 | Justice et al. |
| 6,374,250 B2 | 4/2002 | Ajtai et al. |
| 6,381,456 B1 | 4/2002 | Ko |
| 6,381,740 B1 | 4/2002 | Miller et al. |
| 6,381,742 B2 | 4/2002 | Forbes et al. |
| 6,389,464 B1 | 5/2002 | Krishnamurthy et al. |
| 6,389,592 B1 | 5/2002 | Ayres et al. |
| 6,393,018 B2 | 5/2002 | Miloslavsky |
| 6,393,585 B1 | 5/2002 | Houha et al. |
| 6,397,385 B1 | 5/2002 | Kravitz |
| 6,400,965 B1 | 6/2002 | Phillips et al. |
| 6,405,364 B1 | 6/2002 | Bowman-Amuah |
| 6,408,175 B1 | 6/2002 | Park |
| 6,408,434 B1 | 6/2002 | Fujiwara |
| 6,412,079 B1 | 6/2002 | Edmonds et al. |
| 6,418,311 B1 | 7/2002 | Chmaytelli et al. |
| 6,421,325 B1 | 7/2002 | Kikinis |
| 6,421,776 B1 | 7/2002 | Hillis et al. |
| 6,424,966 B1 | 7/2002 | Meyerzon et al. |
| 6,425,125 B1 | 7/2002 | Fries et al. |
| 6,426,955 B1 | 7/2002 | Gossett Dalton, Jr. et al. |
| 6,434,537 B1 | 8/2002 | Grimes |
| 6,434,695 B1 | 8/2002 | Esfahani et al. |
| 6,438,585 B2 | 8/2002 | Mousseau et al. |
| 6,442,358 B1 | 8/2002 | Regelsberger et al. |
| 6,442,660 B1 | 8/2002 | Henerlau et al. |
| 6,442,754 B1 | 8/2002 | Curtis |
| 6,445,914 B1 | 9/2002 | Findikli et al. |
| 6,446,206 B1 | 9/2002 | Feldbaum |
| 6,449,270 B1 | 9/2002 | Miloslavsky |
| 6,452,602 B1 | 9/2002 | Morein |
| 6,456,732 B1 | 9/2002 | Kimbell et al. |
| 6,456,843 B1 | 9/2002 | Daly |
| 6,457,175 B1 | 9/2002 | Lerche |
| 6,463,300 B1 | 10/2002 | Oshima |
| 6,466,999 B1 | 10/2002 | Sliger et al. |
| 6,467,087 B1 | 10/2002 | Yang |
| 6,470,496 B1 | 10/2002 | Kato et al. |
| 6,477,531 B1 | 11/2002 | Sullivan et al. |
| 6,477,703 B1 | 11/2002 | Smith et al. |
| 6,487,403 B2 | 11/2002 | Carroll |
| 6,487,717 B1 | 11/2002 | Brunemann et al. |
| 6,487,723 B1 | 11/2002 | MacInnis |
| 6,493,871 B1 | 12/2002 | McGuire et al. |
| 6,496,875 B2 | 12/2002 | Cheng et al. |
| 6,496,979 B1 | 12/2002 | Chen et al. |
| 6,502,193 B1 | 12/2002 | Barber |
| 6,504,932 B1 | 1/2003 | Vasnier et al. |
| 6,505,228 B1 | 1/2003 | Schoening et al. |
| 6,512,919 B2 | 1/2003 | Ogasawara |
| 6,526,574 B1 | 2/2003 | Jones |
| 6,529,729 B1 | 3/2003 | Nodoushani et al. |
| 6,530,036 B1 | 3/2003 | Frey, Jr. |
| 6,535,894 B1 | 3/2003 | Schmidt et al. |
| 6,536,038 B1 | 3/2003 | Ewertz et al. |
| 6,542,504 B1 | 4/2003 | Mahler et al. |

(56) References Cited

U.S. PATENT DOCUMENTS

| | | |
|---|---|---|
| 6,542,906 B2 | 4/2003 | Korn |
| 6,546,243 B2 | 4/2003 | Tiedemann, Jr. et al. |
| 6,546,419 B1 | 4/2003 | Humpleman et al. |
| 6,546,492 B1 | 4/2003 | Walker et al. |
| 6,546,552 B1 | 4/2003 | Peleg |
| 6,549,770 B1 | 4/2003 | Marran |
| 6,553,113 B1 | 4/2003 | Dhir et al. |
| 6,553,375 B1 | 4/2003 | Huang et al. |
| 6,553,490 B1 | 4/2003 | Kottapurath et al. |
| 6,556,842 B1 | 4/2003 | Ericsson |
| 6,564,055 B1 | 5/2003 | Hronek et al. |
| 6,564,369 B1 | 5/2003 | Hove et al. |
| 6,564,371 B1 | 5/2003 | Goldman et al. |
| 6,571,244 B1 | 5/2003 | Larson |
| 6,574,657 B1 | 6/2003 | Dickenson |
| 6,577,229 B1 | 6/2003 | Bonneau et al. |
| 6,581,105 B2 | 6/2003 | Miloslavsky et al. |
| 6,587,684 B1 | 7/2003 | Hsu et al. |
| 6,587,685 B2 | 7/2003 | Mittal et al. |
| 6,591,095 B1 | 7/2003 | Palaniswamy et al. |
| 6,591,098 B1 | 7/2003 | Shieh et al. |
| 6,594,723 B1 | 7/2003 | Chapman et al. |
| 6,594,822 B1 | 7/2003 | Schweitz et al. |
| 6,595,856 B1 | 7/2003 | Ginsburg et al. |
| 6,601,153 B1 | 7/2003 | Engelbrecht et al. |
| 6,601,212 B1 | 7/2003 | Guha et al. |
| 6,603,854 B1 | 8/2003 | Judkins et al. |
| 6,603,968 B2 | 8/2003 | Anvekar et al. |
| 6,606,744 B1 | 8/2003 | Mikurak |
| 6,615,038 B1 | 9/2003 | Moles et al. |
| 6,615,240 B1 | 9/2003 | Sullivan et al. |
| 6,615,404 B1 | 9/2003 | Garfunkel et al. |
| 6,615,405 B1 | 9/2003 | Goldman et al. |
| 6,622,017 B1 | 9/2003 | Hoffman |
| 6,625,451 B1 | 9/2003 | La Medica et al. |
| 6,625,641 B1 | 9/2003 | Hare et al. |
| 6,636,958 B2 | 10/2003 | Abboud et al. |
| 6,640,334 B1 | 10/2003 | Rasmussen |
| 6,643,506 B1 | 11/2003 | Criss et al. |
| 6,643,697 B1 | 11/2003 | Eves |
| 6,647,260 B2 | 11/2003 | Dusse et al. |
| 6,647,480 B1 | 11/2003 | Bolan et al. |
| 6,651,249 B2 | 11/2003 | Waldin et al. |
| 6,658,090 B1 | 12/2003 | Harjunen et al. |
| 6,659,345 B2 | 12/2003 | Sukeda et al. |
| 6,665,376 B1 | 12/2003 | Brown |
| 6,665,861 B1 | 12/2003 | Francis et al. |
| 6,668,049 B1 | 12/2003 | Koch et al. |
| 6,668,336 B2 | 12/2003 | Lasser |
| 6,671,265 B1 | 12/2003 | Hwang et al. |
| 6,671,703 B2 | 12/2003 | Thompson et al. |
| 6,671,818 B1 | 12/2003 | Mikurak |
| 6,675,201 B1 | 1/2004 | Parkkinen |
| 6,675,382 B1 | 1/2004 | Foster |
| 6,683,993 B1 | 1/2004 | Mead |
| 6,684,396 B1 | 1/2004 | Brittain et al. |
| 6,687,341 B1 | 2/2004 | Koch et al. |
| 6,687,901 B1 | 2/2004 | Imamatsu |
| 6,690,390 B1 | 2/2004 | Walters et al. |
| 6,690,788 B1 | 2/2004 | Bauer et al. |
| 6,694,314 B1 | 2/2004 | Sullivan et al. |
| 6,694,336 B1 | 2/2004 | Multer et al. |
| 6,697,808 B1 | 2/2004 | Hurwood et al. |
| 6,697,969 B1 | 2/2004 | Merriam |
| 6,698,013 B1 | 2/2004 | Bertero et al. |
| 6,701,521 B1 | 3/2004 | McLlroy et al. |
| 6,704,303 B1 | 3/2004 | Bowman-Amuah |
| 6,704,864 B1 | 3/2004 | Philyaw |
| 6,711,520 B2 | 3/2004 | Arnaout et al. |
| 6,714,642 B2 | 3/2004 | Dhir et al. |
| 6,721,713 B1 | 4/2004 | Guheen et al. |
| 6,721,946 B1 | 4/2004 | Fogarty et al. |
| 6,725,048 B2 | 4/2004 | Mao et al. |
| 6,725,056 B1 | 4/2004 | Moles et al. |
| 6,725,268 B1 | 4/2004 | Jackel et al. |
| 6,725,392 B1 | 4/2004 | Frey et al. |
| 6,728,531 B1 | 4/2004 | Lee et al. |
| 6,728,950 B2 | 4/2004 | Davis et al. |
| 6,730,027 B2 | 5/2004 | Iliff |
| 6,731,932 B1 | 5/2004 | Rune et al. |
| 6,735,434 B2 | 5/2004 | Criss et al. |
| 6,738,803 B1 | 5/2004 | Dodrill et al. |
| 6,741,848 B2 | 5/2004 | Timonen et al. |
| 6,741,934 B2 | 5/2004 | Chen et al. |
| 6,741,980 B1 | 5/2004 | Langseth et al. |
| 6,742,025 B2 | 5/2004 | Jennery et al. |
| 6,748,209 B2 | 6/2004 | Lipsit |
| 6,754,181 B1 | 6/2004 | Elliott et al. |
| 6,754,714 B1 | 6/2004 | Chebrolu |
| 6,754,722 B2 | 6/2004 | Herzi |
| 6,754,723 B2 | 6/2004 | Kato |
| 6,754,894 B1 | 6/2004 | Costello et al. |
| 6,754,895 B1 | 6/2004 | Bartel et al. |
| 6,754,896 B2 | 6/2004 | Mishra et al. |
| 6,757,263 B1 | 6/2004 | Olds |
| 6,757,893 B1 | 6/2004 | Haikin |
| 6,760,730 B1 | 7/2004 | Kataoka |
| 6,760,908 B2 | 7/2004 | Ren |
| 6,763,104 B1 | 7/2004 | Judkins et al. |
| 6,763,403 B2 | 7/2004 | Cheng et al. |
| 6,772,338 B1 | 8/2004 | Hull |
| 6,775,267 B1 | 8/2004 | Kung et al. |
| 6,775,423 B2 | 8/2004 | Kulkarni et al. |
| 6,779,177 B1 | 8/2004 | Bahrs et al. |
| 6,785,834 B2 | 8/2004 | Chefalas et al. |
| 6,789,110 B1 | 9/2004 | Short et al. |
| 6,789,158 B2 | 9/2004 | Takahashi |
| 6,789,215 B1 | 9/2004 | Rupp et al. |
| 6,789,255 B1 | 9/2004 | Pedrizetti et al. |
| 6,791,877 B2 | 9/2004 | Miura et al. |
| 6,798,876 B1 | 9/2004 | Bala |
| 6,799,155 B1 | 9/2004 | Lindemann et al. |
| 6,802,061 B1 | 10/2004 | Parthasarathy et al. |
| 6,807,558 B1 | 10/2004 | Hassett et al. |
| 6,807,574 B1 | 10/2004 | Partovi et al. |
| 6,813,571 B2 | 11/2004 | Lightbody et al. |
| 6,816,719 B1 | 11/2004 | Heinonen et al. |
| 6,820,214 B1 | 11/2004 | Cabrera et al. |
| 6,820,259 B1 | 11/2004 | Kawamata et al. |
| 6,823,432 B2 | 11/2004 | Chen et al. |
| 6,832,373 B2 | 12/2004 | O'Neill |
| 6,836,657 B2 | 12/2004 | Ji et al. |
| 6,836,859 B2 | 12/2004 | Berg et al. |
| 6,839,841 B1 | 1/2005 | Medvinsky et al. |
| 6,842,628 B1 | 1/2005 | Arnold et al. |
| 6,845,370 B2 | 1/2005 | Burkey et al. |
| 6,845,434 B2 | 1/2005 | Lin |
| 6,847,970 B2 | 1/2005 | Keller et al. |
| 6,850,533 B2 | 2/2005 | Gerszberg et al. |
| 6,850,614 B1 | 2/2005 | Collins |
| 6,856,676 B1 | 2/2005 | Pirot et al. |
| 6,865,387 B2 | 3/2005 | Bucknell et al. |
| 6,873,988 B2 | 3/2005 | Herrmann et al. |
| 6,879,685 B1 | 4/2005 | Peterson et al. |
| 6,880,051 B2 | 4/2005 | Timpanaro-Perrotta |
| 6,883,168 B1 | 4/2005 | James et al. |
| 6,885,862 B1 | 4/2005 | Pearson |
| 6,889,054 B2 | 5/2005 | Himmel et al. |
| 6,892,207 B2 | 5/2005 | McKay et al. |
| 6,895,387 B1 | 5/2005 | Roberts et al. |
| 6,904,405 B2 | 6/2005 | Suominen |
| 6,907,478 B2 | 6/2005 | Li et al. |
| 6,912,591 B2 | 6/2005 | Lash |
| 6,912,711 B1 * | 6/2005 | Curtis et al. .................. 717/173 |
| 6,915,265 B1 | 7/2005 | Johnson |
| 6,915,325 B1 | 7/2005 | Lee et al. |
| 6,915,452 B1 | 7/2005 | Froehlich et al. |
| 6,918,112 B2 | 7/2005 | Bourke-Dunphy et al. |
| 6,922,722 B1 | 7/2005 | Mann et al. |
| 6,925,300 B2 | 8/2005 | Horne |
| 6,925,467 B2 | 8/2005 | Gu et al. |
| 6,928,108 B2 | 8/2005 | Nelson et al. |
| 6,928,468 B2 | 8/2005 | Leermakers |
| 6,934,028 B2 | 8/2005 | Ho et al. |

(56) References Cited

U.S. PATENT DOCUMENTS

| | | |
|---|---|---|
| 6,938,076 B2 | 8/2005 | Meyer et al. |
| 6,938,109 B1 | 8/2005 | Sliger et al. |
| 6,941,129 B2 | 9/2005 | Marce et al. |
| 6,941,136 B2 | 9/2005 | Study et al. |
| 6,941,453 B2 | 9/2005 | Rao |
| 6,944,621 B1 | 9/2005 | Collart |
| 6,948,099 B1 | 9/2005 | Tallam |
| 6,948,104 B2 | 9/2005 | Herley et al. |
| 6,950,660 B1 | 9/2005 | Hsu et al. |
| 6,952,823 B2 | 10/2005 | Kryloff et al. |
| 6,956,846 B2 | 10/2005 | Lewis et al. |
| 6,957,041 B2 | 10/2005 | Christensen et al. |
| 6,957,062 B2 | 10/2005 | Castrogiovanni et al. |
| 6,957,066 B1 | 10/2005 | Stammers et al. |
| 6,959,436 B2 | 10/2005 | Peng |
| 6,961,417 B2 | 11/2005 | Koch |
| 6,966,058 B2 | 11/2005 | Earl et al. |
| 6,968,179 B1 | 11/2005 | De Vries |
| 6,968,184 B2 | 11/2005 | Criss et al. |
| 6,968,543 B2 | 11/2005 | Takahara et al. |
| 6,970,181 B1 | 11/2005 | Fadel |
| 6,970,189 B1 | 11/2005 | Bernstein et al. |
| 6,970,917 B1 | 11/2005 | Kushwaha et al. |
| 6,976,058 B1 | 12/2005 | Brown et al. |
| 6,976,251 B2 | 12/2005 | Meyerson |
| 6,978,453 B2 | 12/2005 | Rao et al. |
| 6,979,253 B2 | 12/2005 | Thyssen |
| 6,981,020 B2 | 12/2005 | Miloslavsky et al. |
| 6,983,458 B1 | 1/2006 | Honda |
| 6,986,133 B2 | 1/2006 | O'Brien et al. |
| 6,988,182 B2 | 1/2006 | Teachman et al. |
| 6,990,656 B2 | 1/2006 | Ersek et al. |
| 6,990,659 B1 | 1/2006 | Imai |
| 6,990,660 B2 | 1/2006 | Moshir et al. |
| 6,996,603 B1 | 2/2006 | Srinivasan |
| 6,996,818 B2 | 2/2006 | Jacobi et al. |
| 6,999,976 B2 | 2/2006 | Abdallah et al. |
| 6,999,990 B1 | 2/2006 | Sullivan et al. |
| 7,002,919 B1 | 2/2006 | El-Sayed |
| 7,003,534 B2 | 2/2006 | Peng |
| 7,007,049 B2 | 2/2006 | Peng |
| 7,007,083 B1 | 2/2006 | Chesley |
| 7,010,303 B2 | 3/2006 | Lewis et al. |
| 7,024,557 B1 | 4/2006 | Moles et al. |
| 7,027,586 B2 | 4/2006 | Bushey et al. |
| 7,031,972 B2 | 4/2006 | Ren et al. |
| 7,032,033 B1 | 4/2006 | Ledoux et al. |
| 7,039,594 B1 | 5/2006 | Gersting |
| 7,039,796 B2 | 5/2006 | Ballard |
| 7,047,448 B2 | 5/2006 | Rao et al. |
| 7,050,566 B2 | 5/2006 | Becerra et al. |
| 7,055,098 B2 | 5/2006 | Hull et al. |
| 7,055,148 B2 | 5/2006 | Marsh et al. |
| 7,058,849 B2 | 6/2006 | Erstad |
| 7,058,860 B2 | 6/2006 | Miller et al. |
| 7,058,941 B1 | 6/2006 | Venkatesan et al. |
| 7,058,978 B2 | 6/2006 | Feuerstein et al. |
| 7,061,891 B1 | 6/2006 | Kilfoyle et al. |
| 7,062,031 B2 | 6/2006 | Becerra et al. |
| 7,065,347 B1 | 6/2006 | Vikse et al. |
| 7,069,452 B1 | 6/2006 | Hind et al. |
| 7,069,545 B2 | 6/2006 | Wang et al. |
| 7,069,578 B1 | 6/2006 | Prus et al. |
| 7,073,017 B2 | 7/2006 | Yamamoto |
| 7,073,172 B2 | 7/2006 | Chamberlain |
| 7,076,051 B2 | 7/2006 | Brown et al. |
| 7,080,371 B1 | 7/2006 | Arnaiz et al. |
| 7,080,372 B1 | 7/2006 | Cole |
| 7,082,549 B2 | 7/2006 | Rao et al. |
| 7,086,049 B2 | 8/2006 | Goodman |
| 7,089,036 B2 | 8/2006 | Prise |
| 7,089,259 B1 | 8/2006 | Kouznetsov et al. |
| 7,089,549 B2 | 8/2006 | Venkiteswaran |
| 7,089,550 B2 | 8/2006 | Bakke et al. |
| 7,092,734 B2 | 8/2006 | Herle et al. |
| 7,093,244 B2 | 8/2006 | Lajoie et al. |
| 7,096,311 B2 | 8/2006 | Chiang |
| 7,099,896 B2 | 8/2006 | Fields et al. |
| 7,100,083 B2 | 8/2006 | Little et al. |
| 7,103,172 B2 | 9/2006 | Brown et al. |
| 7,103,779 B2 | 9/2006 | Kiehtreiber et al. |
| 7,106,843 B1 | 9/2006 | Gainsboro et al. |
| 7,107,329 B1 | 9/2006 | Schroder et al. |
| 7,110,525 B1 | 9/2006 | Heller et al. |
| 7,111,201 B2 | 9/2006 | Largman et al. |
| 7,111,292 B2 | 9/2006 | Bonnett et al. |
| 7,117,172 B1 | 10/2006 | Black |
| 7,117,195 B2 | 10/2006 | Chantrain et al. |
| 7,120,909 B1 | 10/2006 | Shibuya |
| 7,127,250 B2 | 10/2006 | Gallagher et al. |
| 7,130,807 B1 | 10/2006 | Mikurak |
| 7,130,896 B2 | 10/2006 | Engel et al. |
| 7,134,050 B2 | 11/2006 | Wenzel |
| 7,136,857 B2 | 11/2006 | Chen et al. |
| 7,137,034 B2 | 11/2006 | Largman et al. |
| 7,143,115 B2 | 11/2006 | Jones et al. |
| 7,143,153 B1 | 11/2006 | Black et al. |
| 7,143,405 B2 | 11/2006 | Liu et al. |
| 7,145,898 B1 | 12/2006 | Elliott |
| 7,146,002 B1 | 12/2006 | Smith et al. |
| 7,146,609 B2 | 12/2006 | Thurston et al. |
| 7,149,508 B2 | 12/2006 | Herle |
| 7,150,015 B2 | 12/2006 | Pace et al. |
| 7,165,109 B2 | 1/2007 | Chiloyan et al. |
| 7,165,173 B1 | 1/2007 | Herle |
| 7,171,660 B2 | 1/2007 | McCaleb et al. |
| 7,178,141 B2 | 2/2007 | Piazza |
| 7,181,731 B2 | 2/2007 | Pace et al. |
| 7,188,214 B1 | 3/2007 | Kasriel et al. |
| 7,194,728 B1 | 3/2007 | Sirota et al. |
| 7,200,390 B1 | 4/2007 | Henager et al. |
| 7,203,723 B2 | 4/2007 | Ogawa |
| 7,206,576 B2 | 4/2007 | Jain et al. |
| 7,210,010 B2 | 4/2007 | Ogle |
| 7,215,961 B2 | 5/2007 | Gallagher et al. |
| 7,216,343 B2 | 5/2007 | Das et al. |
| 7,222,340 B2 | 5/2007 | Willis, II |
| 7,230,951 B2 | 6/2007 | Mizell et al. |
| 7,231,411 B1 | 6/2007 | Lu |
| 7,240,102 B1 | 7/2007 | Kouznetsov et al. |
| 7,240,356 B2 | 7/2007 | Iki et al. |
| 7,242,929 B2 | 7/2007 | Draluk et al. |
| 7,247,671 B2 | 7/2007 | Overbeek et al. |
| 7,251,697 B2 | 7/2007 | Piotrowski |
| 7,263,379 B1 | 8/2007 | Parkulo et al. |
| 7,266,371 B1 | 9/2007 | Amin et al. |
| 7,269,821 B2 | 9/2007 | Sahinoja et al. |
| 7,272,711 B2 | 9/2007 | Suda et al. |
| 7,274,911 B2 | 9/2007 | Li |
| 7,275,243 B2 | 9/2007 | Gibbons et al. |
| 7,277,529 B1 | 10/2007 | Wuthnow et al. |
| 7,287,068 B1 | 10/2007 | Eriksson et al. |
| 7,292,846 B2 | 11/2007 | Mittal |
| 7,293,115 B2 | 11/2007 | DaCosta et al. |
| 7,310,720 B2 | 12/2007 | Cornett |
| 7,310,801 B2 | 12/2007 | Burkhardt et al. |
| 7,313,791 B1 | 12/2007 | Chen et al. |
| 7,324,514 B1 | 1/2008 | Haq et al. |
| 7,324,815 B2 | 1/2008 | Ross et al. |
| 7,325,233 B2 | 1/2008 | Kuck et al. |
| 7,346,683 B2 | 3/2008 | Inoue |
| 7,349,695 B2 | 3/2008 | Oommen et al. |
| 7,350,205 B2 | 3/2008 | Ji |
| 7,353,533 B2 | 4/2008 | Wright et al. |
| 7,367,027 B1 | 4/2008 | Chen et al. |
| 7,367,711 B2 | 5/2008 | Kawanishi et al. |
| 7,369,851 B2 | 5/2008 | Okonnen et al. |
| 7,373,109 B2 | 5/2008 | Pohja et al. |
| 7,376,711 B2 | 5/2008 | Du et al. |
| 7,376,944 B2 | 5/2008 | Crisan et al. |
| 7,386,846 B2 | 6/2008 | Rajaram |
| 7,405,537 B2 | 7/2008 | Hoffman et al. |
| 7,409,685 B2 | 8/2008 | Chen et al. |
| 7,415,706 B1 | 8/2008 | Raju et al. |

(56) References Cited

U.S. PATENT DOCUMENTS

| | | | |
|---|---|---|---|
| 7,433,936 B2 | 10/2008 | Zhu et al. | |
| 7,461,294 B2 | 12/2008 | Sano | |
| 7,469,306 B2 | 12/2008 | Ng | |
| 7,480,907 B1 | 1/2009 | Marolia et al. | |
| 7,493,128 B2 | 2/2009 | Tang et al. | |
| 7,500,143 B2 | 3/2009 | Buia et al. | |
| 7,509,496 B2 | 3/2009 | Skog et al. | |
| 7,509,652 B2 | 3/2009 | Niemi | |
| 7,518,504 B2 | 4/2009 | Peeters | |
| 7,523,155 B2 | 4/2009 | Hayes, Jr. | |
| 7,526,563 B2 | 4/2009 | Ingimundarson et al. | |
| 7,555,750 B1 | 6/2009 | Lilley | |
| 7,577,722 B1 | 8/2009 | Khandekar et al. | |
| 7,584,466 B1 | 9/2009 | Rao | |
| 7,644,404 B2 | 1/2010 | Rao et al. | |
| 7,657,884 B2 | 2/2010 | Okonnen et al. | |
| 7,657,886 B1 | 2/2010 | Chen et al. | |
| 7,664,923 B2 | 2/2010 | Kim et al. | |
| 7,673,300 B2 | 3/2010 | Herle et al. | |
| 7,673,325 B2 | 3/2010 | Vincent et al. | |
| 7,680,828 B2 | 3/2010 | Gorelik | |
| 7,689,981 B1 | 3/2010 | Gustafson | |
| 7,698,698 B2 | 4/2010 | Skan | |
| 7,707,570 B2 | 4/2010 | Yoshimura et al. | |
| 7,711,782 B2 | 5/2010 | Kim et al. | |
| 7,725,889 B2 | 5/2010 | Gustafson et al. | |
| 7,739,679 B2 | 6/2010 | Qumei | |
| 7,784,065 B2 | 8/2010 | Polivy et al. | |
| 7,797,693 B1 | 9/2010 | Gustafson et al. | |
| 7,797,695 B2 | 9/2010 | Motta | |
| 7,810,088 B2 | 10/2010 | Herle et al. | |
| 7,818,556 B2 | 10/2010 | Lima et al. | |
| 7,823,148 B2 | 10/2010 | Deshpande et al. | |
| 7,823,155 B2 | 10/2010 | Misra et al. | |
| 7,844,964 B2 | 11/2010 | Marolia | |
| 7,873,714 B2 | 1/2011 | Kaappa et al. | |
| 7,889,869 B2 | 2/2011 | Ypya et al. | |
| 8,063,929 B2 | 11/2011 | Kurtz et al. | |
| 8,099,078 B2 | 1/2012 | Lazaridis | |
| 2001/0008024 A1 | 7/2001 | Inaba | |
| 2001/0018673 A1 | 8/2001 | Goldband et al. | |
| 2001/0029178 A1 | 10/2001 | Criss et al. | |
| 2001/0041556 A1 | 11/2001 | Laursen et al. | |
| 2001/0042112 A1 | 11/2001 | Slivka et al. | |
| 2001/0044934 A1 | 11/2001 | Hirai et al. | |
| 2001/0047363 A1 | 11/2001 | Peng | |
| 2001/0047441 A1 | 11/2001 | Robertson | |
| 2001/0048728 A1 | 12/2001 | Peng | |
| 2001/0049263 A1* | 12/2001 | Zhang | 455/67.1 |
| 2001/0052052 A1 | 12/2001 | Peng | |
| 2001/0052066 A1 | 12/2001 | Lee et al. | |
| 2001/0053688 A1 | 12/2001 | Rignell et al. | |
| 2001/0055414 A1 | 12/2001 | Thieme | |
| 2001/0056348 A1 | 12/2001 | Hyde-Thomson et al. | |
| 2002/0010702 A1 | 1/2002 | Ajtai et al. | |
| 2002/0013831 A1 | 1/2002 | Astala et al. | |
| 2002/0023258 A1 | 2/2002 | Elwahab et al. | |
| 2002/0028673 A1 | 3/2002 | Chang et al. | |
| 2002/0030634 A1 | 3/2002 | Noda et al. | |
| 2002/0039394 A1 | 4/2002 | Buchwald et al. | |
| 2002/0046400 A1 | 4/2002 | Burch | |
| 2002/0052938 A1 | 5/2002 | Kanemitsu | |
| 2002/0053044 A1 | 5/2002 | Gold et al. | |
| 2002/0059526 A1 | 5/2002 | Dillon et al. | |
| 2002/0065950 A1 | 5/2002 | Katz et al. | |
| 2002/0069259 A1 | 6/2002 | Kushwaha et al. | |
| 2002/0072359 A1 | 6/2002 | Moles et al. | |
| 2002/0073304 A1 | 6/2002 | Marsh et al. | |
| 2002/0073309 A1 | 6/2002 | Kurn et al. | |
| 2002/0075824 A1 | 6/2002 | Willekes et al. | |
| 2002/0077094 A1 | 6/2002 | Leppanen | |
| 2002/0078142 A1 | 6/2002 | Moore et al. | |
| 2002/0078185 A1 | 6/2002 | Swerup et al. | |
| 2002/0078209 A1 | 6/2002 | Peng | |
| 2002/0085704 A1 | 7/2002 | Shires | |
| 2002/0087668 A1 | 7/2002 | San Martin et al. |
| 2002/0090934 A1 | 7/2002 | Mitchelmore |
| 2002/0091568 A1 | 7/2002 | Kraft et al. |
| 2002/0091807 A1 | 7/2002 | Goodman |
| 2002/0091815 A1 | 7/2002 | Anderson et al. |
| 2002/0092008 A1 | 7/2002 | Kehne et al. |
| 2002/0092010 A1 | 7/2002 | Fiske |
| 2002/0092011 A1 | 7/2002 | Liu et al. |
| 2002/0095501 A1 | 7/2002 | Chiloyan et al. |
| 2002/0095615 A1 | 7/2002 | Hastings et al. |
| 2002/0099726 A1 | 7/2002 | Crudele et al. |
| 2002/0099950 A1 | 7/2002 | Smith |
| 2002/0100028 A1 | 7/2002 | Kosaka et al. |
| 2002/0100036 A1 | 7/2002 | Moshir et al. |
| 2002/0107795 A1 | 8/2002 | Minear et al. |
| 2002/0112046 A1 | 8/2002 | Kushwaha et al. |
| 2002/0112047 A1 | 8/2002 | Kushwaha et al. |
| 2002/0114384 A1 | 8/2002 | Nelson et al. |
| 2002/0116261 A1 | 8/2002 | Moskowitz et al. |
| 2002/0116665 A1 | 8/2002 | Pickover et al. |
| 2002/0120776 A1 | 8/2002 | Eggebraaten et al. |
| 2002/0120810 A1 | 8/2002 | Brouwer |
| 2002/0123335 A1 | 9/2002 | Luna et al. |
| 2002/0123359 A1 | 9/2002 | Wei et al. |
| 2002/0123934 A1 | 9/2002 | Tanaka et al. |
| 2002/0124007 A1 | 9/2002 | Zhao |
| 2002/0124209 A1 | 9/2002 | Faust et al. |
| 2002/0129355 A1 | 9/2002 | Velten et al. |
| 2002/0131404 A1 | 9/2002 | Mehta et al. |
| 2002/0138567 A1 | 9/2002 | Ogawa |
| 2002/0144005 A1 | 10/2002 | Mae et al. |
| 2002/0144254 A1 | 10/2002 | Owada |
| 2002/0152005 A1 | 10/2002 | Bagnordi |
| 2002/0156863 A1 | 10/2002 | Peng |
| 2002/0157089 A1 | 10/2002 | Patel |
| 2002/0157090 A1 | 10/2002 | Anton, Jr. |
| 2002/0159479 A1 | 10/2002 | Watanuki et al. |
| 2002/0161658 A1 | 10/2002 | Sussman |
| 2002/0162098 A1 | 10/2002 | Suzuki |
| 2002/0166001 A1 | 11/2002 | Cheng et al. |
| 2002/0166027 A1 | 11/2002 | Shirasawa et al. |
| 2002/0170052 A1 | 11/2002 | Radatti |
| 2002/0174338 A1 | 11/2002 | Tomita et al. |
| 2002/0174422 A1 | 11/2002 | Kelley et al. |
| 2002/0178241 A1 | 11/2002 | Eriksson |
| 2002/0184208 A1 | 12/2002 | Kato |
| 2002/0184619 A1 | 12/2002 | Meyerson |
| 2002/0188886 A1 | 12/2002 | Liu et al. |
| 2002/0193100 A1 | 12/2002 | Riffe et al. |
| 2002/0194532 A1 | 12/2002 | Nagasawa |
| 2002/0197991 A1 | 12/2002 | Anvekar et al. |
| 2002/0198971 A1 | 12/2002 | Resnick et al. |
| 2002/0198976 A1 | 12/2002 | Davenport |
| 2003/0005108 A1 | 1/2003 | Bartley et al. |
| 2003/0005362 A1 | 1/2003 | Miller et al. |
| 2003/0005426 A1 | 1/2003 | Scholtens et al. |
| 2003/0009752 A1 | 1/2003 | Gupta |
| 2003/0009753 A1 | 1/2003 | Brodersen et al. |
| 2003/0013434 A1 | 1/2003 | Rosenberg et al. |
| 2003/0018524 A1 | 1/2003 | Fishman et al. |
| 2003/0018764 A1 | 1/2003 | Shell et al. |
| 2003/0018810 A1 | 1/2003 | Karagiannis et al. |
| 2003/0018889 A1 | 1/2003 | Burnett et al. |
| 2003/0022657 A1 | 1/2003 | Herschberg et al. |
| 2003/0022663 A1 | 1/2003 | Rajaram et al. |
| 2003/0023573 A1 | 1/2003 | Chan et al. |
| 2003/0023849 A1 | 1/2003 | Martin, Jr. |
| 2003/0023964 A1 | 1/2003 | Rajaram et al. |
| 2003/0027563 A1 | 2/2003 | Herle et al. |
| 2003/0027581 A1 | 2/2003 | Jokinen et al. |
| 2003/0031306 A1 | 2/2003 | Pederson et al. |
| 2003/0033358 A1 | 2/2003 | Tran et al. |
| 2003/0033525 A1 | 2/2003 | Rajaram |
| 2003/0033599 A1 | 2/2003 | Rajaram et al. |
| 2003/0036919 A1 | 2/2003 | Felt et al. |
| 2003/0037075 A1 | 2/2003 | Hannigan et al. |
| 2003/0041125 A1 | 2/2003 | Salomon |
| 2003/0041127 A1 | 2/2003 | Turnbull |
| 2003/0043180 A1 | 3/2003 | Gusler et al. |

(56) References Cited

U.S. PATENT DOCUMENTS

| | | |
|---|---|---|
| 2003/0044086 A1 | 3/2003 | Jia et al. |
| 2003/0046485 A1 | 3/2003 | Zitlaw |
| 2003/0046524 A1 | 3/2003 | Zimmer et al. |
| 2003/0046680 A1 | 3/2003 | Gentry |
| 2003/0054811 A1 | 3/2003 | Han et al. |
| 2003/0055919 A1 | 3/2003 | Fong et al. |
| 2003/0055931 A1 | 3/2003 | Cravo De Almeida et al. |
| 2003/0061323 A1 | 3/2003 | East et al. |
| 2003/0061384 A1 | 3/2003 | Nakatani |
| 2003/0065738 A1 | 4/2003 | Yang et al. |
| 2003/0066062 A1 | 4/2003 | Brannock et al. |
| 2003/0068162 A1 | 4/2003 | Tsai et al. |
| 2003/0074658 A1 | 4/2003 | Kim |
| 2003/0074672 A1 | 4/2003 | Daniels |
| 2003/0081557 A1 | 5/2003 | Mettala et al. |
| 2003/0081786 A1 | 5/2003 | Nakano et al. |
| 2003/0084138 A1 | 5/2003 | Tavis et al. |
| 2003/0084177 A1 | 5/2003 | Mulligan |
| 2003/0084283 A1 | 5/2003 | Pixton |
| 2003/0084434 A1 | 5/2003 | Ren |
| 2003/0084435 A1 | 5/2003 | Messer et al. |
| 2003/0088868 A1 | 5/2003 | Chang et al. |
| 2003/0092438 A1 | 5/2003 | Moore et al. |
| 2003/0093545 A1 | 5/2003 | Liu et al. |
| 2003/0095648 A1 | 5/2003 | Kaib et al. |
| 2003/0097431 A1 | 5/2003 | Dill |
| 2003/0100303 A1 | 5/2003 | Armbruster et al. |
| 2003/0101246 A1 | 5/2003 | Lahti |
| 2003/0101446 A1 | 5/2003 | McManus et al. |
| 2003/0103484 A1 | 6/2003 | Oommen et al. |
| 2003/0110412 A1 | 6/2003 | Neville |
| 2003/0110484 A1 | 6/2003 | Famolari |
| 2003/0112752 A1 | 6/2003 | Irifune et al. |
| 2003/0117956 A1 | 6/2003 | Lee |
| 2003/0121032 A1 | 6/2003 | Cho et al. |
| 2003/0131087 A1 | 7/2003 | Shippy et al. |
| 2003/0131226 A1 | 7/2003 | Spencer et al. |
| 2003/0133552 A1 | 7/2003 | Pillai et al. |
| 2003/0143991 A1 | 7/2003 | Minear et al. |
| 2003/0149735 A1 | 8/2003 | Stark et al. |
| 2003/0154471 A1 | 8/2003 | Teachman et al. |
| 2003/0156719 A1 | 8/2003 | Cronce |
| 2003/0158973 A1 | 8/2003 | Tsukada |
| 2003/0162533 A1 | 8/2003 | Moles et al. |
| 2003/0163508 A1 | 8/2003 | Goodman |
| 2003/0163551 A1 | 8/2003 | Riordan |
| 2003/0163805 A1 | 8/2003 | Hata et al. |
| 2003/0172094 A1 | 9/2003 | Lauria et al. |
| 2003/0172138 A1 | 9/2003 | McCormack et al. |
| 2003/0172175 A1 | 9/2003 | McCormack et al. |
| 2003/0177255 A1 | 9/2003 | Yun |
| 2003/0177485 A1 | 9/2003 | Waldin et al. |
| 2003/0182414 A1* | 9/2003 | O'Neill .................. 709/223 |
| 2003/0186689 A1 | 10/2003 | Herle et al. |
| 2003/0186695 A1 | 10/2003 | Bridges et al. |
| 2003/0186722 A1 | 10/2003 | Weiner |
| 2003/0188120 A1 | 10/2003 | Maeda |
| 2003/0188156 A1 | 10/2003 | Yasala et al. |
| 2003/0191955 A1 | 10/2003 | Wagner et al. |
| 2003/0194033 A1 | 10/2003 | Tiedemann et al. |
| 2003/0195110 A1 | 10/2003 | Moody et al. |
| 2003/0195753 A1 | 10/2003 | Homuth |
| 2003/0195951 A1 | 10/2003 | Wittel et al. |
| 2003/0196110 A1 | 10/2003 | Lampson et al. |
| 2003/0198282 A1 | 10/2003 | Tujkovic et al. |
| 2003/0204640 A1 | 10/2003 | Sahinoja et al. |
| 2003/0212742 A1 | 11/2003 | Hochmuth et al. |
| 2003/0214919 A1 | 11/2003 | Kilfoyle et al. |
| 2003/0217193 A1 | 11/2003 | Thurston et al. |
| 2003/0217358 A1 | 11/2003 | Thurston et al. |
| 2003/0221190 A1 | 11/2003 | Deshpande et al. |
| 2003/0224761 A1 | 12/2003 | Goto |
| 2003/0226030 A1 | 12/2003 | Hurst et al. |
| 2003/0226137 A1 | 12/2003 | Nagao |
| 2003/0233649 A1 | 12/2003 | Reimert |
| 2004/0002943 A1 | 1/2004 | Merrill et al. |
| 2004/0003266 A1 | 1/2004 | Moshir et al. |
| 2004/0005906 A1 | 1/2004 | Okumura et al. |
| 2004/0006723 A1 | 1/2004 | Erstad |
| 2004/0006760 A1 | 1/2004 | Gove et al. |
| 2004/0008113 A1 | 1/2004 | Pradhan et al. |
| 2004/0015857 A1 | 1/2004 | Cornelius et al. |
| 2004/0015940 A1 | 1/2004 | Heisey et al. |
| 2004/0015952 A1 | 1/2004 | Lajoie et al. |
| 2004/0017831 A1 | 1/2004 | Shen et al. |
| 2004/0018831 A1 | 1/2004 | Majmundar et al. |
| 2004/0026008 A1 | 2/2004 | Delisle |
| 2004/0031027 A1 | 2/2004 | Hiltgen |
| 2004/0031029 A1 | 2/2004 | Lee et al. |
| 2004/0031030 A1 | 2/2004 | Kidder et al. |
| 2004/0031031 A1 | 2/2004 | Rudelic |
| 2004/0034765 A1 | 2/2004 | James |
| 2004/0034850 A1 | 2/2004 | Burkhardt et al. |
| 2004/0034853 A1 | 2/2004 | Gibbons et al. |
| 2004/0038692 A1 | 2/2004 | Muzaffar |
| 2004/0039801 A9 | 2/2004 | Srinivasan et al. |
| 2004/0040020 A1 | 2/2004 | Yang |
| 2004/0041800 A1 | 3/2004 | Daniels |
| 2004/0043788 A1 | 3/2004 | Mittal |
| 2004/0049394 A1 | 3/2004 | Burger et al. |
| 2004/0049609 A1 | 3/2004 | Simonson et al. |
| 2004/0054764 A1 | 3/2004 | Aderton et al. |
| 2004/0054995 A1 | 3/2004 | Lee |
| 2004/0058651 A1 | 3/2004 | Ross et al. |
| 2004/0058652 A1 | 3/2004 | McGregor et al. |
| 2004/0059725 A1 | 3/2004 | Sharangpani et al. |
| 2004/0062130 A1 | 4/2004 | Chiang |
| 2004/0068363 A1 | 4/2004 | Goto |
| 2004/0068721 A1 | 4/2004 | O'Neill et al. |
| 2004/0068724 A1 | 4/2004 | Gardner et al. |
| 2004/0072578 A1 | 4/2004 | Keutmann et al. |
| 2004/0073901 A1 | 4/2004 | Imamatsu |
| 2004/0073912 A1 | 4/2004 | Meza |
| 2004/0078427 A1 | 4/2004 | Gil et al. |
| 2004/0078455 A1 | 4/2004 | Eide et al. |
| 2004/0082346 A1 | 4/2004 | Skytt et al. |
| 2004/0083469 A1 | 4/2004 | Chen et al. |
| 2004/0083472 A1 | 4/2004 | Rao et al. |
| 2004/0088281 A1 | 5/2004 | Matsuishi |
| 2004/0088473 A1 | 5/2004 | Ogle |
| 2004/0088694 A1 | 5/2004 | Ho |
| 2004/0092255 A1 | 5/2004 | Ji et al. |
| 2004/0093342 A1 | 5/2004 | Arbo et al. |
| 2004/0093421 A1 | 5/2004 | Peng et al. |
| 2004/0093523 A1 | 5/2004 | Matsuzaki et al. |
| 2004/0093557 A1 | 5/2004 | Kawatani |
| 2004/0093597 A1 | 5/2004 | Rao et al. |
| 2004/0095457 A1 | 5/2004 | Pokorny et al. |
| 2004/0098413 A1 | 5/2004 | Peng |
| 2004/0098421 A1 | 5/2004 | Peng |
| 2004/0098427 A1 | 5/2004 | Peng |
| 2004/0098715 A1 | 5/2004 | Aghera et al. |
| 2004/0103214 A1 | 5/2004 | Adwankar et al. |
| 2004/0103340 A1 | 5/2004 | Sundareson et al. |
| 2004/0103347 A1 | 5/2004 | Sneed et al. |
| 2004/0107416 A1 | 6/2004 | Buban et al. |
| 2004/0110497 A1 | 6/2004 | Little |
| 2004/0111582 A1 | 6/2004 | Maeda et al. |
| 2004/0111702 A1 | 6/2004 | Chan |
| 2004/0111723 A1 | 6/2004 | Moles et al. |
| 2004/0117322 A1 | 6/2004 | Bjorksten et al. |
| 2004/0117760 A1 | 6/2004 | McFarling |
| 2004/0117785 A1 | 6/2004 | Kincaid |
| 2004/0123153 A1 | 6/2004 | Wright et al. |
| 2004/0123188 A1 | 6/2004 | Srinivasan et al. |
| 2004/0123270 A1 | 6/2004 | Zhuang et al. |
| 2004/0123282 A1 | 6/2004 | Rao |
| 2004/0126803 A1 | 7/2004 | Cash et al. |
| 2004/0133887 A1 | 7/2004 | Herle et al. |
| 2004/0143573 A1 | 7/2004 | Burkey et al. |
| 2004/0143828 A1 | 7/2004 | Liu et al. |
| 2004/0143836 A1 | 7/2004 | McCormack et al. |
| 2004/0148379 A1 | 7/2004 | Ogura |
| 2004/0150519 A1 | 8/2004 | Husain et al. |

(56) References Cited

U.S. PATENT DOCUMENTS

| | | |
|---|---|---|
| 2004/0152455 A1 | 8/2004 | Herle et al. |
| 2004/0153327 A1 | 8/2004 | Liu et al. |
| 2004/0153356 A1 | 8/2004 | Lockwood et al. |
| 2004/0153549 A1 | 8/2004 | Naito et al. |
| 2004/0158583 A1 | 8/2004 | Kaappa |
| 2004/0158817 A1 | 8/2004 | Okachi et al. |
| 2004/0158829 A1 | 8/2004 | Beresin et al. |
| 2004/0166839 A1 | 8/2004 | Okkonen et al. |
| 2004/0168165 A1 | 8/2004 | Kokkinen |
| 2004/0174264 A1 | 9/2004 | Reisman et al. |
| 2004/0180676 A1 | 9/2004 | Haumont et al. |
| 2004/0190693 A1 | 9/2004 | Beiermeister |
| 2004/0192280 A1 | 9/2004 | Dalton et al. |
| 2004/0192299 A1 | 9/2004 | Wilson et al. |
| 2004/0192306 A1 | 9/2004 | Elkarat et al. |
| 2004/0194081 A1 | 9/2004 | Qumei et al. |
| 2004/0198447 A1 | 10/2004 | Larsson |
| 2004/0203593 A1 | 10/2004 | Whelan et al. |
| 2004/0203655 A1 | 10/2004 | Sinnarajah et al. |
| 2004/0204117 A1 | 10/2004 | Weiner |
| 2004/0205709 A1 | 10/2004 | Hiltgen et al. |
| 2004/0208182 A1 | 10/2004 | Boles et al. |
| 2004/0210608 A1 | 10/2004 | Lee et al. |
| 2004/0215702 A1 | 10/2004 | Hamasaki et al. |
| 2004/0215755 A1 | 10/2004 | O'Neill |
| 2004/0215830 A1 | 10/2004 | Shenfield |
| 2004/0218034 A1 | 11/2004 | Wang et al. |
| 2004/0224679 A1 | 11/2004 | Okoro et al. |
| 2004/0226008 A1 | 11/2004 | Jacobi et al. |
| 2004/0229684 A1 | 11/2004 | Blackburn et al. |
| 2004/0230963 A1 | 11/2004 | Rothman et al. |
| 2004/0230965 A1 | 11/2004 | Okkonen |
| 2004/0237079 A1 | 11/2004 | Cox et al. |
| 2004/0237081 A1 | 11/2004 | Homiller |
| 2004/0237083 A1 | 11/2004 | Alcazar et al. |
| 2004/0239975 A1 | 12/2004 | Kawaura et al. |
| 2004/0242286 A1 | 12/2004 | Benco et al. |
| 2004/0243991 A1 | 12/2004 | Gustafson et al. |
| 2004/0243992 A1* | 12/2004 | Gustafson et al. ............ 717/168 |
| 2004/0243993 A1 | 12/2004 | Okkonen et al. |
| 2004/0244008 A1 | 12/2004 | Lee |
| 2004/0250245 A1 | 12/2004 | Rao et al. |
| 2004/0250294 A1 | 12/2004 | Kim |
| 2004/0255191 A1 | 12/2004 | Fox et al. |
| 2004/0255291 A1 | 12/2004 | Sierer et al. |
| 2004/0257208 A1 | 12/2004 | Huang et al. |
| 2004/0260734 A1 | 12/2004 | Ren et al. |
| 2004/0261072 A1 | 12/2004 | Herle et al. |
| 2004/0261073 A1 | 12/2004 | Herle et al. |
| 2004/0267481 A1 | 12/2004 | Resnick et al. |
| 2004/0267833 A1 | 12/2004 | Meller et al. |
| 2004/0268041 A1 | 12/2004 | Smith |
| 2005/0005268 A1 | 1/2005 | Zilavy et al. |
| 2005/0010552 A1 | 1/2005 | Kaappa et al. |
| 2005/0010576 A1 | 1/2005 | Ren et al. |
| 2005/0010585 A1 | 1/2005 | Sahinoja et al. |
| 2005/0022175 A1 | 1/2005 | Sliger et al. |
| 2005/0027867 A1 | 2/2005 | Mueller et al. |
| 2005/0033774 A1 | 2/2005 | Brentano et al. |
| 2005/0033829 A1 | 2/2005 | Oommen |
| 2005/0037762 A1 | 2/2005 | Gurbani et al. |
| 2005/0038916 A1 | 2/2005 | Nguyen |
| 2005/0038955 A1 | 2/2005 | Chen |
| 2005/0039178 A1 | 2/2005 | Marolia et al. |
| 2005/0050538 A1 | 3/2005 | Kawamata et al. |
| 2005/0055397 A1 | 3/2005 | Zhu et al. |
| 2005/0055453 A1 | 3/2005 | Zhu |
| 2005/0055595 A1 | 3/2005 | Frazer et al. |
| 2005/0055684 A1 | 3/2005 | Rao et al. |
| 2005/0060361 A1 | 3/2005 | Chatrath et al. |
| 2005/0060699 A1 | 3/2005 | Kim et al. |
| 2005/0060711 A1 | 3/2005 | Ericsson et al. |
| 2005/0063242 A1 | 3/2005 | Ren |
| 2005/0066019 A1 | 3/2005 | Egan et al. |
| 2005/0071385 A1 | 3/2005 | Rao |
| 2005/0073438 A1 | 4/2005 | Rodgers et al. |
| 2005/0079863 A1 | 4/2005 | Macaluso |
| 2005/0084079 A1 | 4/2005 | Lang |
| 2005/0086328 A1 | 4/2005 | Landram et al. |
| 2005/0091367 A1 | 4/2005 | Pyhalammi et al. |
| 2005/0091501 A1 | 4/2005 | Osthoff et al. |
| 2005/0096025 A1 | 5/2005 | Qumei et al. |
| 2005/0097544 A1 | 5/2005 | Kim |
| 2005/0102615 A1 | 5/2005 | Roman et al. |
| 2005/0102660 A1 | 5/2005 | Chen et al. |
| 2005/0114493 A1 | 5/2005 | Mandato et al. |
| 2005/0114504 A1 | 5/2005 | Marolia et al. |
| 2005/0114852 A1 | 5/2005 | Chen et al. |
| 2005/0132179 A1 | 6/2005 | Glaum et al. |
| 2005/0132349 A1 | 6/2005 | Roberts et al. |
| 2005/0132351 A1 | 6/2005 | Randall et al. |
| 2005/0135286 A1 | 6/2005 | Nurminen et al. |
| 2005/0136942 A1 | 6/2005 | Timiri et al. |
| 2005/0138232 A1 | 6/2005 | Tamura et al. |
| 2005/0144609 A1 | 6/2005 | Rothman et al. |
| 2005/0144612 A1 | 6/2005 | Wang et al. |
| 2005/0148323 A1 | 7/2005 | Little et al. |
| 2005/0148359 A1 | 7/2005 | Joeressen |
| 2005/0149335 A1 | 7/2005 | Mesbah et al. |
| 2005/0153741 A1 | 7/2005 | Chen et al. |
| 2005/0160195 A1 | 7/2005 | Bruner et al. |
| 2005/0165706 A1 | 7/2005 | Giacchetti |
| 2005/0170863 A1 | 8/2005 | Shostak |
| 2005/0172117 A1 | 8/2005 | Aura |
| 2005/0172141 A1 | 8/2005 | Gayde et al. |
| 2005/0182697 A1 | 8/2005 | Rao |
| 2005/0198062 A1 | 9/2005 | Shapiro |
| 2005/0198379 A1 | 9/2005 | Panasyuk et al. |
| 2005/0204068 A1 | 9/2005 | Zhu et al. |
| 2005/0204353 A1 | 9/2005 | Ji |
| 2005/0210458 A1 | 9/2005 | Moriyama et al. |
| 2005/0210459 A1* | 9/2005 | Henderson et al. ........... 717/168 |
| 2005/0216718 A1 | 9/2005 | Rao |
| 2005/0216902 A1 | 9/2005 | Schaefer |
| 2005/0216903 A1 | 9/2005 | Schaefer |
| 2005/0220079 A1 | 10/2005 | Asokan |
| 2005/0227677 A1 | 10/2005 | Kallio |
| 2005/0227683 A1 | 10/2005 | Draluk et al. |
| 2005/0228847 A1 | 10/2005 | Hayes, Jr. |
| 2005/0228874 A1 | 10/2005 | Edgett et al. |
| 2005/0233733 A1 | 10/2005 | Roundtree et al. |
| 2005/0234967 A1 | 10/2005 | Draluk et al. |
| 2005/0234997 A1 | 10/2005 | Gu et al. |
| 2005/0239447 A1 | 10/2005 | Holzman et al. |
| 2005/0246703 A1 | 11/2005 | Ahonen |
| 2005/0251848 A1 | 11/2005 | Al-Janabi |
| 2005/0257214 A1 | 11/2005 | Moshir et al. |
| 2005/0264404 A1 | 12/2005 | Franczyk et al. |
| 2005/0268296 A1 | 12/2005 | Marolia et al. |
| 2005/0272455 A1 | 12/2005 | Oommen |
| 2005/0278399 A1 | 12/2005 | Herle et al. |
| 2005/0278715 A1 | 12/2005 | Herle et al. |
| 2005/0282533 A1 | 12/2005 | Draluk et al. |
| 2005/0289533 A1 | 12/2005 | Wang et al. |
| 2006/0007901 A1 | 1/2006 | Roskowski et al. |
| 2006/0010437 A1 | 1/2006 | Marolia |
| 2006/0015626 A1 | 1/2006 | Hallamaa et al. |
| 2006/0015860 A1 | 1/2006 | Liu et al. |
| 2006/0020947 A1 | 1/2006 | Hallamaa et al. |
| 2006/0026228 A1 | 2/2006 | Kim |
| 2006/0031449 A1 | 2/2006 | Hallamaa et al. |
| 2006/0036493 A1 | 2/2006 | Aufricht et al. |
| 2006/0036874 A1 | 2/2006 | Cockerille et al. |
| 2006/0036941 A1 | 2/2006 | Neil |
| 2006/0039313 A1 | 2/2006 | Chou et al. |
| 2006/0039561 A1 | 2/2006 | Ypya et al. |
| 2006/0052089 A1 | 3/2006 | Khurana et al. |
| 2006/0053066 A1 | 3/2006 | Sherr et al. |
| 2006/0059481 A1 | 3/2006 | Smith et al. |
| 2006/0068786 A1 | 3/2006 | Florence |
| 2006/0072847 A1 | 4/2006 | Chor et al. |
| 2006/0079224 A1 | 4/2006 | Welnick et al. |
| 2006/0080635 A1 | 4/2006 | Anwar et al. |
| 2006/0080650 A1 | 4/2006 | Winters et al. |

(56) References Cited

U.S. PATENT DOCUMENTS

| | | |
|---|---|---|
| 2006/0080659 A1 | 4/2006 | Ganji |
| 2006/0080681 A1 | 4/2006 | Anwar et al. |
| 2006/0087982 A1 | 4/2006 | Kuure et al. |
| 2006/0089999 A1 | 4/2006 | Xiang et al. |
| 2006/0100928 A1 | 5/2006 | Walczak et al. |
| 2006/0101040 A1 | 5/2006 | Ren et al. |
| 2006/0106806 A1 | 5/2006 | Sperling et al. |
| 2006/0106888 A1 | 5/2006 | Iida et al. |
| 2006/0129414 A1 | 6/2006 | Hallamaa et al. |
| 2006/0130046 A1 | 6/2006 | O'Neill |
| 2006/0158510 A1 | 7/2006 | Lia et al. |
| 2006/0160533 A1 | 7/2006 | Chou et al. |
| 2006/0161599 A1 | 7/2006 | Rosen |
| 2006/0172742 A1 | 8/2006 | Chou et al. |
| 2006/0173976 A1 | 8/2006 | Vincent et al. |
| 2006/0174242 A1 | 8/2006 | Zhu et al. |
| 2006/0176397 A1 | 8/2006 | Panabaker |
| 2006/0181553 A1 | 8/2006 | Choe et al. |
| 2006/0190608 A1 | 8/2006 | Sahinoja et al. |
| 2006/0190939 A1 | 8/2006 | Chen et al. |
| 2006/0193337 A1 | 8/2006 | Paila et al. |
| 2006/0200658 A1 | 9/2006 | Penkethman |
| 2006/0200814 A1 | 9/2006 | Kontinen et al. |
| 2006/0203722 A1 | 9/2006 | Oommen |
| 2006/0203738 A1 | 9/2006 | Fok et al. |
| 2006/0212561 A1 | 9/2006 | Feng |
| 2006/0212937 A1 | 9/2006 | Natarajan |
| 2006/0217111 A1 | 9/2006 | Marolia et al. |
| 2006/0223528 A1 | 10/2006 | Smith |
| 2006/0224712 A1 | 10/2006 | Aho |
| 2006/0236325 A1 | 10/2006 | Rao et al. |
| 2006/0242305 A1 | 10/2006 | Alnas |
| 2006/0246922 A1 | 11/2006 | Gasbarro et al. |
| 2006/0248172 A1 | 11/2006 | Zurawka et al. |
| 2006/0258344 A1 | 11/2006 | Chen |
| 2006/0271659 A1 | 11/2006 | Mittal et al. |
| 2006/0277590 A1 | 12/2006 | Limont et al. |
| 2006/0282834 A1 | 12/2006 | Cheng et al. |
| 2007/0014243 A1 | 1/2007 | Meyer et al. |
| 2007/0028226 A1 | 2/2007 | Chen et al. |
| 2007/0036294 A1 | 2/2007 | Chaudhuri et al. |
| 2007/0041545 A1 | 2/2007 | Gainsboro |
| 2007/0043849 A1 | 2/2007 | Lill et al. |
| 2007/0049265 A1 | 3/2007 | Kaimal et al. |
| 2007/0067765 A1 | 3/2007 | Motta et al. |
| 2007/0089108 A1 | 4/2007 | Chen et al. |
| 2007/0093243 A1 | 4/2007 | Kapadekar et al. |
| 2007/0100585 A1 | 5/2007 | Dulberg et al. |
| 2007/0106806 A1 | 5/2007 | Tu et al. |
| 2007/0132774 A1 | 6/2007 | Fan et al. |
| 2007/0133484 A1 | 6/2007 | Albal et al. |
| 2007/0150444 A1 | 6/2007 | Chesnais et al. |
| 2007/0150524 A1 | 6/2007 | Eker et al. |
| 2007/0169073 A1 | 7/2007 | O'Neill et al. |
| 2007/0169075 A1 | 7/2007 | Lill et al. |
| 2007/0169089 A1 | 7/2007 | Bantz et al. |
| 2007/0169099 A1 | 7/2007 | Rao et al. |
| 2007/0186108 A1 | 8/2007 | Passarella et al. |
| 2007/0190939 A1 | 8/2007 | Abel |
| 2007/0192158 A1 | 8/2007 | Kim |
| 2007/0192453 A1 | 8/2007 | Copeland et al. |
| 2007/0200713 A1 | 8/2007 | Weber et al. |
| 2007/0220504 A1 | 9/2007 | Eker |
| 2007/0226805 A1 | 9/2007 | Jeal et al. |
| 2007/0259633 A1 | 11/2007 | Rao |
| 2007/0277169 A1 | 11/2007 | Rao et al. |
| 2007/0282621 A1 | 12/2007 | Altman et al. |
| 2007/0283003 A1 | 12/2007 | Broyles et al. |
| 2007/0294684 A1 | 12/2007 | Kumashiro et al. |
| 2008/0032763 A1 | 2/2008 | Giobbi |
| 2008/0043726 A1 | 2/2008 | Herrero-Veron et al. |
| 2008/0046583 A1 | 2/2008 | Rao |
| 2008/0062900 A1 | 3/2008 | Rao |
| 2008/0062926 A1 | 3/2008 | Oba |
| 2008/0108321 A1 | 5/2008 | Taaghol et al. |
| 2008/0114925 A1 | 5/2008 | Yang |
| 2008/0127320 A1 | 5/2008 | De Lutiis et al. |
| 2008/0144590 A1 | 6/2008 | Rantanen et al. |
| 2008/0154633 A1 | 6/2008 | Ishibashi et al. |
| 2008/0160983 A1 | 7/2008 | Poplett et al. |
| 2008/0184220 A1 | 7/2008 | Chen et al. |
| 2008/0196019 A1 | 8/2008 | Meller et al. |
| 2008/0205419 A1 | 8/2008 | Shin et al. |
| 2008/0208928 A1 | 8/2008 | Hernandez |
| 2008/0244049 A1 | 10/2008 | Normark et al. |
| 2008/0271023 A1 | 10/2008 | Bone et al. |
| 2009/0030965 A1 | 1/2009 | Hayes, Jr. |
| 2009/0064341 A1 | 3/2009 | Hartung et al. |
| 2009/0113386 A1 | 4/2009 | Eker et al. |
| 2009/0190757 A1 | 7/2009 | Chen et al. |
| 2009/0204845 A1 | 8/2009 | Herscovitz et al. |
| 2009/0219848 A1 | 9/2009 | Lohmar et al. |
| 2009/0328099 A1 | 12/2009 | Praden et al. |
| 2010/0185727 A1 | 7/2010 | Mittal |
| 2010/0275010 A1 | 10/2010 | Ghirardi |
| 2010/0279733 A1 | 11/2010 | Karsten et al. |
| 2010/0287308 A1 | 11/2010 | Robbin et al. |
| 2011/0022948 A1 | 1/2011 | Brown et al. |
| 2011/0209055 A1 | 8/2011 | Plestid et al. |

FOREIGN PATENT DOCUMENTS

| | | |
|---|---|---|
| CN | 1864429 | 11/2006 |
| CN | 1906574 | 1/2007 |
| CN | 101043372 | 9/2007 |
| CN | 101543016 | 9/2009 |
| CN | 101595469 | 12/2009 |
| CN | 101904105 | 12/2010 |
| DE | 10115729 | 10/2001 |
| DE | 112007002863 | 10/2009 |
| DE | 112008002767 | 10/2010 |
| EP | 0717353 | 6/1996 |
| EP | 0803812 | 10/1997 |
| EP | 0811942 | 12/1997 |
| EP | 1049346 | 11/2000 |
| EP | 1052571 | 11/2000 |
| EP | 1077407 | 2/2001 |
| EP | 1152338 | 11/2001 |
| EP | 1176840 | 1/2002 |
| EP | 1184785 | 3/2002 |
| EP | 1256865 | 11/2002 |
| EP | 1282989 A1 | 2/2003 |
| EP | 1333375 | 6/2003 |
| EP | 1331833 | 7/2003 |
| EP | 1584005 | 7/2004 |
| EP | 1597668 | 8/2004 |
| EP | 1654640 | 12/2004 |
| EP | 1639435 | 1/2005 |
| EP | 1652100 | 1/2005 |
| EP | 1652075 | 2/2005 |
| EP | 1513317 | 3/2005 |
| EP | 1515571 | 3/2005 |
| EP | 1519600 | 3/2005 |
| EP | 1660996 | 3/2005 |
| EP | 1665041 | 4/2005 |
| EP | 1668951 | 6/2005 |
| EP | 1563436 | 8/2005 |
| EP | 1584016 | 10/2005 |
| EP | 1691282 | 8/2006 |
| EP | 1705832 | 9/2006 |
| EP | 1732037 | 12/2006 |
| EP | 2024850 | 2/2009 |
| EP | 2025095 | 2/2009 |
| EP | 2047420 | 4/2009 |
| EP | 2087644 | 8/2009 |
| EP | 2104992 | 9/2009 |
| EP | 1614034 | 1/2012 |
| GB | 2426151 | 11/2006 |
| GB | 2458047 | 9/2009 |
| GB | 2468225 | 9/2010 |
| JP | 61173360 | 8/1986 |
| JP | 07160490 | 6/1995 |
| JP | 07219780 | 8/1995 |
| JP | 08202626 | 8/1996 |

(56) References Cited

FOREIGN PATENT DOCUMENTS

| | | |
|---|---|---|
| JP | 11003223 | 1/1999 |
| JP | 11161479 | 6/1999 |
| JP | 11272454 | 10/1999 |
| KR | 20010046714 | 6/2001 |
| KR | 20010076555 | 8/2001 |
| KR | 20010100328 | 11/2001 |
| KR | 20020034228 | 5/2002 |
| KR | 100506785 | 8/2005 |
| KR | 1020050088193 | 9/2005 |
| KR | 1020080008425 | 3/2006 |
| KR | 1020060064660 | 6/2006 |
| KR | 1020060064663 | 6/2006 |
| KR | 1020060089229 | 8/2006 |
| KR | 20090035044 | 4/2009 |
| KR | 101085987 | 11/2011 |
| WO | WO9632679 | 10/1996 |
| WO | WO9838823 | 9/1998 |
| WO | WO9856149 | 12/1998 |
| WO | WO9921382 | 4/1999 |
| WO | WO9957900 | 11/1999 |
| WO | WO0001187 | 1/2000 |
| WO | WO0002358 | 1/2000 |
| WO | WO0022860 | 4/2000 |
| WO | WO0106798 | 1/2001 |
| WO | WO0186985 | 11/2001 |
| WO | WO0223925 | 3/2002 |
| WO | WO0225438 | 3/2002 |
| WO | WO0241147 | 5/2002 |
| WO | WO 0241147 A1 * | 5/2002 |
| WO | WO03010656 | 2/2003 |
| WO | WO03012574 | 2/2003 |
| WO | WO03025742 | 3/2003 |
| WO | WO03034765 | 4/2003 |
| WO | WO03049381 | 6/2003 |
| WO | WO2004031889 | 4/2004 |
| WO | WO2004038546 | 5/2004 |
| WO | WO2004042538 | 5/2004 |
| WO | WO2004049104 | 6/2004 |
| WO | WO2004049115 | 6/2004 |
| WO | WO2004049314 | 6/2004 |
| WO | WO2004059956 | 7/2004 |
| WO | WO2004061551 | 7/2004 |
| WO | WO2004061615 | 7/2004 |
| WO | WO2004063899 | 7/2004 |
| WO | WO2004066091 | 8/2004 |
| WO | WO2004070571 | 8/2004 |
| WO | WO2004072773 | 8/2004 |
| WO | WO2004086196 | 10/2004 |
| WO | WO2004095457 | 11/2004 |
| WO | WO2004109510 | 12/2004 |
| WO | WO2005001665 | 1/2005 |
| WO | WO2005004395 | 1/2005 |
| WO | WO2005008940 | 1/2005 |
| WO | WO2005013123 | 2/2005 |
| WO | WO2005015343 | 2/2005 |
| WO | WO2005024628 | 3/2005 |
| WO | WO2005031570 | 4/2005 |
| WO | WO2005036916 | 4/2005 |
| WO | WO2005041459 | 5/2005 |
| WO | WO2005079334 | 9/2005 |
| WO | WO2006003254 | 1/2006 |
| WO | WO2007112108 | 10/2007 |
| WO | WO2007117514 | 10/2007 |
| WO | WO2007146710 | 12/2007 |
| WO | WO2008003081 | 1/2008 |
| WO | WO2008008880 | 1/2008 |
| WO | WO2008014454 | 1/2008 |
| WO | WO2008022195 | 2/2008 |
| WO | WO2008022198 | 2/2008 |
| WO | WO2008028072 | 3/2008 |
| WO | WO2008033962 | 3/2008 |
| WO | WO2008045700 | 4/2008 |
| WO | WO2008048905 | 4/2008 |
| WO | WO2008067446 | 6/2008 |
| WO | WO2009051760 | 4/2009 |

OTHER PUBLICATIONS

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1$^{st}$ ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

Bettini, L., "Software Update via Mobile Agent Based Programming," Proc. ACM SAC, Jan. 1, 2002, pp. 32-36.

Bitfone Corp., CA Office Action Jun. 8, 2007, CA App. No. 2,414,281, 4 p.

Bitfone Corp., CN Office Action Jun. 5, 2009, CN App. No. 200610067641.4, 12 p.

Bitfone Corp., CN Office Action Dec. 20, 2010, CN App. No. 200610067641.4, 3 p.

Bitfone Corp., EP Office Action Mar. 16, 2010, EP App. No. EP04777313.0, 8 p.

Bitfone Corp., EP Search Report Mar. 22, 2012, EP App. No. 06251423.7, 6 p.

Bitfone Corp., EP Office Action Mar. 26, 2010, EP App. No. 04785381.7, 5 p.

Bitfone Corp., EP Search Report Jan. 18, 2008, EP App No. 04759830.5, 5 p.

Bitfone Corp., EP Search Report Mar. 30, 2011, EP App. No. 06251423.7, 7 p.

Bitfone Corp., EP Search Report Jul. 1, 2011, EP App. No. 06251423.7, 11 p.

Bitfone Corp., EP Search Report Jul. 4, 2006, EP App. No. EP06250739.7, 7 p.

Bitfone Corp., EP Search Report Jul. 19, 2006, EP App. No. 06251512.7, 8 p.

Bitfone Corp., EP Search Report Nov. 26, 2009, EP App. No. EP04777313.0, 3 p.

Bitfone Corp., Int'l Prelim Rpt Jan. 9, 2006, PCT App. No. PCT/US2004/022598, 7 p.

Bitfone Corp., Int'l Prelim Rpt Jan. 30, 2006, PCT App. No. PCT/US2004/024876, 8 p.

Bitfone Corp., Int'l Prelim Rpt Mar. 6, 2006, PCT App. No. PCT/US2004/028433, 8 p.

Bitfone Corp., Int'l Prelim Rpt Mar. 13, 2006, PCT App. No. PCT/US2004/021037, 7 p.

Bitfone Corp., Int'l Prelim Rpt Mar. 27, 2006, PCT App. No. PCT/US2004/031547, 9 p.

Bitfone Corp., Int'l Prelim Rpt Aug. 5, 2005, PCT App No. PCT/US2004/002950, 6 p.

Bitfone Corp., Int'l Prelim Rpt Aug. 12, 2005, PCT App. No. PCT/US2004/002084, 4 p.

Bitfone Corp., Int'l Prelim Rpt Sep. 30, 2008, PCT App. No. PCT/US2007/007489, 4 p.

Bitfone Corp., Int'l Prelim Rpt Oct. 1, 2005, PCT App. No. PCT/US2004/008918, 4 p.

Bitfone Corp., Int'l Prelim Rpt Oct. 28, 2008, PCT App. No. PCT/US2004/000694, 4 p.

Bitfone Corp., Int'l Prelim Rpt Nov. 7, 2006, PCT App. No. PCT/US2005/004520, 4 p.

Bitfone Corp., Int'l Prelim Rpt Dec. 8, 2005, PCT App. No. PCT/US2004/017731, 8 p.

Bitfone Corp., Int'l Prelim Rpt Dec. 10, 2008, PCT App. No. PCT/US2007/070534, 9 p.

Bitfone Corp., Int'l Prelim Rpt, Apr. 3, 2006, PCT App. No. PCT/US2004/033071, 9 p.

Bitfone Corp., Int'l Search Report & Written Opinion Jan. 4, 2005, PCT App. No. PCT/US2004/002084, 8 p.

(56) References Cited

OTHER PUBLICATIONS

Bitfone Corp., Int'l Search Report & Written Opinion Jan. 14, 2005, PCT App. No. PCT/US2004/011219, 9 p.
Bitfone Corp., Int'l Search Report & Written Opinion Jul. 14, 2008, PCT App. No. PCT/US2004/001574, 16 p.
Bitfone Corp., Int'l Search Report Jan. 19, 2005, PCT App. No. PCT/US2004/024876, 1 p.
Bitfone Corp., Int'l Search Report Jan. 25, 2005, PCT App. No. PCT/U52004/033071, 3 p.
Bitfone Corp., Int'l Search Report Jan. 30, 2006, PCT App. No. PCT/US2004/021037, 3 p.
Bitfone Corp., Int'l Search Report Feb. 10, 2005, PCT App. No. PCT/US2004/031547, 3 p.
Bitfone Corp., Int'l Search Report Mar. 7, 2005, PCT App. No. PCT/US2004/002950, 4 p.
Bitfone Corp., Int'l Search Report Mar. 16, 2005, PCT App. No. PCT/US2004/008918, 3 p.
Bitfone Corp., Int'l Search Report Apr. 23, 2008, PCT App. No. PCT/US2007/007489, 3 p.
Bitfone Corp., Int'l Search Report May 26, 2005, PCT App. No. PCT/US2004/028433, 7 p.
Bitfone Corp., Int'l Search Report Jul. 20, 2005, PCT App. No. PCT/US2004/022598, 3 p.
Bitfone Corp., Int'l Search Report Oct. 3, 2006, PCT App. No. PCT/US2005/004520, 3 p.
Bitfone Corp., Int'l Search Report, Jul. 20, 2006, PCT App. No. PCT/US2003/027727, 8 p.
Bitfone Corp., JP Final Office Action Jun. 6, 2006, Jap. App. No. 2002-543291, 10 p.
Bitfone Corp., JP Office Action Nov. 8, 2005, JP App. No. 2002-543291, 13 p.
Bitfone Corp., KR Office Action Feb. 16, 2011, KR App. No. KR-10-2006-7006350, 4 p.
Bitfone Corp., KR Office Action Apr. 10, 2008, KR App. No. KR10-2006-7004343, 7 p.
Bitfone Corp., KR Office Action May 21, 2008, KR App. No. KR10-2006-7004488, 8 p.
Bitfone Corp., KR Office Action Aug. 21, 2007, KR App. No. KR10-2006-7004343, 5 p.
Bitfone Corp., Written Opinion Jan. 19, 2005, PCT App. No. PCT/US2004/017731, 7 p.
Bitfone Corp., Written Opinion Jan. 30, 2006, PCT App. No. PCT/US2004/021037, 6 p.
Bitfone Corp., Written Opinion Mar. 26, 2006, PCT App. No. PCT/US2004/031547, 8 p.
Bitfone Corp., Written Opinion Jul. 20, 2005, PCT App. No. PCT/US2004/022598, 6 p.
Bitfone Corp., Written Opinion Dec. 4, 2005, PCT App. No. PCT/US2004/017731, 7 p.
Burns et al., "In-Place Reconstruction of Version Differences," IEEE Transactions on Knowledge and Data Engineering, Vo. 15. No. 4, Jul./Aug. 2003, pp. 973-984.
Ciancarini et al., "Using a Coordination Language to Specify and Analyze Systems Containing Modile Components," ACM Transactions, vol. 9. No. 2, Apr. 2000, pp. 167-198.
Claise et al., "IPFIX Protocol Specification", IPFIX Working Group, Jun. 2003, retrieved from: http://tools.ietf.org/html/draft-ietf-ipfix-protocol-00.
CRC Press LLC., "Overview of Cryptography," Copyright 1997 CRC Press LLC, 48 p.
Fasbender et al., "Any Network, Any Terminal, Anywhere," IEEE Personal Communications, Apr. 1999, pp. 22-30, IEEE Press. 1999.
Hadjiefthymiades et al., "ESW4: Enhanced Scheme for WWW Computing in Wireless Communication Environments," ACM SIGCOMM Computer Communication Review, vol. 29, Issue 5, pp. 24-35, ACM Press, Oct. 1999.
Hoffmeyer et al., "Radio Software Download for Commercial Wireless Reconfigurable Devices," IEEE Communications Magazine, IEEE Service Center, New York NY, US. vol. 42, No. 3, Mar. 2004, pp. S26-S32.
HPC, Int'l Search Report Sep. 5, 2007, PCT App. No. PCT/US2007/008415, 2 p.
HPDC, EP Office Action Jan. 22, 2010, EP App. No. 04701739.7, 7 p.
HPDC, EP Office Action Feb. 4, 2011, EP App. No. 07843502.1, 4 p.
HPDC, EP Office Action Feb. 9, 2011, EP App. No. 04759830.5, 3 p.
HPDC, EP Office Action Mar. 4, 2011, EP App. No. 07813468.1, 9 p.
HPDC, EP Office Action Mar. 23, 2010, EP App. No. 04705590.0, 10 p.
HPDC, EP Office Action Apr. 3, 2009, EP App. No. 04779823.6, 7 p.
HPDC, EP Office Action Apr. 11, 2008, EP App. No. 04759830.5, 5 p.
HPDC, EP Office Action Apr. 23, 2009, EP App. No. 04701739.7, 7 p.
HPDC, EP Office Action May 4, 2011, EP App. No. 04759830.5, 3 p.
HPDC, EP Office Action May 11, 2010, EP App. No. 03759224.3, 6 p.
HPDC, EP Office Action Jun. 3, 2009, EP App. No. 01991949.7, 7p.
HPDC, EP Office Action Jun. 03, 2009, EP App. No. 07798184.3, 5 p.
HPDC, EP Office Action Jul. 27, 2007, EP App. No. 07844241.5, 6 p.
HPDC, EP Office Action Aug. 12, 2011, EP App. No. 04759830.5. 56 p.
HPDC, EP Office Action Aug. 30, 2011, EP App. No. 04779823.6, 6 p.
HPDC, EP Office Action Sep. 2, 2010, EP App. No. 04759830.5, 4 p.
HPDC, EP Office Action Sep. 7, 2009, EP App. No. 07844241.5, 3 p.
HPDC, EP Office Action Sep. 18, 2009, EP App. No. 07843502.1, 2 p.
HPDC, EP Office Action Oct. 15, 2009, EP App. No. 04785067.2, 6 p.
HPDC, EP Office Action Oct. 27, 2009, EP App. No. 04782849.6, 3 p.
HPDC, EP Office Action Nov. 10, 2009, EP App. No. 07798184.3, 4 p.
HPDC, EP Office Action Feb. 23, 2010, EP App. No. 03789910.1, 5 p.
HPDC, EP Office Action Aug. 9, 2010, EP App. No. 03789910.1,.6 p.
HPDC, EP Office Action Oct. 19, 2009, EP App. No. 07813468.1, 10 p.
HPDC, EP Search Report Nov. 13, 2009, EP App. No. 04756990.0, 4 p.
HPDC, EP Search Report Nov. 24, 2008, EP App. No. 04779823.6, 3 p.
HPDC, EP Search Report Nov. 25, 2009, EP App. No. 04705590.0, 6 p.
HPDC EP Supp. Search Report Feb. 6, 2009, EP App. No. 004701739.7, 3 p.
HPDC, EP Supp. Search Report Jan. 26, 2010, EP App. No. 03759224.3, 3 p.
HPDC, EP Supp. Search Report Dec. 22, 2009, EP App. No. 03789910.1, 7 p.
HPDC, GB Office Action Feb. 25, 2011, GB App. No. 0910190.8, 6 p.
HPDC, GB Office Action Jul. 26, 2011, GB App. No. 0910190.8, 1 p.
HPDC, GB Office Action Sep. 20, 2011, GB App. No. 1007372.4, 3 p.
HPDC, GB Office Action Dec. 22, 2011, GB App. No. 1007372.4, 2 p.
HPDC, Int'l Prelim Rpt Jan. 6, 2009, PCT App. No. PCT/US2007/072493, 8 p.
HPDC, Int'l Prelim Rpt Jan. 13, 2009, PCT App. No. PCT/US2007/073340, 8 p.
HPDC, Int'l Prelim Rpt Jan. 27, 2009, PCT App. No. PCT/US2007/074586, 5 p.
HPDC, Int'l Prelim Rpt Feb. 17, 2009, PCT App. No. PCT/US2007/076001, 7 p.
HPDC, Int'l Prelim Rpt Feb. 17, 2009, PCT App. No. PCT/US2007/076006, 7 p.
HPDC, Int'l Prelim Rpt Mar. 3, 2009, PCT App. No. PCT/US2007/077288, 7 p.
HPDC, Int'l Prelim Rpt Mar. 17, 2009, PCT App. No. PCT/US2007/078326, 7 p.

(56) References Cited

OTHER PUBLICATIONS

HPDC, Int'l Prelim Rpt Apr. 7, 2009, PCT App. No. PCT/US2007/079920, 8 p.
HPDC, Int'l Prelim Rpt Apr. 20, 2010, PCT App. No. PCT/US2008/011824, 6 p.
HPDC, Int'l Prelim Rpt Apr. 22, 2009, PCT App. No. PCT/US2007/081273, 8 p.
HPDC, Int'l Prelim Rpt Jun. 3, 2009, PCT App. No. PCT/US2007/085903, 6 p.
HPDC, Int'l Prelim Rpt Sep. 30, 2008, PCT App. No. PCT/US2007/008415, 7 p.
HPDC, Int'l Search Report Jan. 31, 2008, PCT App. No. PCT/US2007/076001, 3 p.
HPDC, Int'l Search Report Feb. 14, 2008, PCT App. No. PCT/US2007/072493, 5 p.
HPDC, Int'l Search Report Mar. 25, 2009, PCT App. No. PCT/US2008/011824, 2p.
HPDC, Int'l Search Report Mar. 27, 2008, PCT App. No. PCT/US2007/079920, 3 p.
HPDC, KR Office Action Nov. 11, 2009, KR App. No. 10-2009-7005363, 2 p.
HPDC, Written Opinion Apr. 17, 2010, PCT App. No. PCT/US2008/011824, 4 p.
IBM, "System Firmware Update Method Before Rebooting the Operating System," Research Disclosure, Mason Publications, vol. 425, No. Sep. 1, 2009, 2 p.
Jing et al., "Client Server Computing in Mobile Environments," ACM Computing Surveys, vol. 31, No. 2, Jun. 1999, pp. 117-157.
Jones, F., "Jambala-Intelligence beyond digital wireless," Ericsson Review No. 3, 1998, pp. 126-131.
Klein et al., "Compressed Delta Encoding for LZSS Encoded Files," 2007 Data Compression Conference (DCC'07) IEEE Computer Society, 10 p.
Koenig et al., "Re: ext2—available+used not equal to total," Dec. 31, 1998, accessed on Oct. 9, 2007 from <http://www.uwsg.iu.edu/hypermail/linux/kernel/9901.0/0270.html>, Linux Kernel Archive, 2 p.
Lindholm et al., "Fast and Simple XML Tree Dfferencing by Sequence Alignment," DocEng '06, Oct. 10-13, 2006, Amsterdam, The Netherlands, Copyright 2006 ACM, pp. 75-84.
Memorymanagement.org, http://web.archive.org/web/20020313115607/http://www.memorymanagement.org/glossary, 3 p. 2003.
Meng et al., "Schema-Guided Wrapper Maintenance for Web-Data Extraction," WIDM'03, Nov. 7-8, 2003, pp. 1-8.
Meyers, W. J., "Design of a Microcode Link Editor," Proceedings of the 13th Annual Workshop on Microprogramming, pp. 165-170, 1980 IEEE.
Microsoft, "Computer Dictionary," Microsoft Press, 2002, pp. 372, 373, 380, 423 and 565.
Oommen, P., "A Framework for Integrated Management of Mobile-Stations Over-the-Air," Integrated Network Management Proceedings, 2001 IEEE/IFIP International Symposium on May 14-18, 2001, pp. 247-256.
Oommen, P., "Over the Air Handset Management," Emerging Technologies Symposium; Broadband, Wireless Internet Access, 2000 IEEE Apr. 10-11, 2000, 4 p.
Open Mobile Alliance, "Device Management Protocol, Candidate," Ver 1.2, Jun. 2, 2006.
Open Mobile Alliance, "Generic Content Download Over the Air Specification," Version 1.0, Sep. 12, 2002, 42 p.
Pant et al., Software Reliability Predictions for Distributed Software, IEEE, 1998, pp. 11-21.
Park et al., "A Low-cost Memory Architecture with NAND XIP for Mobile Embedded Systems," Codes+ISSS'03, Oct. 1-3, 2003, pp. 138-143.
Pedram, M., "Power Optimization and Management in Embedded Systems," Jan. 2001, pp. 239-244.
Peymandoust et al., "Low Power Embedded Software Optimization Using Symbolic Algebra," Mar. 2002, pp. 1-7.
Raskar et al., "Image Fusion for Context Enhancement and Video Surrealism," Proceedings of the Third Int'l. Symposium on Non-Photorealistic Animation and Rendering (NPAR2004), Jun. 7-9, 2004, 9 p.
Satoh et al., Experiment of Component-Based Software Development on Multiple Distributed Object Environments, IEEE, 1998, 8 p.
Sevanto et al., "Introducing Quality-of-Service and Traffic Classes into Wireless Mobile Networks," WOWMOM 98 Dallas, Texas, USA, Copyright ACM 1998 pp. 21-30.
Symborski, C. W., "Updating Softwaare and Configuration Data in a Distributed Communications Nev.'Vork". 1988 Computer NetworKing Symposium, 8 p.
Varshney et al., "Emerging Mobile and Wireless Networks," Communications of the ACM Jun. 2000, vol. 43, No. 6, pp. 73-81.
W3C, XML Signature Syntax and Processing, (2nd edition), Jun. 10, 2008, 1 p. [Online] http://www.w3.org/TR/xmldsig-core/.
White, Ron, "How Computers Work," Millennium Ed., Que Corporation, Indianapolis, IN, 1999, 284 p.
Yergeau, F., "UTF-8, a transformation format of ISO 10646," Jan. 1998, Alis Technologies, 10 p.
Yoshimura et al., "Mobile Streaming Media CDN Enabled by Dynamic SMIL," WWW2003, May 7-11, 2002, Honolulu, Hawaii, ACM, pp. 651-661.
Wheatley, Office Action Dec. 27, 2011, U.S. Appl. No. 12/057,044, Mar. 27, 2008, 6 p.
Rao, Office Action Nov. 14, 2008, U.S. Appl. No. 11/057,361, Feb. 14, 2005, 8 p.
Insun, Office Action Feb. 3, 2010, U.S. Appl. No. 11/111,276, Apr. 21, 2005, 10 p.
Insun, Office Action Jul. 12, 2010, U.S. Appl. No. 11/111,276, Apr. 21, 2005, 11 p.
Iyad, Office Action Jan. 28, 2008, U.S. Appl. No. 11/100,305, Apr. 6, 2005, 20 p.
Iyad, Final Office Action Jul. 22, 2008, U.S. Appl. No. 11/100,305, Apr. 6, 2005, 11 p.
Iyad, Office Action Jan. 21, 2009, U.S. Appl. No. 11/100,305, Apr. 6, 2005, 7 p.
Iyad, Final Office Action Jul. 8, 2009, U.S. Appl. No. 11/100,305, filed Apr. 6, 2005, 25 p.
Shao-Chun, Office Action Dec. 11, 2008, U.S. Appl. No. 11/120,556, filed May 3, 2005, 28 p.
Shao-Chun, Final Office Action May 26, 2009, U.S. Appl. No. 11/120,556, filed May 3, 2005, 30 p.
Shao-Chun, Office Action Oct. 28, 2009, U.S. Appl. No. 11/120,556, filed May 3, 2005, 31 p.
Shao-Chun, Final Office Action May 13, 2010, U.S. Appl. No. 11/120,556, filed May 3, 2005 32 p.
Shao-Chun, Office Action Nov. 29, 2010, U.S. Appl. No. 11/120,556, filed May 3, 2005, 26 p.
Shao-Chun, Office Action Oct. 29, 2008, U.S. Appl. No. 11/124,866, filed May 9, 2005, 13 p.
Shao-Chun, Office Action May 5, 2009, U.S. Appl. No. 11/124,866, filed May 9, 2005, 14 p.
Shao-Chun, Office Action Nov. 12, 2008, U.S. Appl. No. 11/144,537, filed Jun. 3, 2005, 16 p.
Shao-Chun, Final Office Action Apr. 29, 2009, U.S. Appl. No. 11/144,537, filed Apr. 3, 2005, 22 p.
Sunil, Office Action Aug. 20, 2008, U.S. Appl. No. 11/189,344, filed Jul. 26, 2005, 12 p.
Sunil, Final Office Action Feb. 19, 2009, U.S. Appl. No. 11/189,344, filed Jul. 26, 2005, 13 p.
Sunil, Office Action Aug. 19, 2009, U.S. Appl. No. 11/189,344, filed Jul. 26, 2005, 10 p.
Sunil, Office Action Sep. 4, 2008, U.S. Appl. No. 11/226,032, filed Sep. 14, 2005, 17 p.
Sunil, Final Office Action Jul. 6, 2009, U.S. Appl. No. 11/226,032, filed Sep. 14, 2005, 17 p.
Sunil, Office Action Dec. 14, 2009, U.S. Appl. No. 11/226,032, filed Sep. 14, 2005, 23 p.
Sunil, Final Office Action Apr. 29, 2010, U.S. Appl. No. 11/226,032, filed Sep. 14, 2005, 16 p.
Rao, Office Action Aug. 21, 2009, U.S. Appl. No. 11/247,463, filed Oct. 11, 2005, 18 p.

(56) References Cited

OTHER PUBLICATIONS

Rao, Final Office Action Jul. 13, 2010, U.S. Appl. No. 11/247,463, filed Oct. 11, 2005, 19 p.
Rao, Office Action Mar. 8, 2011, U.S. Appl. No. 11/247,463, filed Oct. 11, 2005, 20 p.
Rao, Final Office Action Aug. 30, 2011, U.S. Appl. No. 11/247,463, filed Oct. 11, 2005, 20 p.
Shao-Chun, Office Action Jul. 8, 2009, U.S. Appl. No. 11/316,291, filed Dec. 21, 2005, 18 p.
Shao-Chun, Final Office Action Dec. 2, 2009, U.S. Appl. No. 11/316,291, filed Dec. 21, 2005, 18 p.
Giovanni, Office Action Jul. 8, 2009, U.S. Appl. No. 11/316,292, filed Dec. 21, 2005, 8 p.
Giovanni, Office Action Jan. 25, 2010, U.S. Appl. No. 11/316,292, filed Dec. 21, 2005, 7 p.
Shao-Chun, Office Action May 27, 2009, U.S. Appl. No. 11/352,813, filed Feb. 13, 2006, 31 p.
Sunil, Office Action Jun. 10, 2008, U.S. Appl. No. 11/352,702, filed Feb. 13, 2006, 8 p.
Sunil, Final Office Action Mar. 30, 2009, U.S. Appl. No. 11/352,702, filed Feb. 13, 2006, 11 p.
Sunil, Office Action Sep. 28, 2009, U.S. Appl. No. 11/352,702, filed Feb. 13, 2006, 9 p.
Sunil, Final Office Action Mar. 16, 2010, U.S. Appl. No. 11/352,702, filed Feb. 13, 2006, 11 p.
Rao, Office Action Feb. 17, 2009, U.S. Appl. No. 11/374,481, filed Mar. 9, 2006, 17 p.
Rao, Final Office Action Jul. 21, 2009, U.S. Appl. No. 11/374,481, filed Mar. 9, 2006, 18 p.
Rao, Office Action Jan. 4, 2010, U.S. Appl. No. 11/374,481, filed Mar. 9, 2006, 10 p.
Jason, Office Action Oct. 16, 2008, U.S. Appl. No. 11/369,561, filed Mar. 7, 2006, 13 p.
Jason, Final Office Action May 8, 2009, U.S. Appl. No. 11/369,561, filed Mar. 7, 2006, 14 p.
Rao, Office Action Mar. 12, 2009, U.S. Appl. No. 11/385,162, filed Mar. 21, 2006, 6 p.
Rao, Office Action Sep. 25, 2009, U.S. Appl. No. 11/385,162, filed Mar. 21, 2006, 8 p.
Rao, Final Office Action May 4, 2010, U.S. Appl. No. 11/385,162, filed Mar. 21, 2006, 8 p.
Sunil, Office Action Nov. 13, 2008, U.S. Appl. No. 11/189,944, filed Jul. 26, 2005, 19 p.
Sunil, Final Office Action Apr. 27, 2009, U.S. Appl. No. 11/189,944, filed Jul. 26, 2005, 21 p.
Glenn, Office Action May 29, 2009, U.S. Appl. No. 11/478,108, filed Jun. 28, 2006, 19 p.
Glenn, Office Action Dec. 18, 2009, U.S. Appl. No. 11/478,108, filed Jun. 28, 2006, 17 p.
Glenn, Final Office Action Apr. 27, 2010, U.S. Appl. No. 11/478,108, filed Jun. 28, 2006, 17 p.
Glenn, Office Action Sep. 2, 2010, U.S. Appl. No. 11/478,108, filed Jun. 28, 2006, 21 p.
Glenn, Office Action Dec. 29, 2010, U.S. Appl. No. 11/478,108, filed Jun. 28, 2006, 16 p.
Rao, Office Action Apr. 6, 2010, U.S. Appl. No. 11/397,187, filed Apr. 4, 2006, 12 p.
Giovanni, Office Action May 26, 2010, U.S. Appl. No. 11/500,754, filed Aug. 7, 2006, 12 p.
Giovanni, Final Office Action Sep. 2, 2010, U.S. Appl. No. 11/500,754, filed Aug. 7, 2006, 17 p.
Uma, Office Action Oct. 6, 2009, U.S. Appl. No. 11/707,505, filed Feb. 16, 2007, 16 p.
Uma, Final Office Action Mar. 8, 2010, U.S. Appl. No. 11/707,505, filed Feb. 16, 2007 17 p.
Uma, Office Action Dec. 10, 2010, U.S. Appl. No. 11/707,505, filed Feb. 16, 2007 12 p.
Sunil, Office Action Oct. 7, 2010, U.S. Appl. No. 11/824,344, filed Jun. 29, 2007, 7 p.
Marko, Office Action Apr. 6, 2009, U.S. Appl. No. 11/732,267, filed Apr. 2, 2007, 23 p.
Marko, Final Office Action Oct. 19, 2009, U.S. Appl. No. 11/732,267, filed Apr. 2, 2007, 10 p.
Rao, Office Action Oct. 19, 2009, U.S. Appl. No. 11/799,586, filed May 2, 2007, 18 p.
Rao, Final Office Action Mar. 8, 2010, U.S. Appl. No. 11/799,586, filed May 2, 2007, 18 p.
Rao, Office Action Aug. 18, 2010, U.S. Appl. No. 11/799,586, filed May 2, 2007, 19 p.
Rao, Office Action Mar. 21, 2008, U.S. Appl. No. 11/728,517, filed Mar. 26, 2007, 17 p.
Rao, Office Action Oct. 20, 2008, U.S. Appl. No. 11/728,517, filed Mar. 26, 2007, 21 p.
Rao, Office Action Apr. 13, 2009, U.S. Appl. No. 11/728,517, filed Mar. 26, 2007, 23 p.
Rao, Office Action Dec. 3, 2009, U.S. Appl. No. 11/728,517, filed Mar. 26, 2007, 19 p.
Rao, Final Office Action Jun. 24, 1970, U.S. Appl. No. 11/728,517, filed Mar. 26, 2007, 25 p.
Marolia, Office Action Jul. 28, 2009, U.S. Appl. No. 11/827,583, filed Jul. 12, 2007, 18 p.
Rao, Office Action Jun. 16, 2009, U.S. Appl. No. 11/839,143, filed Aug. 15, 2007, 11 p.
Rao, Final Office Action Jan. 8, 2010, U.S. Appl. No. 11/839,143, filed Aug. 15, 2007, 15 p.
Rao, Office Action Aug. 4, 2010, U.S. Appl. No. 11/839,143, filed Aug. 15, 2007, 16 p.
Rao, Final Office Action Oct. 5, 2011, U.S. Appl. No. 11/839,143, filed Aug. 15, 2007, 20 p.
Rao, Office Action May 13, 2011, U.S. Appl. No. 11/839,143, filed Aug. 15, 2007, 17 p.
Rao, Final Office Action Aug. 23, 2011, U.S. Appl. No. 11/839,143, filed Aug. 15, 2007, 17 p.
Rao, Office Action Sep. 17, 2009, U.S. Appl. No. 11/847,658, filed Aug. 30, 2007, 10 p.
Rao, Office Action Mar. 25, 2010, U.S. Appl. No. 11/847,658, filed Aug. 30, 2007, 11 p.
Rao, Office Action Aug. 25, 2010, U.S. Appl. No. 11/847,658, Aug. 30, 2007, 13 p.
Rao, Office Action Nov. 18, 2010, U.S. Appl. No. 11/847,658, filed Aug. 30, 2007, 11 p.
Rao, Office Action Aug. 24, 2010, U.S. Appl. No. 11/854,414, filed Sep. 12, 2007, 14 p.
Rao, Office Action Nov. 17, 2009, U.S. Appl. No. 11/947,322, filed Nov. 29, 2007, 15 p.
Rao, Final Office Action May 14, 2010, U.S. Appl. No. 11/947,322, filed Nov. 29, 2011, 22 p.
Rao, Office Action Dec. 27, 2010, U.S. Appl. No. 11/947,322, filed Nov. 29, 2007, 43 p.
Rao, Final Office Action May 26, 2011, U.S. Appl. No. 11/947,322, filed Nov. 29, 2007, 40 p.
Rao, Office Action Jan. 9, 2012, U.S. Appl. No. 11/947,322, filed Nov. 29, 2007, 40 p.
Brunet, Office Action Jan. 25, 2006, U.S. Appl. No. 10/822,092, filed Apr. 9, 2004, 14 p.
Brunet, Final Office Action Aug. 23, 2006, U.S. Appl. No. 10/822,092, filed Apr. 9, 2004, 13 p.
Brunet, Office Action Feb. 22, 2007, U.S. Appl. No. 10/822,092, filed Apr. 9, 2004, 19 p.
Brunet, Final Office Action Nov. 15, 2007, U.S. Appl. No. 10/822,092, filed Apr. 9, 2004, 22 p.
Brunet, Office Action Apr. 4, 2008, U.S. Appl. No. 10/822,092, filed Apr. 9, 2004, 27 p.
Brunet, Final Office Action Sep. 23, 2008, U.S. Appl. No. 10/822,092, filed Apr. 9, 2004, 28 p.
Brunet, Office Action Mar. 8, 2007, U.S. Appl. No. 10/889,693, filed Jul. 12, 2004, 17 p.
Brunet, Final Office Action Nov. 28, 2007, U.S. Appl. No. 10/889,693, filed Jul. 12, 2004, 19 p.
Brunet, Office Action Jun. 25, 2004, U.S. Appl. No. 10/889,693, filed Jul. 12, 2004, 69 p.

(56) References Cited

OTHER PUBLICATIONS

Brunet, Final Office Action Dec. 23, 2008, U.S. Appl. No. 10/889,693, filed Jul. 12, 2004, 23 p.
Brunet, Office Action Jun. 29, 2006, U.S. Appl. No. 10/999,606, filed Nov. 29, 2004, 9 p.
Brunet, Final Office Action Mar. 7, 2007, U.S. Appl. No. 10/999,606, filed Nov. 29, 2004, 10 p.
Brunet, Office Action Apr. 18, 2008, U.S. Appl. No. 10/999,606, filed Nov. 29, 2004, 6 p.
Brunet, Office Action Apr. 24, 2009, U.S. Appl. No. 10/999,606, filed Nov. 29, 2004, 12 p.
Brunet, Final Office Action Aug. 29, 2009, U.S. Appl. No. 10/999,606, filed Nov. 29, 2004, 16 p.
Brunet, Office Action Nov. 10, 2009, U.S. Appl. No. 10/999,606, filed Nov. 29, 2004, 16 p.
Brunet, Final Office Action Feb. 18, 2010, U.S. Appl. No. 10/999,606, filed Nov. 29, 2004, 16 p.
Shao-Chun, Office Action Jun. 6, 2007, U.S. Appl. No. 11/125,974, filed May 9, 2005, 9 p.
Shao-Chun, Office Action Jan. 17, 2008, U.S. Appl. No. 11/125,974, filed May 9, 2005, 9 p.
Shao-Chun, Final Office Action Aug. 18, 2008, U.S. Appl. No. 11/125,974, filed May 9, 2005, 13 p.
Jeffrey, Office Action Jul. 26, 2006, U.S. Appl. No. 11/247,459, filed Oct. 11, 2005, 9 p.
Jeffrey, Office Action May 15, 2007, U.S. Appl. No. 11/247,459, filed Oct. 11, 2005, 10 p.
Jeffrey, Office Action Oct. 31, 2007, U.S. Appl. No. 11/247,459, filed Oct. 11, 2005, 26 p.
O'Neill, Office Action Aug. 25, 2006, U.S. Appl. No. 10/311,462, filed May 13, 2003, 24 p.
O'Neill, Office Action Mar. 5, 2010, U.S. Appl. No. 10/311,462, filed May 13, 2005, 23 p.
O'Neill, Final Office Action Jul. 23, 2010, U.S. Appl. No. 10/311,462, filed May 13, 2003, 24 p.
O'Neill, Office Action Nov. 18, 2009, U.S. Appl. No. 11/335,312, filed Jan. 19, 2006, 12 p.
O'Neill, Office Action Mar. 12, 2004, U.S. Appl. No. 10/404,601, filed Apr. 1, 2003, 28 p.
Shao-Chun, Final Office Action Jul. 25, 2006, U.S. Appl. No. 10/411,784, filed Apr. 11, 2003, 22 p.
Shao-Chun, Office Action Mar. 27, 2007, U.S. Appl. No. 10/411,784, filed Apr. 11, 2003, 16 p.
Shao-Chun, Final Office Action Oct. 18, 2007, U.S. Appl. No. 10/411,784, filed Apr. 11, 2003, 15 p.
Rao, Examiner's Answer Dec. 6, 2011, U.S. Appl. No. 11/427,635, filed Jan. 24, 2005, 19 p.
Rao, Final Office Action Jun. 10, 2011, U.S. Appl. No. 11/427,635, filed Jan. 24, 2005, 18 p.
Rao, Office Action Dec. 27, 2010, U.S. Appl. No. 11/427,635, filed Jan. 24, 2005, 13 p.
Rao, Office Action Mar. 31, 2010, U.S. Appl. No. 11/427,635, filed Jan. 24, 2005, 14 p.
Rao, Office Action Oct. 15, 2009, U.S. Appl. No. 11/427,635, filed Jan. 24, 2005, 11 p.
Rao, Final Office Action Apr. 30, 2009, U.S. Appl. No. 11/427,635, filed Jan. 24, 2005, 13 p.
Rao, Office Action Nov. 26, 2008, U.S. Appl. No. 11/427,635, filed Jan. 24, 2005, 15 p.
Rao, Examiner's Answer Mar. 16, 2011, U.S. Appl. No. 11/043,813, filed Jan. 26, 2005, 16 p.
Rao, Final Office Action Aug. 20, 2010, U.S. Appl. No. 11/043,813, filed Jan. 26, 2005, 16 p.
Rao, Office Action Mar. 9, 2010, U.S. Appl. No. 11/043,813, filed Jan. 26, 2005, 14 p.
Rao, Final Office Action Nov. 13, 2009, U.S. Appl. No. 11/043,813, filed Jan. 26, 2005, 15 p.
Rao, Office Action Mar. 30, 2009, U.S. Appl. No. 11/043,813, filed Jan. 26, 2005, 11 p.
Rao, Office Action Oct. 3, 2008, U.S. Appl. No. 11/043,813, filed Jan. 26, 2005, 23 p.
Chen, Examiner's Answer Aug. 16, 2012, U.S. Appl. No. 11/099,870, filed Apr. 6, 2005, 12 p.
Chen, Final Office Action Dec. 23, 2011, U.S. Appl. No. 11/099,870, filed Apr. 6, 2005, 12 p.
Chen, Office Action Jul. 6, 2011, U.S. Appl. No. 11/099,870, filed Apr. 6, 2005, 13 p.
Chen, Final Office Action Nov. 26, 2010, U.S. Appl. No. 11/099,870, filed Apr. 6, 2005, 9 p.
Chen, Office Action Jun. 24, 2010, U.S. Appl. No. 11/099,870, filed Apr. 6, 2005, 7 p.
Chen, Office Action Nov. 30, 2009, U.S. Appl. No. 11/099,870, filed Apr. 6, 2005, 8 p.
Chen, Final Office Action Apr. 14, 2009, U.S. Appl. No. 11/099,870, filed Apr. 6, 2005, 19 p.
Chen, Office Action Sep. 24, 2008, U.S. Appl. No. 11/099,870, filed Apr. 6, 2005, 7 p.
Chen, Office Action Apr. 25, 2008, U.S. Appl. No. 11/099,870, filed Apr. 6, 2005, 5 p.
Chen, Final Office Action Oct. 11, 2007, U.S. Appl. No. 11/099,870, filed Apr. 6, 2005, 16 p.
Chen, Office Action Aug. 24, 2006, U.S. Appl. No. 11/099,870, filed Apr. 6, 2005, 15 p.
Zhu, Examiner's Answer Apr. 16, 2012, U.S. Appl. No. 11/386,560, filed Mar. 22, 2006, 9 p.
Zhu, Final Office Action Feb. 16, 2012, U.S. Appl. No. 11/386,560, filed Mar. 22, 2006, 23 p.
Zhu, Office Action Sep. 30, 2011, U.S. Appl. No. 11/386,560, filed Mar. 22, 2006, 19 p.
Zhu, Final Office Action Mar. 3, 2011, U.S. Appl. No. 11/386,560, filed Mar. 22, 2006, 24 p.
Zhu, Office Action Sep. 15, 2010, U.S. Appl. No. 11/386,560, filed Mar. 22, 2006, 21 p.
Zhu, Office Action Mar. 31, 2010, U.S. Appl. No. 11/386,560, filed Mar. 22, 2006, 17 p.
Chen, Decision on Appeal Jun. 29, 2012, U.S. Appl. No. 11/637,550, filed Dec. 12, 2006, 9 p.
Chen, Examiner's Answer Mar. 30, 2009, U.S. Appl. No. 11/637,550, filed Dec. 12, 2006, 18 p.
Chen, Final Office Action May 22, 2008, U.S. Appl. No. 11/637,550, filed Dec. 12, 2008, 18 p.
Chen, Office Action Oct. 5, 2007, U.S. Appl. No. 11/637,550, filed Dec. 12, 2006, 20 p.
Chen, Final Office Action Jul. 27, 2012, U.S. Appl. No. 12/057,067, filed Mar. 27, 2008, 20 p.
Chen, Office Action Feb. 2, 2012, U.S. Appl. No. 12/057,067, filed Mar. 27, 2008, 18 p.
Chen, Final Office Action Jul. 28, 2011, U.S. Appl. No. 12/057,067, filed Mar. 27, 2008, 17 p.
Chen, Office Action Feb. 16, 2011, U.S. Appl. No. 12/057,067, filed Mar. 27, 2008, 22 p.
O'Neill, Final Office Action Jul. 17, 2012, U.S. Appl. No. 10/411,835, filed Apr. 11, 2003, 32 p.
O'Neill, Office Action Feb. 10, 2012, U.S. Appl. No. 10/411,835, filed Apr. 11, 2003, 26 p.
O'Neill, Advisory Action Jul. 29, 2011, U.S. Appl. No. 10/411,835, filed Apr. 11, 2003, 3 p.
O'Neill, Advisory Action Jun. 28, 2011, U.S. Appl. No. 10/411,835, filed Apr. 11, 2003, 3 p.
O'Neill, Final Office Action Apr. 11, 2011, U.S. Appl. No. 10/411,835, filed Apr. 11, 2003, 29 p.
O'Neill, Office Action Nov. 8, 2010, U.S. Appl. No. 10/411,835, filed Apr. 11, 2003, 26 p.
O'Neill, Office Action Aug. 26, 2009, U.S. Appl. No. 10/411,835, Apr. 11, 2003, 25 p.
Chen, Notice of Allowance Aug. 31, 2012, U.S. Appl. No. 10/412,045, filed Apr. 11, 2003, 10 p.
Chen, Final Office Action Jan. 25, 2012, U.S. Appl. No. 10/412,045, filed Apr. 11, 2003, 18 p.
Chen, Office Action Aug. 3, 2011, U.S. Appl. No. 10/412,045, filed Apr. 11, 2003, 18 p.

(56) References Cited

OTHER PUBLICATIONS

Chen, Final Office Action Apr. 19, 2010, U.S. Appl. No. 10/412,045, filed Apr. 11, 2003, 25 p.
Chen, Office Action Aug. 26, 2009, U.S. Appl. No. 10/412,045, filed Apr. 11, 2003, 17 p.
O'Neill, Office Action Jul. 23, 2012, U.S. Appl. No. 12/636,600, filed Dec. 11, 2009, 17 p.
Rao, Examiner's Answer May 26, 2011, U.S. Appl. No. 11/637,435, filed Dec. 12, 2006, 20 p.
Rao, Final Office Action Sep. 15, 2010, U.S. Appl. No. 11/637,435, filed Dec. 12, 2006, 15 p.
Rao, Office Action Sep. 10, 2009, U.S. Appl. No. 11/637,435, filed Dec. 12, 2006, 16 p.
Rao, Final Office Action Mar. 17, 2009, U.S. Appl. No. 11/637,435, filed Dec. 12, 2006, 15 p.
Rao, Office Action Sep. 22, 2008, U.S. Appl. No. 11/637,435, filed Dec. 12, 2006, 14 p.
Rao, Decision on Appeal Jun. 29, 2012, U.S. Appl. No. 10/706,362, filed Nov. 12, 2003, 6 p.
Rao, Examiner Answer Oct. 30, 2009, U.S. Appl. No. 10/706,362, filed Nov. 12, 2003, 24 p.
Rao, Final Office Action Apr. 15, 2009, U.S. Appl. No. 10/706,362, filed Nov. 12, 2003, 20 p.
Rao, Office Action Oct. 1, 2008, U.S. Appl. No. 10/706,362, filed Nov. 12, 2003, 19 p.
Rao, Office Action Jan. 9, 2008, U.S. Appl. No. 10/706,362, filed Nov. 12, 2003, 16 p.
Rao, Office Action Jul. 31, 2007, U.S. Appl. No. 10/706,362, filed Nov. 12, 2003, 17 p.
Rao, Office Action Dec. 5, 2006, U.S. Appl. No. 10/706,362, filed Nov. 12, 2003, 15 p.
McGhee, Decision on Appeal Jun. 6, 2012, U.S. Appl. No. 10/774,027, filed Feb. 6, 2004, 8 p.
McGhee, Examiner's Answer Oct. 30, 2009, U.S. Appl. No. 10/774,027, filed Feb. 6, 2004, 31 p.
McGhee, Final Office Action Apr. 24, 2009, U.S. Appl. No. 10/774,027, filed Feb. 6, 2004, 23 p.
McGhee, Office Action Oct. 15, 2008, U.S. Appl. No. 10/774,027, filed Feb. 6, 2004, 25 p.
McGhee, Office Action Mar. 4, 2008, U.S. Appl. No. 10/774,027, Feb. 6, 2004, 26 p.
Yang, Corrected Examiner's Answer Nov. 21, 2011, U.S. Appl. No. 12/030,757, filed Feb. 13, 2008, 2 p.
Yang, Examiner's Answer Nov. 10, 2011, U.S. Appl. No. 12/030,757, filed Feb. 13, 2008, 19 p.
Yang, Advisory Action Sep. 29, 2011, U.S. Appl. No. 12/030,757, filed Feb. 13, 2008, 3 p.
Yang, Final Office Action Jul. 14, 2011, U.S. Appl. No. 12/030,757, Feb. 13, 2008, 17 p.
Yang, Office Action Mar. 9, 2011, U.S. Appl. No. 12/030,757, filed Feb. 13, 2008, 33 p.
Rao, Final Office Action Nov. 20, 2012, U.S. Appl. No. 10/909,550, filed Aug. 2, 2004, 20 p.
Rao, Office Action Jun. 19, 2012, U.S. Appl. No. 10/909,550, filed Aug. 2, 2004, 24 p.
Rao, Advisory Action Oct. 8, 2010, U.S. Appl. No. 10/909,550, filed Aug. 2, 2004, 3 p.
Rao, Advisory Action Sep. 1, 2010, U.S. Appl. No. 10/909,550, Aug. 2, 2004, 3 p.
Rao, Final Office Action Jun. 3, 2010, U.S. Appl. No. 10/909,550, Aug. 2, 2004, 26 p.
Rao, Office Action Nov. 27, 2009, U.S. Appl. No. 10/909,550, filed Aug. 2, 2004, 17 p.
Rao, Office Action Jun. 23, 2009, U.S. Appl. No. 10/909,550, filed Aug. 2, 2004, 7 p.
Rao, Final Office Action Sep. 25, 2008, U.S. Appl. No. 10/909,550, filed Aug. 2, 2004, 19 p.
Rao, Office Action Apr. 23, 2008, U.S. Appl. No. 10/909,550, filed Aug. 2, 2004, 29 p.
Chia, Notice of Allowance May 31, 2012, U.S. Appl. No. 10/943,455, filed Sep. 17, 2004, 11 p.
Chia, Final Office Action Dec. 8, 2011, U.S. Appl. No. 10/943,455, filed Sep. 17, 2004, 23 p.
Chia, Office Action Jun. 22, 2010, U.S. Appl. No. 10/943,455, filed Sep. 17, 2004, 34 p.
Chia, Office Action Jan. 7, 2010, U.S. Appl. No. 10/943,455, filed Sep. 17, 2004, 21 p.
Chia, Office Action Jun. 11, 2009, U.S. Appl. No. 10/943,455, filed Sep. 17, 2004, 18 p.
Chia, Final Office Action Dec. 24, 2008, U.S. Appl. No. 10/943,455, filed Sep. 17, 2004, 17 p.
Chia, Office Action Mar. 21, 2008, U.S. Appl. No. 10/943,455, filed Sep. 17, 2004, 22 p.
Wang, Examiner's Answer Aug. 19, 2011, U.S. Appl. No. 11/183,199, filed Jul. 15, 2005, 23 p.
Wang, Advisory Action Feb. 23, 2011, U.S. Appl. No. 11/183,199, filed Jul. 15, 2005, 2 p.
Wang, Final Office Action Nov. 1, 2010, U.S. Appl. No. 11/183,199, filed Jul. 15, 2005, 19 p.
Wang, Office Action Apr. 28, 2010, U.S. Appl. No. 11/183,199, filed Jul. 15, 2005, 17 p.
Wang, Final Office Action Aug. 17, 2009, U.S. Appl. No. 11/183,199, filed Jul. 15, 2005, 16 p.
Wang, Office Action Feb. 13, 2009, U.S. Appl. No. 11/183,199, filed Jul. 15, 2005, 16 p.
Wang, Interview Summary Feb. 5, 2009, U.S. Appl. No. 11/183,199, filed Jul. 15, 2005, 2 p.
Wang, Final Office Action Oct. 28, 2008, U.S. Appl. No. 11/183,199, filed Jul. 15, 2005, 19 p.
Wang, Office Action Apr. 17, 2008, U.S. Appl. No. 11/183,199, filed Jul. 15, 2005, 41 p.
Wang, Final Office Action Oct. 9, 2007, U.S. Appl. No. 11/183,199, filed Jul. 15, 2005, 13 p.
Wang, Office Action Jan. 9, 2007, U.S. Appl. No. 11/183,199, filed Jul. 15, 2005, 15 p.
Randall, Examiner's Answer Jun. 9, 2010, U.S. Appl. No. 10/955,021, filed Sep. 30, 2004, 22 p.
Randall, Final Office Action Nov. 6, 2009, U.S. Appl. No. 10/955,021, filed Sep. 30, 2004, 25 p.
Randall, Office Action Apr. 1, 2009, U.S. Appl. No. 10/955,021, filed Sep. 30, 2004, 16 p.
Randall, Office Action Oct. 17, 2008, U.S. Appl. No. 10/955,021, filed Sep. 30, 2004, 16 p.
Randall, Office Action May 1, 2008, U.S. Appl. No. 10/955,021, filed Sep. 30, 2004, 18 p.
Daley, Corrected Examiner's Answer Nov. 1, 2011, U.S. Appl. No. 11/039,000, filed Jan. 18, 2005, 2 p.
Daley, Examiner's Answer Oct. 24, 2011, U.S. Appl. No. 11/039,000, filed Jan. 18, 2005, 20 p.
Daley, Final Office Action Feb. 17, 2011, U.S. Appl. No. 11/039,000, filed Jan. 18, 2005, 15 p.
Daley, Office Action Aug. 30, 2010, U.S. Appl. No. 11/039,000, filed Jan. 18, 2005, 15 p.
Daley, Final Office Action Nov. 27, 2009, U.S. Appl. No. 11/039,000, filed Jan. 18, 2005, 14 p.
Daley, Office Action May 28, 2009, U.S. Appl. No. 11/039,000, filed Jan. 18, 2005, 13 p.
Daley, Final Office Action Dec. 3, 2008, U.S. Appl. No. 11/039,000, filed Jan. 18, 2005, 15 p.
Daley, Office Action Jun. 5, 2008, U.S. Appl. No. 11/039,000, filed Jan. 18, 2005, 25 p.
Kapadekar, Examiner's Answer Mar. 2, 2011, U.S. Appl. No. 11/552,942, filed Dec. 25, 2006, 18 p.
Kapadekar, Final Office Action Jun. 11, 2010, U.S. Appl. No. 11/552,942, filed Oct. 25, 2006, 17 p.
Kapadekar, Office Action Oct. 30, 2009, U.S. Appl. No. 11/552,942, filed Oct. 25, 2006, 15 p.
Kapadekar, Final Office Action Jul. 24, 2009, U.S. Appl. No. 11/552,942, filed Oct. 25, 2006, 12 p.
Kapadekar, Office Action Jan. 14, 2009, U.S. Appl. No. 11/552,942, filed Oct. 25, 2008, 8 p.

(56) References Cited

OTHER PUBLICATIONS

Logan, Examiner's Answer Jul. 28, 2011, U.S. Appl. No. 11/500,734, filed Aug. 7, 2006, 2 p.
Logan, Examiner's Answer Jun. 28, 2011, U.S. Appl. No. 11/500,734, filed Aug. 7, 2006, 25 p.
Logan, Advisory Action Feb. 17, 2011, U.S. Appl. No. 11/500,734, filed Aug. 7, 2006, 2 p.
Logan, Office Action Sep. 29, 2010, U.S. Appl. No. 11/500,734, filed Aug. 7, 2006, 24 p.
Logan, Office Action Apr. 27, 2010, U.S. Appl. No. 11/500,734, filed Aug. 7, 2006, 23 p.
Logan, Final Office Action Dec. 14, 2009, U.S. Appl. No. 11/500,734, filed Aug. 7, 2006, 22 p.
Logan, Office Action Nov. 26, 2008, U.S. Appl. No. 11/500,734, filed Aug. 7, 2006, 20 p.
Rao, Examiner's Answer Jun. 28, 2011, U.S. Appl. No. 11/385,502, filed Mar. 21, 2006, 17 p.
Rao, Final Office Action Nov. 26, 2010, U.S. Appl. No. 11/385,502, filed Mar. 21, 2006, 11 p.
Rao, Office Action Jun. 25, 2010, U.S. Appl. No. 11/385,502, filed Mar. 21, 2006, 10 p.
Rao, Final Office Action Dec. 15, 2009, U.S. Appl. No. 11/385,502, filed Mar. 21, 2006, 10 p.
Rao, Office Action May 12, 2009, U.S. Appl. No. 11/385,502, filed Mar. 21, 2006, 9 p.
Motta, Final Office Action Nov. 19, 2012, U.S. Appl. No. 11/449,259, filed Jun. 7, 2006, 25 p.
Motta, Office Action Jul. 26, 2012, U.S. Appl. No. 11/449,259, filed Jun. 7, 2006, 20 p.
Motta, Decision on Appeal Jun. 20, 2012, U.S. Appl. No. 11/449,259, filed Jun. 7, 2006, 7 p.
Motta, Examiner's Answer Jul. 23, 2009, U.S. Appl. No. 11/449,259, filed Jun. 7, 2006, 28 p.
Motta, Interview Summary Feb. 12, 2009, U.S. Appl. No. 11/449,259, filed Jun. 7, 2006, 4 p.
Motta, Advisory Action Jan. 27, 2009, U.S. Appl. No. 11/449,259, filed Jun. 7, 2006, 3 p.
Motta, Final Office Action Nov. 13, 2008, U.S. Appl. No. 11/449,259, filed Jun. 7, 2006, 18 p.
Motta, Office Action Jul. 10, 2008, U.S. Appl. No. 11/449,259, filed Jun. 7, 2006, 22 p.
Motta, Examiner's Answer Nov. 25, 2011, U.S. Appl. No. 11/590,137, filed Oct. 30, 2006, 11 p.
Motta, Final Office Action Jul. 19, 2011, U.S. Appl. No. 11/590,137, filed Oct. 30, 2006, 11 p.
Motta, Office Action Mar. 11, 2011, U.S. Appl. No. 11/590,137, filed Oct. 30, 2006, 12 p.
Daley, Final Office Action Mar. 17, 2011, U.S. Appl. No. 11/676,997, filed Feb. 20, 2007, 34 p.
Daley, Office Action Aug. 17, 2010, U.S. Appl. No. 11/676,997, filed Feb. 20, 2007, 31 p.
Daley, Office Action Feb. 22, 2010, U.S. Appl. No. 11/676,997, filed Feb. 20, 2007, 27 p.
Motta, Interview Summary Apr. 12, 2012, U.S. Appl. No. 11/829,520, filed Jul. 27, 2007, 3 p.
Motta, Final Office Action Jan. 13, 2012, U.S. Appl. No. 11/829,520, filed Jul. 27, 2007, 27 p.
Motta, Interview Summary Nov. 29, 2011, U.S. Appl. No. 11/829,520, filed Jul. 27, 2007, 3 p.
Motta, Office Action Sep. 1, 2011, U.S. Appl. No. 11/829,520, filed Jul. 27, 2007, 14 p.
Daley, Examiner's Answer Nov. 2, 2010, U.S. Appl. No. 11/839,396, filed Aug. 15, 2007, 15 p.
Daley, Final Office Action May 25, 2010, U.S. Appl. No. 11/839,396, filed Aug. 15, 2007, 16 p.
Daley, Interview Summary Feb. 25, 2010, U.S. Appl. No. 11/839,396, filed Aug. 15, 2007, 3 p.
Daley, Office Action Dec. 21, 2009, U.S. Appl. No. 11/839,396, filed Aug. 15, 2007, 14 p.
Daley, Office Action Jul. 29, 2009, U.S. Appl. No. 11/839,396, filed Aug. 15, 2007, 23 p.
Rao, Final Office Action Sep. 21, 2012, U.S. Appl. No. 11/867,370, filed Oct. 4, 2007, 14 p.
Rao, Office Action May 3, 2012, U.S. Appl. No. 11/867,370, filed Oct. 4, 2007, 13 p.
Rao, Final Office Action Dec. 22, 2010, U.S. Appl. No. 11/867,370, filed Oct. 4, 2007, 10 p.
Rao, Office Action Sep. 3, 2010, U.S. Appl. No. 11/867,370, filed Oct. 4, 2007, 11 p.
Rao, Examiner's Answer Apr. 12, 2012, U.S. Appl. No. 11/871,867, filed Oct. 12, 2007, 14 p.
Rao, Final Office Action Oct. 11, 2011, U.S. Appl. No. 11/871,867, filed Oct. 12, 2007, 14 p.
Rao, Interview Summary Aug. 5, 2011, U.S. Appl. No. 11/871,867, filed Oct. 12, 2007, 4 p.
Rao, Office Action Apr. 29, 2011, U.S. Appl. No. 11/871,867, filed Oct. 12, 2007, 13 p.
Rao, Final Office Action Sep. 30, 2010, U.S. Appl. No. 11/871,867, filed Oct. 12, 2007, 14 p.
Rao, Office Action Mar. 25, 2010, U.S. Appl. No. 11/871,867, filed Oct. 12, 2007, 11 p.
Rao, Office Action Aug. 10, 2009, U.S. Appl. No. 11/871,867, filed Oct. 12, 2007, 14 p.
Chowdhary, Decision on Appeal Nov. 1, 2012, U.S. Appl. No. 11/005,312, filed Dec. 6, 2004, 8 p.
Chowdhary, Order Apr. 27, 2009, U.S. Appl. No. 11/005,312, filed Dec. 6, 2004, 3 p.
Chowdhary, Examiner's Answer Aug. 20, 2008, U.S. Appl. No. 11/005,312, filed Dec. 6, 2004, 28 p.
Chowdhary, Office Action Sep. 5, 2006, Nov. 1, 2012, U.S. Appl. No. 11/005,312, filed Dec. 6, 2004, 29 p.
Chowdhary, Final Office Action Mar. 21, 2007, U.S. Appl. No. 11/005,312, filed Dec. 6, 2004, 27 p.
Chowdhary, Office Action Jan. 11, 2008, U.S. Appl. No. 11/005,312, filed Dec. 6, 2004, 24 p.
Rao, Final Office Action Oct. 16, 2012, U.S. Appl. No. 13/350,355, filed Jan. 13, 2012, 18 p.
Rao, Office Action May 16, 2012, U.S. Appl. No. 13/350,355, filed Jan. 13, 2012, 28 p.
Okkonen, Office Action Dec. 28, 2005, U.S. Appl. No. 10/417,285, filed Apr. 15, 2003, 21 p.
Okkonen, Final Office Action May 1, 2006, U.S. Appl. No. 10/417,285, filed Apr. 15, 2003, 41 p.
Okkonen, Office Action Jan. 29, 2007, U.S. Appl. No. 10/417,285, filed Apr. 15, 2003, 41 p.
Okkonen, Office Action Aug. 6, 2007, U.S. Appl. No. 10/417,285, filed Apr. 15, 2003, 6 p.
Okkonen, Office Action Dec. 9, 2009, U.S. Appl. No. 11/650,777, filed Jan. 8, 2007, 17 p.
Okkonen, Final Office Action May 13, 2010, U.S. Appl. No. 11/650,777, filed Jan. 8, 2007, 24 p.
O'Neill, Office Action Jun. 26, 2006, U.S. Appl. No. 10/631,567, filed Jul. 31, 2003, 18 p.
O'Neill, Final Office Action Apr. 10, 2007, U.S. Appl. No. 10/631,567, filed Jul. 31, 2003, 31 p.
O'Neill, Office Action Jan. 14, 2008, U.S. Appl. No. 10/631,567, filed Jul. 31, 2003, 41 p.
O'Neill, Office Action Jul. 9, 2008, U.S. Appl. No. 10/631,567, filed Jul. 31, 2003, 14 p.
O'Neill, Final Office Action Jan. 22, 2009, U.S. Appl. No. 10/631,567, filed Jul. 31, 2003, 14 p.
Chen, Office Action Jan. 8, 2007, U.S. Appl. No. 10/646,324, filed Aug. 22, 2003, 9 p.
Chen, Office Action May 13, 2011, U.S. Appl. No. 11/923,383, filed Oct. 24, 2007, 22 p.
Chen, Final Office Action Nov. 10, 2011, U.S. Appl. No. 11/923,383, filed Oct. 24, 2007, 27 p.
O'Neill, Office Action Oct. 23, 2006, U.S. Appl. No. 10/654,149, filed Sep. 3, 2003, 13 p.
O'Neill, Office Action May 31, 2007, U.S. Appl. No. 10/654,149, filed Sep. 3, 2003, 13 p.

(56) References Cited

OTHER PUBLICATIONS

O'Neill, Final Office Action Dec. 13, 2007, U.S. Appl. No. 10/654,149, filed Sep. 3, 2003, 15 p.
O'Neill, Office Action Dec. 4, 2008, U.S. Appl. No. 10/654,149, filed Sep. 3, 2003, 14 p.
O'Neill, Final Office Action May 26, 2009, U.S. Appl. No. 10/654,149, filed Sep. 3, 2003, 15 p.
Rao, Office Action Feb. 7, 2007, U.S. Appl. No. 10/654,412, filed Sep. 3, 2003, 9 p.
Rao, Final Office Action Aug. 24, 2007, U.S. Appl. No. 10/654,412, filed Sep. 3, 2003, 13 p.
Rao, Office Action Mar. 5, 2008, U.S. Appl. No. 10/654,412, filed Sep. 3, 2003, 15 p.
Chen, Office Action Nov. 20, 2006, U.S. Appl. No. 10/646,319, filed Aug. 22, 2003, 8 p.
Chen, Office Action Aug. 16, 2011, U.S. Appl. No. 12/032,809, filed Feb. 18, 2008, 20 p.
Chen, Final Office Action Jan. 19, 2012, U.S. Appl. No. 12/032,809, filed Feb. 18, 2008, 24 p.
Rao, Office Action Aug. 16, 2006, U.S. Appl. No. 10/695,713, filed Oct. 29, 2003, 12 p.
Rao, Final Office Action Dec. 20, 2006, U.S. Appl. No. 10/695,713, filed Oct. 29, 2003, 13 p.
Rao, Office Action Oct. 21, 2009, U.S. Appl. No. 11/688,820, filed Mar. 20, 2007, 10 p.
Rao, Final Office Action May 3, 2010, U.S. Appl. No. 11/688,820, filed Mar. 20, 2007, 14 p.
Rao, Office Action Dec. 30, 2004, U.S. Appl. No. 10/689,309, filed Oct. 20, 2003, 5 p.
Rao, Office Action Jun. 24, 2009, U.S. Appl. No. 11/251,046, filed Oct. 14, 2005, 8 p.
Lilley, Office Action Oct. 24, 2006, U.S. Appl. No. 10/681,861, filed Oct. 8, 2003, 24 p.
Lilley, Final Office Action Jul. 23, 2007, U.S. Appl. No. 10/681,861, filed Oct. 8, 2003, 18 p.
Lilley, Office Action Nov. 16, 2007, U.S. Appl. No. 10/681,861, filed Oct. 8, 2003, 18 p.
Lilley, Final Office Action Jun. 16, 2008, U.S. Appl. No. 10/681,861, filed Oct. 8, 2003, 24 p.
O'Neill, Office Action Mar. 22, 2007, U.S. Appl. No. 10/721,658, filed Nov. 25, 2003, 14 p.
O'Neill, Final Office Action Sep. 25, 2007, U.S. Appl. No. 10/721,658, filed Nov. 25, 2003, 9 p.
O'Neill, Final Office Action Feb. 20, 2008, U.S. Appl. No. 10/721,658, filed Nov. 25, 2003, 13 p.
Rao, Office Action Oct. 5, 2004, U.S. Appl. No. 10/701,848, filed Nov. 5, 2003, 12 p.
Rao, Final Office Action May 5, 2005, U.S. Appl. No. 10/701,848, filed Nov. 5, 2003, 14 p.
Rao, Office Action Nov. 23, 2005, U.S. Appl. No. 10/701,848, filed Nov. 5, 2003, 13 p.
Rao, Final Office Action Aug. 15, 2006, U.S. Appl. No. 10/701,848, filed Nov. 5, 2003, 16 p.
Rao, Office Action Nov. 14, 2006, U.S. Appl. No. 10/706,219, filed Nov. 12, 2003, 12 p.
Rao, Final Office Action May 2, 2007, U.S. Appl. No. 10/706,219, filed Nov. 12, 2003, 17 p.
Rao, Office Action Dec. 13, 2007, U.S. Appl. No. 10/706,219, filed Nov. 12, 2003, 13 p.
Rao, Office Action Jun. 25, 2008, U.S. Appl. No. 10/706,219, filed Nov. 12, 2003, 10 p.
Rao, Final Office Action Jan. 6, 2009, U.S. Appl. No. 10/706,219, filed Nov. 12, 2003, 16 p.
Rao, Office Action Jul. 22, 2009, U.S. Appl. No. 10/706,219, filed Nov. 12, 2003, 6 p.
Rao, Office Action Mar. 26, 2009, U.S. Appl. No. 11/401,708, filed Apr. 11, 2006, 20 p.
Rao, Office Action Aug. 9, 2005, U.S. Appl. No. 10/695,524, filed Oct. 28, 2003, 19 p.
Chia, Office Action May 28, 2008, U.S. Appl. No. 10/719,114, filed Nov. 21, 2003, 10 p.
Chia, Final Office Action Dec. 2, 2008, U.S. Appl. No. 10/719,114, filed Nov. 21, 2003, 8 p.
Chia, Final Office Action May 4, 2009, U.S. Appl. No. 10/719,114, filed Nov. 21, 2003, 11 p.
Chia, Office Action Aug. 19, 2009, U.S. Appl. No. 10/719,114, filed Nov. 21, 2003, 8 p.
Chia, Final Office Action Mar. 17, 2010, U.S. Appl. No. 10/719,114, filed Nov. 21, 2003, 9 p.
Jacobi, Office Action Dec. 10, 2004, U.S. Appl. No. 10/697,458, filed Oct. 30, 2003, 16 p.
Jacobi, Final Office Action Jun. 14, 2005, U.S. Appl. No. 10/697,458, filed Oct. 30, 2003, 16 p.
Gustafson, Office Action Mar. 4, 2008, U.S. Appl. No. 10/761,735, filed Jan. 20, 2004, 25 p.
Gustafson, Office Action Sep. 8, 2008, U.S. Appl. No. 10/761,735, filed Jan. 20, 2004, 25 p.
Gustafson, Final Office Action Mar. 20, 2009, U.S. Appl. No. 10/761,735, filed Jan. 20, 2004, 27 p.
Rao, Office Action Sep. 25, 2008, U.S. Appl. No. 11/083,596, filed Mar. 18, 2005, 7 p.
Rao, Office Action Oct. 19, 2004, U.S. Appl. No. 10/765,817, filed Jan. 27, 2004, 8 p.
Rao, Office Action Feb. 4, 2008, U.S. Appl. No. 10/782,083, filed Feb. 19, 2004, 21 p.
Rao, Final Office Action Jul. 15, 2008, U.S. Appl. No. 10/782,083, filed Feb. 19, 2004, 25 p.
Gustafson, Office Action Jul. 24, 2007, U.S. Appl. No. 10/790,340, filed Mar. 1, 2004, 21 p.
Gustafson, Office Action Jun. 12, 2008, U.S. Appl. No. 10/790,340, Mar. 1, 2004, 20 p.
Gustafson, Office Action Dec. 23, 2008, U.S. Appl. No. 10/790,340, filed Mar. 1, 2004, 21 p.
Gustafson, Final Office Action Jul. 6, 2009, U.S. Appl. No. 10/790,340, Mar. 1, 2004, 21 p.
Lilley, FInal Office Action Jul. 25, 2007, U.S. Appl. No. 10/646,975, filed Aug. 22, 2003, 13 p.
Lilley, Office Action Oct. 31, 2007, U.S. Appl. No. 10/646,975, filed Aug. 22, 2003, 15 p.
Lilley, Final Office Action Apr. 16, 2008, U.S. Appl. No. 10/646,975, filed Aug. 22, 2003, 14 p.
Rao, Office Action Jun. 30, 2006, U.S. Appl. No. 10/797,176, filed Mar. 10, 2004, 15 p.
Rao, Final Office Action Jul. 17, 2007, U.S. Appl. No. 10/797,176, filed Mar. 10, 2004, 26 p.
Rao, Final Office Action Oct. 31, 2007, U.S. Appl. No. 10/797,176, filed Mar. 10, 2004, 29 p.
Rao, Office Action Apr. 14, 2008, U.S. Appl. No. 10/797,176, filed Mar. 10, 2004, 31p.
Rao, Office Action Oct. 16, 2008, U.S. Appl. No. 10/797,176, filed Mar. 10, 2004, 33 p.
Rao, Final Office Action Nov. 25, 2009, U.S. Appl. No. 10/797,176, filed Mar. 10, 2004, 41 p.
Rao, Final Office Action Aug. 19, 2010, U.S. Appl. No. 10/797,176, filed Mar. 10, 2004, 5 p.
Okkonnen, Office Action Feb. 28, 2005, U.S. Appl. No. 10/807,694, filed Mar. 24, 2004, 18 p.
Okkonnen, Final Office Action Aug. 10, 2005, U.S. Appl. No. 10/807,694, filed Mar. 24, 2004, 17 p.
Okkonnen, Office Action Mar. 14, 2006, U.S. Appl. No. 10/807,694, filed Mar. 24, 2004, 21 p.
Okkonen, Office Action Oct. 24, 2006, U.S. Appl. No. 10/807,694, filed Mar. 24, 2004, 16 p.
Okkonen, Office Action Jul. 10, 2007, U.S. Appl. No. 10/807,694, filed Mar. 24, 2004, 19 p.
Okkonen, Final Office Action Dec. 18, 2007, U.S. Appl. No. 10/807,694, filed Mar. 64, 2004, 22 p.
Okkonen, Office Action May 12, 2008, U.S. Appl. No. 10/807,694, filed Mar. 24, 2004, 22 p.
Okkonen, Final Office Action Nov. 20, 2008, U.S. Appl. No. 10/807,694, filed Mar. 24, 2004, 22 p.

(56) References Cited

OTHER PUBLICATIONS

Okkonen, Office Action Jun. 25, 2009, U.S. Appl. No. 10/807,694, filed Mar. 24, 2004, 34 p.
McGhee, Office Action Sep. 27, 2006, U.S. Appl. No. 10/797,825, filed Mar. 10, 2004, 7 p.
McGhee, Final Office Action Jun. 25, 2007, U.S. Appl. No. 10/797,825, filed Mar. 10, 2004, 6 p.
Yang, Office Action Jan. 28, 2008, U.S. Appl. No. 10/802,191, filed Mar. 17, 2004, 18 p.
Yang, Final Office Action Jun. 6, 2008, U.S. Appl. No. 10/802,191, filed Mar. 17, 2004, 19 p.
Yang, Office Action Sep. 5, 2008, U.S. Appl. No. 10/802,191, filed Mar. 17, 2004, 16 p.
Qumei, FInal Office Action Nov. 23, 2007, U.S. Appl. No. 10/813,212, filed Mar. 30, 2004, 11 p.
Yang, Office Action Sep. 21, 2006, U.S. Appl. No. 10/635,991, filed Aug. 7, 2003, 10 p.
Yang, Office Action Jun. 2, 2010, U.S. Appl. No. 12/014,549, filed Jan. 15, 2008, 8 p.
Yang, Final Office Action Sep. 16, 2010, U.S. Appl. No. 12/014,549, filed Jan. 15, 2008, 7 p.
Yang, Office Action Nov. 2, 2006, U.S. Appl. No. 10/887,490, filed Jul. 8, 2004, 12 p.
Yang, Final Office Action Apr. 17, 2007, U.S. Appl. No. 10/887,490, filed Jul. 8, 2004, 13 p.
Marolia, Final Office Action Jan. 30, 2008, U.S. Appl. No. 10/852,396, filed May 24, 2004, 17 p.
Marolia, Office Action May 28, 2008, U.S. Appl. No. 10/852,396, filed May 24, 2004, 20 p.
Mariola, Office Action Dec. 8, 2008, U.S. Appl. No. 10/852,396, filed May 24, 2004, 19 p.
Marolia, Final Office Action Jun. 17, 2009, U.S. Appl. No. 10/852,396, filed May 24, 2004, 24 p.
Mariola, Office Action Dec. 14, 2009, U.S. Appl. No. 10/852,396, filed May 24, 2004, 19 p.
Marolia, Office Action Jun. 3, 2005, U.S. Appl. No. 10/888,841, filed Jul. 9, 2004, 8 p.
Marolia, Final Office ACtion Dec. 6, 2005, U.S. APpl. No. 10/888,841, filed Jul. 9, 2004, 10 p.
Marolia, Office Action May 4, 2006, U.S. Appl. No. 10/888,841, filed Jul. 9, 2004, 13 p.
Marolia, Final Office Action Jan. 12, 2007, U.S. Appl. No. 10/888,841, filed Jul. 9, 2004, 15 p.
Marolia, Office Action Jun. 18, 2007, U.S. Appl. No. 10/888,841, filed Jul. 9, 2004, 16 p.
Marolia, FInal Office Action Nov. 27, 2007, U.S. Appl. No. 10/888,841, filed Jul. 9, 2004, 17 p.
Marolia, Office Action Apr. 28, 2009, U.S. Appl. No. 10/888,841, filed Jul. 9, 2004, 15 p.
Qumei, Office Action Apr. 21, 2008, U.S. Appl. No. 10/864,095, filed Jun. 9, 2004, 15 p.
Marolia, Office Action Dec. 11, 2007, U.S. Appl. No. 10/879,869, filed Jun. 28, 2004, 10 p.
Marolia, Final Office Action May 30, 2008, U.S. Appl. No. 10/879,869, filed Jun. 28, 2004, 15 p.
Marolia, Office Action Aug. 18, 2008, U.S. Appl. No. 10/879,869, filed Jun. 28, 2004, 17 p.
Marolia, Final Office Action Jan. 28, 2009, U.S. Appl. No. 10/879,869, filed Jun. 28, 2004, 18 p.
Rao, Office Action Jul. 25, 2007, U.S. Appl. No. 10/860,964, filed Jun. 4, 2004, 22 p.
Rao, Final Office Action Jan. 7, 2008, U.S. Appl. No. 10/860,964, filed Jun. 4, 2004, 26 p.
Rao, Office Action Apr. 30, 2008, U.S. Appl. No. 10/860,964, filed Jun. 4, 2004, 23 p.
Rao, Final Office Action Oct. 28, 2008, U.S. Appl. No. 10/860,964, filed Jun. 4, 2004, 29 p.
Yang, Office Action Jun. 27, 2007, U.S. Appl. No. 10/860,978, filed Jun. 4, 2004, 14 p.
Yang, Final Office Action Dec. 7, 2007, U.S. Appl. No. 10/860,978, filed Jun. 4, 2004, 16 p.
Yang, Office Action Jun. 20, 2008, U.S. Appl. No. 10/860,978, filed Jun. 4, 2004, 13 p.
Yang Office Action Dec. 23, 2008, U.S. Appl. No. 10/860,978, filed Jun. 4, 2004, 13 p.
Ynag, Final Office Action Jun. 19, 2009, U.S. Appl. No. 10/860,978, filed Jun. 4, 2004, 16 p.
Rao, Office Action Aug. 24, 2007, U.S. Appl. No. 10/868,050, filed Jun. 15, 2004, 15 p.
Rao, Office Action Feb. 4, 2008, U.S. Appl. No. 10/868,050, filed Jun. 15, 2004, 16 p.
Rao, Final Office Action Aug. 6, 2008, U.S. Appl. No. 10/868,050, filed Jun. 15, 2004, 18 p.
Rao, Office Action Apr. 15, 2008, U.S. Appl. No. 10/899,513, filed Jul. 26, 2004, 14 p.
Rao, Final Office Action Oct. 24, 2008, U.S. Appl. No. 10/899,513, filed Jul. 26, 2004, 16 p.
Rao, Office Action Jun. 11, 2007, U.S. Appl. No. 10/902,452, filed Jul. 29, 2004, 13 p.
Rao, Final Office Action Dec. 20, 2007, U.S. Appl. No. 10/902,452, filed Jul. 29, 2004, 10 p.
Rao, Final Office Action Jun. 23, 2008, U.S. Appl. No. 10/902,425, filed Jul. 29, 2004, 14 p.
Rao, Office Action Jan. 5, 2009, U.S. APpl. No. 10/902,452, filed Jul. 29, 2004, 16 p.
Rao, Final Office Action Jul. 20, 2009, U.S. Appl. No. 10/902,452, filed Jul. 29, 2004, 16 p.
Rao, Office Action May 13, 2010, U.S. Appl. No. 10/902452, filed Jul. 29, 2004, 16 p.
Qumei, Office Action Jul. 12, 2007, U.S. Appl. No. 10/909,519, filed Aug. 2, 2004, 17 p.
Qumei, Final Office Action Dec. 20, 2007, U.S. Appl. No. 10/909,519, filed Aug. 2, 2004, 11 p.
Qumei, Office Action May 29, 2008, U.S. Appl. No. 10/909,519, filed Aug. 2, 2004, 21 p.
Qumei, Final Office Action Nov. 17, 2008, U.S. Appl. No. 10/909,519, filed Aug. 2, 2004, 24 p.
Qumei, Office Action Apr. 28, 2009, U.S. Appl. No. 10/909,519, filed Aug. 2, 2004, 23 p.
Chen, Office Action May 14, 2008, U.S. Appl. No. 10/932,175, filed Sep. 1, 2004, 18 p.
Chen, Final Office Action Feb. 6, 2009, U.S. Appl. No. 10/932,175, filed Sep. 1, 2004, 15 p.
Chen, Office Action Mar. 1, 2010, U.S. Appl. No. 10/932,175, filed Sep. 1, 2004, 16 p.
Chen, Final Office Action Sep. 21, 2010, U.S. Appl. No. 10/932,175, filed Sep. 1, 2004, 17 p.
Okkonen, Office Action Jan. 5, 2007, U.S. Appl. No. 10/945,466, filed Sep. 20, 2004, 5 p.
Okkonen, Office Action Aug. 10, 2007, U.S. Appl. No. 10/945,466, filed Sep. 20, 2004, 5 p.
Okkonen, Final Office Action Jan. 9, 2008, U.S. Appl. No. 10/945,466, filed Sep. 20, 2004, 7 p.
Okkonen, Office Action May 12, 2008, U.S. Appl. No. 10/945,466, filed Sep. 20, 2004, 6 p.
Okkonen, Office Action Nov. 12, 2008, U.S. Appl. No. 10/945,466, filed Sep. 20, 2004, 5 p.
Okkonen, Office Action Apr. 14, 2009, U.S. Appl. No. 10/945,466, filed Sep. 20, 2004, 5 p.
Rao, Office Action Aug. 27, 2007, U.S. Appl. No. 10/950,764, filed Sep. 27, 2004, 14 p.
Rao, Final Office Action Mar. 4, 2008, U.S. Appl. No. 10/950,746, filed Sep. 27, 2004, 17 p.
Rao, Office Action Nov. 3, 2008, U.S. Appl. No. 10/950,764, filed Sep. 27, 2004, 12 p.
Rao, Final Office Action Jun. 30, 2009, U.S. Appl. No. 10/950,764, filed Sep. 27, 2004, 15 p.
Chen, Office Action Jan. 29, 2008, U.S. Appl. No. 10/958,148, filed Oct. 4, 2004, 16 p.
Chen, Final Office Action Aug. 20, 2008, U.S. Appl. No. 10/958,148, filed Oct. 4, 2004, 19 p.

(56) References Cited

OTHER PUBLICATIONS

Chen, Office Action Apr. 14, 2009, U.S. Appl. No. 10/958,148, filed Oct. 4, 2004, 11 p.
Chen, Final Office Action Nov. 25, 2009, U.S. Appl. No. 10/958,148, filed Oct. 4, 2004, 12 p.
Chen, Office Action Apr. 1, 2010, U.S. Appl. No. 10/958,148, filed Oct. 4, 2004, 13 p.
Gustafson, Office Action Sep. 11, 2007, U.S. Appl. No. 11/010,913, filed Dec. 13, 2004, 27 p.
Gustafson, Office Action Feb. 1, 2008, U.S. Appl. No. 11/010,913, filed Dec. 13, 2004, 29 p.
Gustafson, Final Office Action Feb. 18, 2010, U.S. Appl. No. 11/010,913, filed Dec. 13, 2004, 31 p.
Ren, Office Action Jan. 22, 2008, U.S. Appl. No. 10/989,628, filed Nov. 16, 2004, 8 p.
Ren, Office Action Aug. 18, 2008, U.S. Appl. No. 10/989,628, filed Nov. 16, 2004, 7 p.
Ren, Final Office Action Nov. 24, 2009, U.S. Appl. No. 10/989,628, filed Nov. 16, 2004, 9 p.
Slyz, Office Action Mar. 1, 2010, U.S. Appl. No. 11/874,102, filed Oct. 17, 2007, 13 p.
Qumei, Office Action Apr. 9, 2007, U.S. Appl. No. 10/698,665, filed Oct. 30, 2003, 22 p.
Qumei, Office Action Jul. 29, 2010, U.S. Appl. No. 11/852,933, filed Sep. 10, 2007, 14 p.
Qumei, Final Office Action Feb. 17, 2011, U.S. Appl. No. 11/852,933, filed Sep. 10, 2007, 19 p.
Chen, Office Action Apr. 19, 2007, U.S. Appl. No. 10/903,394, filed Jul. 30, 2004, 31 p.
Chen, Final Office Action Oct. 18, 2007, U.S. Appl. No. 10/903,394, Jul. 30, 2004, 34 p.
Chen, Office Action May 13, 2008, U.S. Appl. No. 10/903,394, filed Jul. 30, 2004, 14 p.
Chen, Office Action Nov. 26, 2008, U.S. Appl. No. 10/903,394, filed Jul. 30, 2004, 14 p.
Chen, Final Office Action Apr. 21, 2009, U.S. Appl. No. 10/903,394, filed Jul. 30, 2004, 21 p.
Chen, Office Action Oct. 30, 2009, U.S. Appl. No. 10/903,394, filed Jul. 30, 2004, 19 p.
Chen, Final Office Action Apr. 29, 2010, U.S. Appl. No. 10/903,394, filed Jul. 30, 2004, 24 p.
Rao, Office Action Feb. 4, 2008, U.S. Appl. No. 11/047,212, filed Jan. 31, 2005, 9 p.
Rao, Final Office Action Sep. 3, 2008, U.S. Appl. No. 11/047,212, filed Jan. 31, 2005, 8 p.
Rao, Office Action Feb. 2, 2009, U.S. Appl. No. 11/047,212, filed Jan. 31, 2005, 8 p.
Rao, Final Office Action Sep. 25, 2009, U.S. Appl. No. 11/047,212, filed Jan. 31, 2005, 9 p.
Rao, Office Action Jan. 22, 2010, U.S. Appl. No. 11/047,212, filed Jan. 31, 2005, 9 p.
Rao, Final Office Action Jun. 10, 2010, U.S. Appl. No. 11/047,212, Jan. 31, 2005, 11 p.
Rao, Office Action Jan. 14, 2011, U.S. Appl. No. 11/047,212, filed Jan. 31, 2005, 9 p.
Kokkinen, Office Action Feb. 23, 2007, U.S. Appl. No. 10/688,640, filed Oct. 17, 2003, 23 p.
Kokkinen, Office Action Aug. 21, 2007, U.S. Appl. No. 10/688,640, filed Oct. 17, 2003, 23 p.
Kokkinen, Office Action Jul. 18, 2008, U.S. Appl. No. 10/688,640, filed Oct. 17, 2003, 28 p.
Kokkinen, Office Action Dec. 30, 2008, U.S. Appl. No. 10/688,640, filed Oct. 17, 2003, 29 p.
Kokkinen, Office Action Jul. 21, 2009, U.S. Appl. No. 10/688,640, filed Oct. 17, 2003, 30 p.
Kokkinen, Office Action Feb. 24, 2010, U.S. Appl. No. 10/688,640, filed Oct. 17, 2003, 33 p.
Kokkinen, Office Action Aug. 6, 2010, U.S. Appl. No. 10/688,640, filed Oct. 17, 2003, 26 p.
Okkonen, Office Action Apr. 19, 2007, U.S. Appl. No. 10/788,768, filed Feb. 27, 2004, 14 p.
Okkonen, Final Office Action Oct. 2, 2007, U.S. Appl. No. 10/788,768, filed Feb. 27, 2004, 18 p.
Okkonen, Office Action Mar. 20, 2008, U.S. Appl. No. 10/788,768, filed Feb. 27, 2004, 16 p.
Okkonen, Office Action Oct. 2, 2008, U.S. Appl. No. 10/788,768, filed Feb. 27, 2004, 17 p.
Okkonen, Final Office Action Apr. 14, 2009, U.S. Appl. No. 10/788,768, filed Feb. 27, 2004, 18 p.
Qumei, Final Office Action Sep. 7, 2007, U.S. Appl. No. 10/770,983, filed Feb. 3, 2004, 15 p.
Qumei, Office Action Jan. 25, 2008, U.S. Appl. No. 10/770,983, filed Feb. 3, 2004, 18 p.
Qumei, Office Action Jul. 3, 2008, U.S. Appl. No. 10/770,983, filed Feb. 3, 2004, 22 p.
Qumei, Office Action Dec. 19, 2008, U.S. Appl. No. 10/770,983, filed Feb. 3, 2004, 19 p.
Qumei, Final Office Action Jun. 11, 2009, U.S. Appl. No. 10/770,983, filed Feb. 3, 2004, 21 p.
Hamasaki, Office Action Jan. 9, 2008, U.S. Appl. No. 10/748,053, filed Dec. 30, 2003, 18 p.
Hamasaki, Final Office Action Aug. 20, 2008, U.S. Appl. No. 10/748,053, filed Dec. 30, 2003, 21 p.
Hamasaki, Office Action Feb. 27, 2009, U.S. Appl. No. 10/748,053, filed Dec. 30, 2003, 19 p.
Hamasaki, Final Office Action Sep. 11, 2009, U.S. Appl. No. 10/748,053, filed Dec. 30, 2003, 19 p.
Hamasaki, Final Office Action May 17, 2010, U.S. Appl. No. 10/748,053, filed Dec. 30, 2003, 21 p.
Rao, Office Action Feb. 6, 2009, U.S. Appl. No. 10/754,378, filed Jan. 9, 2004, 14 p.
Rao, Final Office Action Jul. 13, 2009, U.S. Appl. No. 10/754,378, filed Jan. 9, 2004, 25 p.
Rao, Office Action May 17, 2010, U.S. Appl. No. 10/754,378, filed Jan. 9, 2004, 43 p.
Marolia, Office Action Oct. 17, 2006, U.S. Appl. No. 10/754,313, filed Jan. 9, 2004, 16 p.
Marolia, Office Action Feb. 20, 2008, U.S. Appl. No. 10/754,313, filed Jan. 9, 2004, 11 p.
Gustafson, Office Action Jan. 4, 2007, U.S. Appl. No. 10/756,103, filed Jan. 13, 2004, 10 p.
Gustafson, Office Action Aug. 10, 2007, U.S. Appl. No. 10/756,103, filed Jan. 13, 2004, 11 p.
Gustafson, Office Action Jan. 22, 2008, U.S. Appl. No. 10/756,103, filed Jan. 13, 2004, 11 p.
Gustafson, Office Action Jul. 8, 2009, U.S. Appl. No. 10/756,103, filed Jan. 13, 2004, 21 p.
Gustafson, Final Office Action Dec. 18, 2009, U.S. Appl. No. 10/756,103, filed Jan. 13, 2004, 22 p.
Chen, Office Action Jul. 23, 2007, U.S. Appl. No. 10/646,230, filed Aug. 22, 2003, 14 p.
Chen, Final Office Action Dec. 28, 2007, U.S. Appl. No. 10/646,230, filed Aug. 22, 2003, 14 p.
Chen, Office Action Dec. 23, 2008, U.S. Appl. No. 10/646,230, filed Aug. 22, 2003, 25 p.
Chen, Final Office Action May 27, 2009, U.S. Appl. No. 10/646,230, filed Aug. 22, 2003, 28 p.
Chen, Office Action Dec. 2, 2009, U.S. Appl. No. 10/646,230, filed Aug. 22, 2003, 15 p.
Chen, Office Action May 27, 2010, U.S. Appl. No. 10/646,230, filed Aug. 22, 2003, 17 p.
Chen, Final Office Action Nov. 10, 2010, U.S. Appl. No. 10/646,230, filed Aug. 22, 2003, 17 p.
Chen, Office Action Aug. 23, 2011, U.S. Appl. No. 10/646,230, filed Aug. 22, 2003, 6 p.
Marolia, Office Action Aug. 17, 2007, U.S. Appl. No. 10/852,396, filed May 24, 2004, 17 p.
Qumei, Office Action Jun. 20, 2007, U.S. Appl. No. 10/813,212, filed Mar. 30, 2004, 10 p.
Chen, Office Action Jun. 12, 2008, U.S. Appl. No. 10/646,230, filed Aug. 22, 2003, 14 p.

(56) References Cited

OTHER PUBLICATIONS

Chen, Office Action Dec. 7, 2005, U.S. Appl. No. 10/411,784, filed Apr. 11, 2003, 15 p.

Chen, Final Office Action Nov. 6, 2007, U.S. Appl. No. 11/125,974, filed May 9, 2005, 10 p.

Gustafson, Office Action Jan. 22, 2009, U.S. Appl. No. 10/756,103, filed Jan. 13, 2004, 15.p.

Qumei, Office Action, Apr. 13, 2007, U.S. Appl. No. 10/770,983, filed Feb. 3, 2004, 11 .p.

Communication pursuant to Article 94(3) EPC received in EP Application No. 01991949.7 mailed May 7, 2013, 8 pg.

Final Office Action received in U.S. Appl. No. 10/411,835, mailed May 2, 2013, 165 pg.

Douglas B. Terry et al., "Managing Update Conflicts in Bayou, a Weakly Connected Replicated Storage System," Proceedings of the 15th ACM Symposium on Operating Systems Principles, 1995, pp. 172-182, Available at: <dl.acm.org/citation.cfm?id=224070>.

Jonathan P. Munson and Prasun Dewan, "Sync: A Java Framework for Mobile Collaborative Applications," IEEE, Jun. 1997, pp. 59-66, Available at: <ieeexplore.ieee.org/stamp/stamp.jsp?tp=arnumber=587549>.

Hewlett-Packard Development Company, L.P., Office Action, European Application No. 04754355.8, Date: Jul. 5, 2013, pp. 1-11.

Hewlett-Packard Development Company, L.P., Office Action, European Application No. 04782849.6, Date: Jul. 3, 2012, pp. 1-5.

Teck Chia et al., U.S. Appl. No. 10/943,455, Notice of Allowance, Date Mailed: May 28, 2013, pp. 1-69.

Tim Farnham et al., "1st-Trust: A Perspective on the Reconfiguration of Future Mobile Terminals using Software Download," The 11th IEEE international Symposium on Personal, Indoor and Mobile Radio Communications, 2000, pp. 1054-1059, Available at: <ieeexplore.ieee.org/stamp/stamp.jsp?tp=&arnumber=881582>.

* cited by examiner

UPDATING AN ELECTRONIC DEVICE WITH UPDATE AGENT CODE

RELATED APPLICATIONS

The present application is a divisional of and claims priority to U.S. patent application Ser. No. 11/111,276 filed Apr. 21, 2005, now issued U.S. Pat. No. 7,904,895, hereby incorporated herein by reference in its entirety. The present application further makes reference to, claims priority to, and claims benefit of U.S. Provisional Patent Application Ser. No. 60/564,503, entitled "Firmware Update In Electronic Devices Employing Update Agent In A Flash Memory Card", filed Apr. 21, 2004, the complete subject matter of which is hereby incorporated herein by reference, in its entirety.

The present application makes reference to PCT Application having publication number WO/02/41147 A1 and PCT Application No. PCT/US01/44034, entitled "System and Method for Updating and Distributing Information", filed Nov. 19, 2001, the complete subject matter of which is hereby incorporated herein by reference, in its entirety.

The present application also makes reference to U.S. Provisional Patent Application Ser. No. 60/249,606, entitled "System and Method for Updating and Distributing Information", filed Nov. 17, 2000, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices such as mobile phones and personal digital assistants (PDAs) often contain firmware and/or application software that are either provided by the manufacturers of the electronic devices, by telecommunication carriers, or by third parties. These firmware and application software often contain bugs. New versions of firmware and software are periodically released to fix the bugs and/or to introduce new features.

Electronic devices such as high-end mobile phones, for example, often contain a flash memory card, some times called a multimedia card or MMC card. The electronic devices contain a flash memory card reader that is employed to read and/or write information on the flash memory cards that are inserted by end users. Quite often, flash memory cards are used to store content such as digital photographs or audio files by the end user.

If firmware or firmware components of the electronic device are to be changed, it is often very tricky to update the firmware components in an electronic device. If an update agent is not present in the device, the device firmware/software cannot be updated. The electronic device must have sufficient memory available to download an update package and to execute an update process. Often, electronic devices do not have sufficient memory for such downloading of entire new applications. If power is lost while changes to firmware or firmware components of the electronic device are being performed, the device is likely to malfunction, unless fault tolerant update mechanisms are implemented. Such update mechanisms may make the updating firmware more complicated. There are few efficient fault tolerant mechanisms that can be applied to constrained devices, and often it is not clear if these mechanism are compatible with the architecture of the device.

Attempts to upgrade firmware and/or software in electronic devices such as GSM phones, for example, are often hampered by the limited user interaction capabilities of the device, and the slow communication speeds available. End-user interactions cannot be relied upon, as they can be erroneous. In addition, some electronic devices may not have sufficient memory to store an update package as well as to install it in the non-volatile (NV) memory of the devices, such as in the flash memory.

Some mobile devices support the Multi-Media Card (MMC card) standard that grew out of a joint development between San-Disk Corporation and Siemens AG/Infineon Technologies AG, and was introduced in November, 1997. MMC cards typically weigh less than two grams, are about the size of a postage stamp, and are the world's smallest (24 mm×32 mm×1.4 mm) removable solid-state memory solution for mobile applications, such as MP-3 music players, portable video games, laptop computers, personal digital assistants (PDAs), mobile telephones, and digital cameras. These devices are convenient, reliable, rugged and light-weight standardized data carriers that store up to 64 Mbytes, sufficient for 64 minutes of MP-3 digital music, or approximately 40,000 book pages.

MMC cards typically use ROM technology for read-only applications and Flash technology for read/write applications. The cards are fast for excellent system performance, energy efficient for prolonged battery life in portable products, and cost-efficient for use in systems sold at consumer price points. The simple molded MMC card package has a seven pad (pin) serial interface. This easy-to-install simple serial interface offers easy integration into various devices regardless of the microprocessor used.

The MMC card has a wide variety of uses in some of the most exciting products on the market today. Mobile phones in use today typically are little more than a device to make and receive calls. Most pagers simply alert their owners to call a certain phone number. These limitations are due largely to small storage capability in mobile phones and pagers. The vast majority of mobile communication devices have less than one megabyte (MB) of storage.

MMC cards bring true mass storage capability to mobile phones and pagers. With this new Flash card technology, faxes, voice and e-mail messages, Internet files and software applications all can be downloaded to the new memory card and accessed on mobile phones and pagers. Unfortunately, the MMC cards are typically used only for storing multimedia content and not used for any other purpose.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or device supporting firmware update using an update agent in a removable memory card, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Aspects of the present invention relate generally to the process of updating software/firmware in electronic devices, and more specifically, to the use of flash memory cards or a Multi Media Card (MMC card) for providing an update agent for updating firmware/software in an electronic device. The following discussion makes reference to the term "electronic device", that is used herein to refer to mobile electronic devices such as, for example, a mobile handset, a cellular phone, a personal digital assistant (PDA), a pager, and a personal computer, to name just a few. Although the listed example electronic devices are mobile devices, application of the present invention is not limited in this manner, as representative embodiments of the present invention may be employed in a wide variety of electronic devices, both fixed and mobile. The following discussion also makes reference to a Multimedia Card with respect to the operation of representative embodiments of the present invention. Although examples using MMC cards are discussed herein, other forms of memory cards such as, for example, Compact Flash (CF) cards, Secure Digital (SD) cards, integrated circuit cards, PCMCIA cards, smart cards, and other portable memory devices may be employed without departing from the spirit and scope of the present invention.

Electronic devices may be adapted to access servers to retrieve update information for updating memory in the electronic devices. An electronic device may be, for example, a mobile electronic device having firmware/software such as mobile cellular phone handsets, personal digital assistants (PDAs), pagers, MP-3 players, digital cameras, etc. Update information may comprise information that modifies or changes firmware/software and/or software components installed in the electronic device. In a representative embodiment of the present invention, update information may comprise a set of executable instructions for converting a first version of code to an updated/second version of code. The update information may add new services to the electronic device, as desired by a service provider, device manufacturer, or an end-user, and/or may fix bugs (e.g., software errors) in the operating code of the electronic device. In a representative embodiment of the present invention, update information may comprise an update package.

Figure 1:
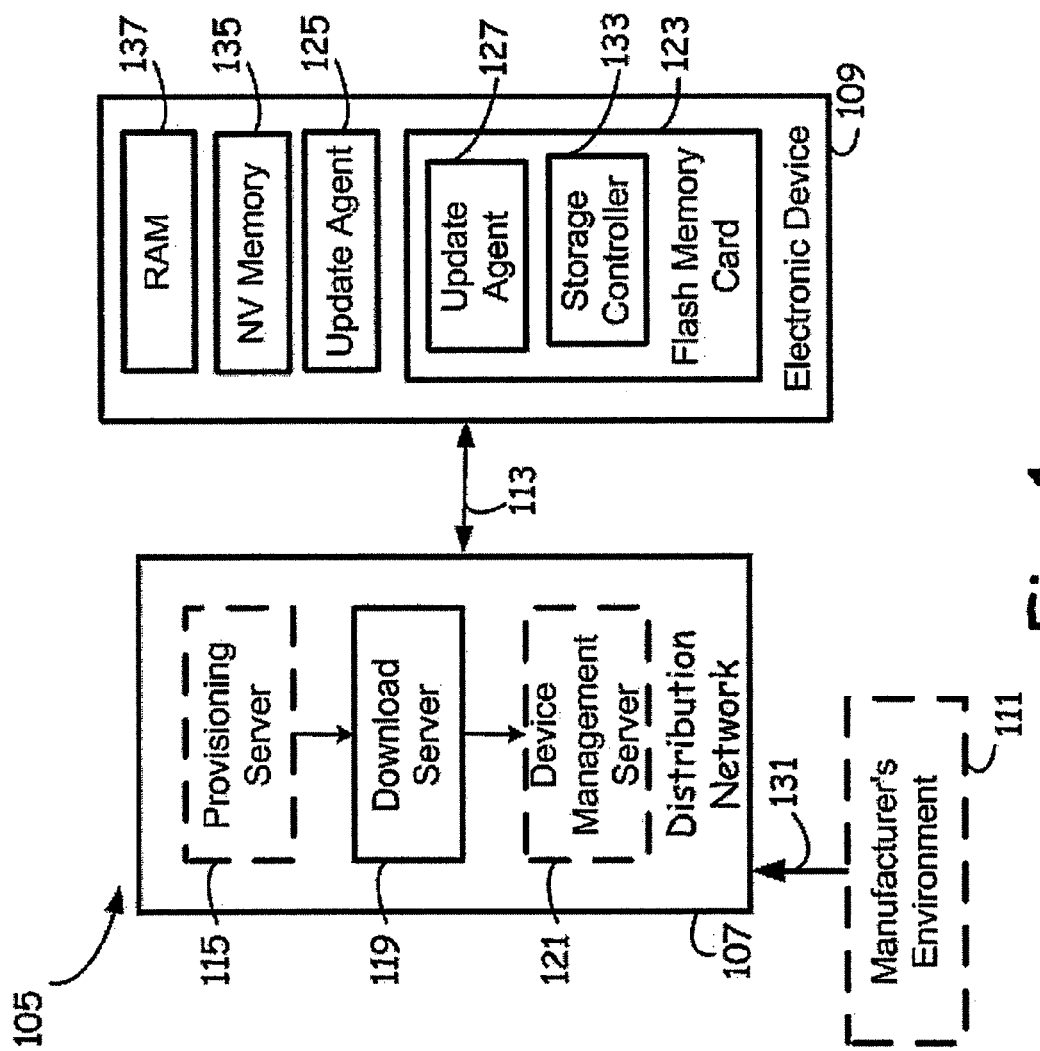
FIG. 1 is perspective block diagram of an update network comprising an electronic device with a flash memory card, a distribution network, and an optional manufacturer's environment, in accordance with a representative embodiment of the present invention.

FIG. 1 is perspective block diagram of an update network 105 comprising an electronic device 109 with a flash memory card 123, a distribution network 107, and an optional manufacturer's environment 111, in accordance with a representative embodiment of the present invention. In the illustration of FIG. 1, the electronic device 109 is communicatively coupled to the distribution network 107. Update packages generated by the manufacturer's environment 111 may be distributed by the distribution network 107 to the electronic device 109, in order to update firmware and/or software in the electronic device 109.

The electronic device 109 shown in FIG. 1 comprises a flash memory card 123, an update agent 125 used to update a firmware and/or software in a non-volatile memory 135 of the electronic device 109, and a RAM 137 where software applications may be executed. The update agent 125 may be employed by the electronic device 109 to update firmware and/or software resident in the NV memory 135. The update agent 125 may be specific to the hardware configuration of the electronic device 109 (i.e., 'close-to the-metal'), and may be part of the firmware of the electronic device 109. In a representative embodiment of the present invention, the update agent 125 may be capable of updating the firmware in a fault-tolerant mode using a bank-by-bank update process. The status of the update activity may not be progressively stored, but may instead be determined using pre-computed cyclic redundancy check values (CRCs) or digital signatures that may be provided as part of the update information in an update package. In a representative embodiment of the present invention, the update agent 125 may be resident in the NV memory 135.

In a representative embodiment of the present invention, the flash memory card 123 may comprise a storage controller 133, and an embedded update agent 127. The flash memory card 123 may also comprise MMC firmware (not shown) that is executed by the storage controller 133. The update agent 127 may be part of the MMC firmware (not shown), or it may be a separate executable component resident in the flash memory card 123. The storage controller 133 may support reading and writing into the flash memory card 123. The storage controller 133 may execute firmware embedded in the flash memory card 123. Thus, the storage controller 133 may be capable of executing the update agent 127.

In a representative embodiment of the present invention, an electronic device such as, for example, the electronic device 109 of FIG. 1 may employ an update agent like the update agent 127 in the flash memory card 123 to update firmware resident in the NV memory 135 of the electronic device 109. In a representative embodiment of the present invention, the electronic device 109 may also employ the update agent 127 in the flash memory card 123 to update application software and operating system components resident, etc. resident in the NV memory 135 of the electronic device 109.

In a representative embodiment of the present invention, the electronic device 109 may employ the update agent 127 in the flash memory card 123 to update firmware resident in the NV memory 135 of the electronic device 109, using an update package that is resident in the flash memory card 123. The update of the firmware resident in the NV memory 135 may be conducted in a fault-tolerant manner, using a bank-by-bank update process in accordance with a bank order. An example of a suitable bank-by-bank update process is provided in PCT Application having publication number WO/02/

41147 A1 and PCT Application No. PCT/US01/44034, entitled "System and Method for Updating and Distributing Information", filed Nov. 19, 2001, the complete subject matter of which is hereby incorporated herein by reference, in its entirety.

In a representative embodiment in accordance with the present invention, an electronic device such as, for example, the electronic device 109 may instruct the storage controller 133 to execute the update agent 127 in the flash memory card 123, to update firmware resident in the NV memory 135 of the electronic device 109 using an update package that is resident in the flash memory card 123. When the update agent 127 is executed by the storage controller 133, existing firmware in the electronic device 109 may be accessed in a block-by-block fashion, and a newer/updated version of the firmware of the electronic device 109 in the NV memory 135 may be assembled in the flash memory card 123. When the update process is complete, a newer/updated version of firmware may be available in the flash memory card 123. The newer/updated version of firmware may be installed into the NV memory 135 of the electronic device 109, replacing the old/original version of firmware in the NV memory 135. The electronic device 109 may be active and useable in a substantially normal fashion during the update of firmware by the update agent 127 in the flash memory card 123. During the subsequent transfer of the newer/updated version of firmware into the NV memory 135, however, the electronic device 109 may be unavailable for normal use. An appropriate message may be displayed to the user of the electronic device 109 to indicate that the firmware in NV memory 135 is being updated, and that the electronic device 109 is unavailable for the duration of the update. In a similar fashion, various software applications and/or operating system components in the NV memory 135 of the electronic device 109 may be updated by the storage controller 133, executing the update agent 127 in the flash memory card 123. The various software applications and/or operating system components to be updated may be selectively deactivated before the update process. The various software applications and/or operating system components may then be updated, and subsequently activated after the update process is complete. If a reboot of the electronic device 109 is involved, the user of the electronic device 109 may be provided with an appropriate message, and user opt-in may be solicited before invoking a reboot after the update.

In a representative embodiment of the present invention, the storage controller 133 of FIG. 1 may be, for example, a 32-bit configurable microprocessor capable of executing firmware in the flash memory card 123, as well as executing the update agent 127. The storage controller 133 may be used in content protection, and in verification of update packages during an update activity. The storage controller 133 may also manage communication with the electronic device 109 via a communication link 113, when the flash memory card 123 is communicatively coupled (e.g., plugged into a corresponding flash memory card reader) to the electronic device 109. In a representative embodiment of the present invention, the communication link 113 may comprise, for example, a wired interface such as a serial interface or a universal serial bus (USB) interface, and may comprise a wireless interface such as, for example, a cellular network interface, a Bluetooth network interface, and an Institute of Electrical and Electronics Engineers (IEEE) 802.11a/b/g/n network interface. Other forms of interface may also be employed for communication link 113, without departing from the spirit and scope of the present invention.

In a representative embodiment in accordance with the present invention, the update agent 127 may employ in its update activities an update package downloaded to the flash memory card 123. The update agent 127 may create a newer/updated version of firmware for the electronic device 109, in the flash memory card 123. The newer/updated version of firmware in the flash memory card 123 may subsequently be used to update existing firmware that is resident in the NV memory 135 of the electronic device 109. In another representative embodiment of the present invention, the update agent 127 may employ, in its update activities, an update package downloaded by the electronic device 109 to the NV memory 135. The update agent 127 may create a newer/updated version of the firmware of the electronic device 109, in the flash memory card 123.

In a representative embodiment of the present invention, a 'ready' status flag may be used by the update agent 127, to indicate to the electronic device 109 that a new version of firmware is available in the flash memory card 123. The ready status flag, along with other details of the newly updated firmware (or software) such as, for example, the location of the updated firmware/software, applicable security information, the size of the updated firmware/software, and other details may be resident in the flash memory card 123, in one representative embodiment of the present invention. Such information may reside in specific locations in the NV memory 135, in another representative embodiment in accordance with the present invention.

In a representative embodiment of the present invention, the storage controller 133 (or another processor in the flash memory card 123) may be employed by the electronic device 109 to create a newer/updated version of firmware resident in the NV memory 135 of the electronic device 109. When the newer/updated version of the firmware of the electronic device 109 is ready, a status flag either in, for example, the NV memory 135 or in the flash memory card 123, may be set indicating the status and other details of the newer/updated firmware version. During the update process in the flash memory card 123, the electronic device 109 may be operational for normal use. The update agent 125 (that may, for example, be different from the update agent 127) may subsequently update old/original firmware in the NV memory 135. This may occur, for example, after a reboot or power-up of the electronic device 109.

In a representative embodiment of the present invention, the update agent 125 may copy a newer/updated version of firmware, a block at a time, from the flash memory card 123 to the NV memory 135, to update firmware in the NV memory 135. Instructions used for copying the newer/updated version of firmware from the flash memory card 123 to the NV memory 135 may come from a "secondary" update package processed by the update agent 125. In a representative embodiment of the present invention, the update agent 127 may use a "primary" update package to update old/original firmware/software into the newer/updated version of firmware/software stored in the flash memory card 123. The terms "primary" and "secondary" are used herein to denote separate portions of update information employed during the update of the firmware in the electronic device 109, and are not intended to denote a level of importance. In a representative embodiment of the present invention, the primary and secondary update packages may be in separate update packages, or may be combined into one update package.

In a representative embodiment of the present invention, the update agents 125 and 127 may comprise similar update agents and may execute instructions provided in an update package(s). The update agent 127 may be responsible for creating a newer/updated version of firmware/software in the flash memory card 123, and for setting status flags and status information. The update agent 125 may be responsible for accessing the newer/updated version of firmware/software from the flash memory card 123, and for updating the corresponding old/original version of firmware/software in the NV memory 135.

The electronic device 109 of FIG. 1 is shown communicatively coupled to a distribution network 107 that may provide access to update packages (e.g., secondary and primary, or a single combined update package). In a representative embodiment of the present invention, update packages may be employed by an electronic device such as, for example, the electronic device 109 to update firmware/software in the electronic device 109 with the help of a storage controller and update agent in a flash memory card such as, for example, the storage controller 133 and the update agent 127 in the flash memory card 123, and an update agent in the electronic device 109 such as the update agent 125, for example.

In a representative embodiment of the present invention, an electronic device and distribution network such as, for example, the electronic device 109 and the distribution network 107 of FIG. 1 may comprise a communications network capable of distributing update packages to electronic devices such as, for example, the electronic device 109. An optional manufacturer's environment 111 may provide update packages that are stored and disseminated to the electronic device 109 by the distribution network 107.

In a representative embodiment of the present invention, the update process may not involve a reboot of an electronic device such as the electronic device 109 of FIG. 1, for example, for some types of update packages. Whether or not the electronic device 109 is to reboot following an update of firmware/software may be communicated to the electronic device 109 by the download server 119, for example, when an update package is delivered to the electronic device 109. In some representative embodiments of the present invention, a type of reboot may be specified such as, for example, a "soft" reboot or a "hard" reboot, if it is desired that the electronic device reboot following the download of an update package and an update of firmware/software. Information such as a "reboot flag" may be communicated to an electronic device (e.g., a mobile handset) along with an update package, to specify a kind or type of reboot (e.g., "soft" or "hard".)

In a representative embodiment of the present invention, a memory such the NV memory 135 may, for example, comprise flash memory that is not removable from the electronic device 109. The flash memory card 123 may be removable media such as, for example, an MMC card.

In a representative embodiment of the present invention, a distribution network such as, for example, the distribution network 107 of FIG. 1 may comprise a device management server such as, for example, a Sync ML DM server used to manage firmware update activities. A Sync ML DM server may employ the Sync ML device management (DM) protocol, which is being developed under the oversight of the Open Mobile Alliance. The distribution network 107 may also comprise a download server and a provisioning server such as, the download server 119 and the provisioning server 115 of FIG. 1. The download server 119 may be used to download update packages to electronic devices such as the electronic device 109 of FIG. 1, and the provisioning server 115 may facilitate provisioning activities for the electronic device 109 in the update network 105.

Figure 2:
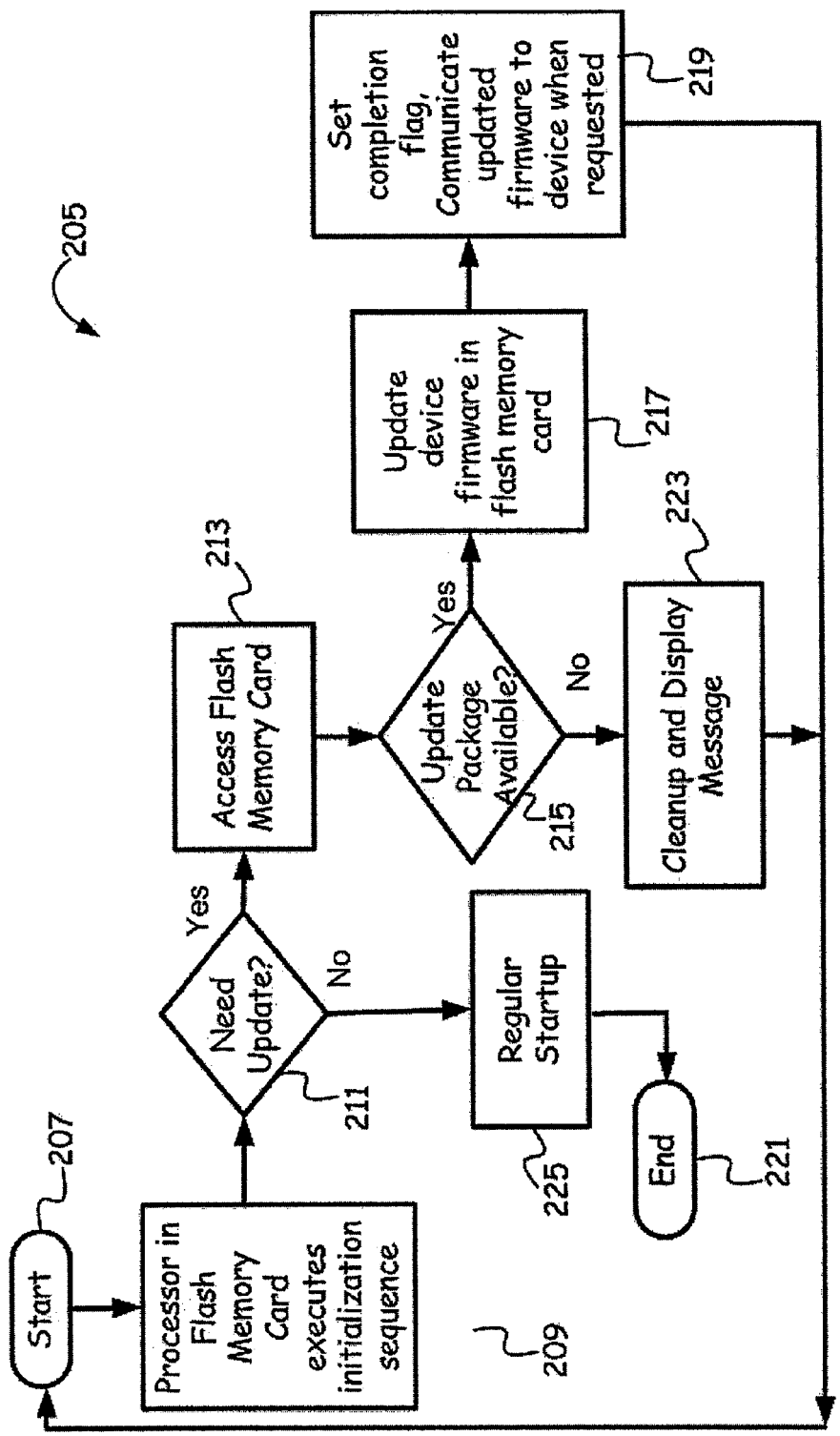
FIG. 2 is a flow chart illustrating an example of update-related actions of an electronic device such as, for example, the electronic device of FIG. 1 when it is powered up or restarted, in accordance with a representative embodiment of the present invention.

FIG. 2 is a flow chart illustrating an example of update-related actions of an electronic device such as, for example, the electronic device 109 of FIG. 1 when it is powered up or restarted, in accordance with a representative embodiment of the present invention. As an aid to understanding the update process, the following discussion makes reference to the elements of FIG. 1. The actions of the electronic device begin at the start block 207, when the electronic device (e.g., the electronic device 109) is powered up or restarted. At a next block 209, a storage controller such as, for example, the storage controller 133 (or another processor) in a flash memory card such as the flash memory card 123 of FIG. 1, for example, may execute an initialization sequence that may, for example, be part of an initial bootstrap operation. Then, at a next block 211, a determination may be made whether an update of firmware/software in the electronic device 109 is to be performed. If it is determined, at block 211, that an update of firmware/software in the electronic device is not to be performed, then regular startup of the electronic device may begin, at block 225, and the update-related actions of FIG. 2 end, at block 221.

If it is determined, at decision block 211, that an update of firmware/software in the electronic device 109 is to be performed, then at a next block 213, a flash memory card such as, for example, the flash memory card 123 of FIG. 1 may be accessed by an update agent such as the update agent 127, for example. An attempt may then be made, at decision block 215, to determine whether an update package is available in the electronic device 109. The update package may be located either in a flash memory card such as the flash memory card 123, or in memory in the electronic device 109 such as the NV memory 135, for example. If it is determined that an update package is available, control may be then passed to a next block 217, where an update agent such as, for example, the update agent 127 applies updates from the update package to the old/original firmware/software resident in memory of the electronic device such as the NV memory 135 of the electronic device 109. The update process may use one or more update packages, and may set status flags and/or status information in the flash memory card 123 to indicate success or failure of the update process. The newer/updated version of firmware/software may be stored in the flash memory card 123 as the update process progresses. Processing may then continue, at the start block 207, after a reboot or power cycle of the electronic device occurs.

Following the update of firmware/software in the electronic device (e.g., electronic device 109), the status flags and status information set in the flash memory card 123 during the updating of the old/original firmware/software may, at a next block 219, be communicated to the electronic device (e.g., electronic device 109). The newer/updated version of firmware/software may then be used to update the old/original version of the firmware/software resident in the NV memory 135. This update may comprise copying the newer/updated version of firmware/software from the flash memory card 123 to the NV memory 135. In a representative embodiment of the present invention, this activity may be conducted by an update agent in the electronic device such as, for example, the update agent 125. In addition, appropriate flags and/or status information may be set/reset by the update agent 125 to indicate success or failure of the update process. Processing may continue after a reboot or power cycle, at the start block 207.

If it is determined, at the decision block 215, that an update package is not available in the electronic device, then at a next block 223, cleanup operations may be initiated, and appropriate messages may be displayed to a user of the electronic device 109.

In a representative embodiment of the present invention, update agents such as, for example, the update agent 125 and the update agent 127 may be updated first, before the updating of other firmware/software in the NV memory 135.

In a representative embodiment of the present invention, at the block 217, an update agent resident in a flash memory card such as, for example, the update agent 127 in flash memory card 123, of FIG. 1, may update a firmware/software component resident in the same flash memory card. Such an update may employ an update package that is also resident in the same flash memory card. A completion flag may be set appropriately, at the next block 219, to indicate the completion of the update of the firmware/software component.

Figure 3:
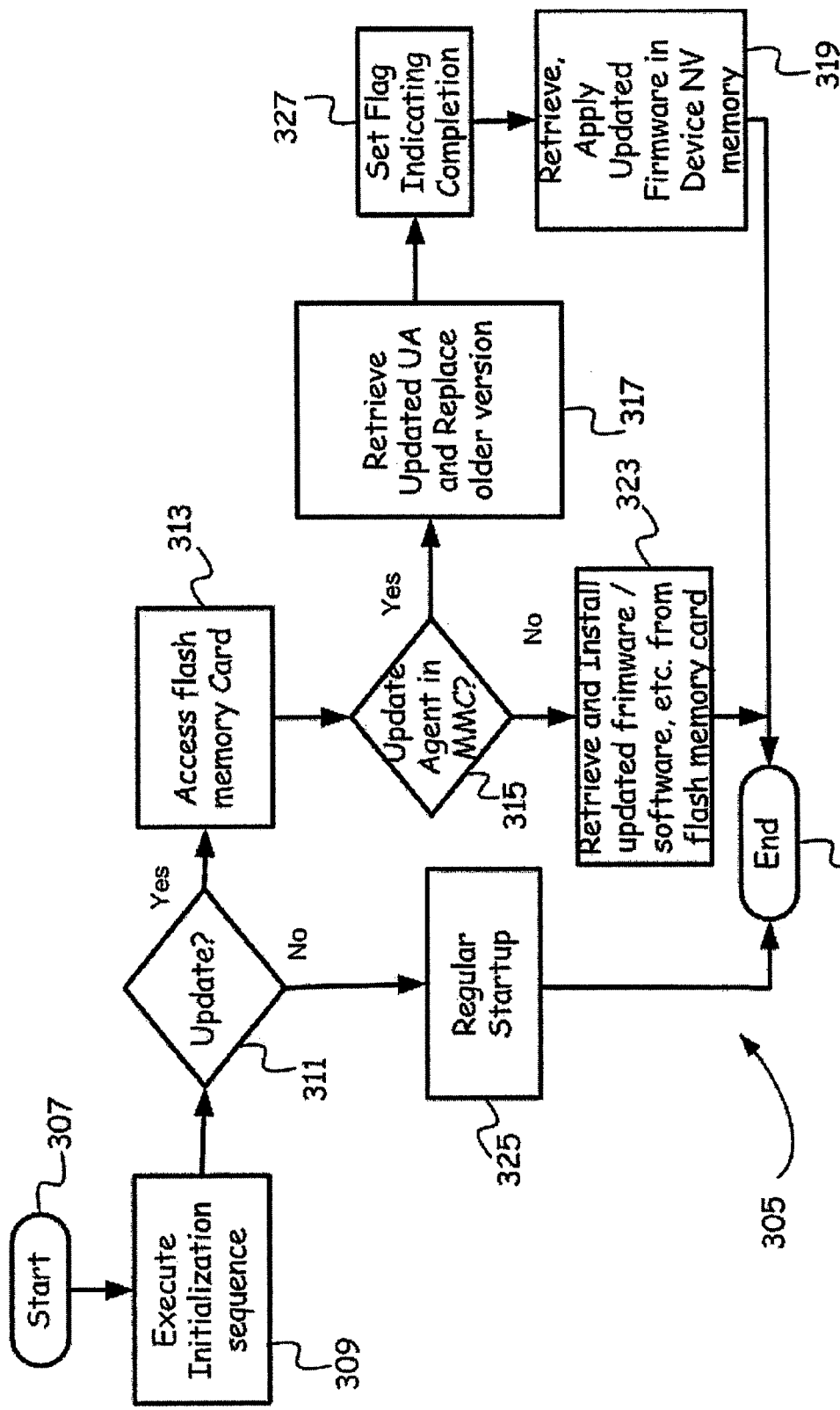
FIG. 3 is a flow chart illustrating another example of update-related actions of an electronic device that may correspond to, for example, the electronic device, when it is powered up or restarted, in accordance with a representative embodiment of the present invention.

FIG. 3 is a flow chart illustrating another example of update-related actions of an electronic device that may correspond to, for example, the electronic device 109, when it is powered up or restarted, in accordance with a representative embodiment of the present invention. As an aid to understanding, the following discussion makes reference to elements of FIG. 1. In the illustration of FIG. 3, a flash memory card such as, for example, the flash memory card 123 for an electronic device (e.g., the electronic device 109) may contain an 'updated' update agent, or updated firmware/software, that may be used either to update an update agent (e.g., the update agent 125) in the electronic device 109, or to transform the firmware/software in the NV memory 135 of the electronic device 109 into a newer version.

The actions of FIG. 3 begin at a start block 307 when, for example, an electronic device such as the electronic device 109 is powered up or restarted. At a next block 309, the electronic device 109 may execute an initialization sequence that may be executed as part of an initial bootstrap operation of the electronic device 109, for example. Then, at a next block 311, a determination may be made whether an update of firmware/software (or the update agent 125) in the electronic device 109 is desired. This determination may be performed, for example, by an update agent in the electronic device 109.

If it is determined that an update of the firmware/software (or the update agent 125) of the electronic device 109 is not desired, then at a next block 325, the regular startup of the electronic device 109 may be activated. The update-related actions illustrated in FIG. 3 may then terminate at the end block 321.

If it is determined at the decision block 311, however, that an update (e.g., of the update agent 125, firmware or software in NV memory 135) is desired and the associated updated firmware/software is available, then at a next block 313, the flash memory card 123 may be accessed by the update agent 125. Later, at a next decision block 315, an attempt may be made to determine whether a newer/updated version of the update agent 125 is available in the flash memory card (such as, for example, from a recent update by the update agent 127). If it is determined that a newer/updated version of the update agent 125 is not available in the flash memory card 123, control is passed to the next block 323, where the update agent retrieves and installs the newer/updated firmware/software and sets/resets appropriate flags to indicate success or failure of the update process. Processing then terminate at the end block 321. Processing may subsequently be restarted, for example after a reboot or power cycle, at the start block 307.

If, at the decision block 315, it is determined that a newer/updated update agent 125 is available in the flash memory card 123, then at a next block 317, the newer/updated update agent 125 may be retrieved from the flash memory card 123, and the authenticity of the newer/updated update agent 125 may be verified. Thus, a newer/updated update agent 125 may be delivered via the flash memory card 123 to the electronic device 109 for update of an update agent resident in NV (non-volatile) memory of the electronic device such as, for example, the update agent 125 resident in the NV memory 135 of FIG. 1. Then, the newer/updated update agent 125 may be installed in the NV memory 135 by the old/original version of the same update agent 125. The old/original update agent 125 may update itself to the newer/updated version of the update agent 125, employing the retrieved and selectively verified newer/updated update agent 125 from the flash memory card 123.

Following an update of the update agent 125, at a next block 327, flags and status information indicating the completion of the update of the update agent 125 may be set/reset appropriately.

Next, at block 319, the newer/updated update agent 125 may be activated and may update firmware/software in the NV memory 135, for example, by retrieving updated firmware/software from the flash memory card 123. The updated firmware/software may have been previously updated by the update agent 127. In addition, appropriate flags may be set/reset to indicate success or failure of the update process. Processing may then terminate, at the end block 321. A subsequent restart may occur at the start block 307, following a reboot or power cycle.

Figure 4:
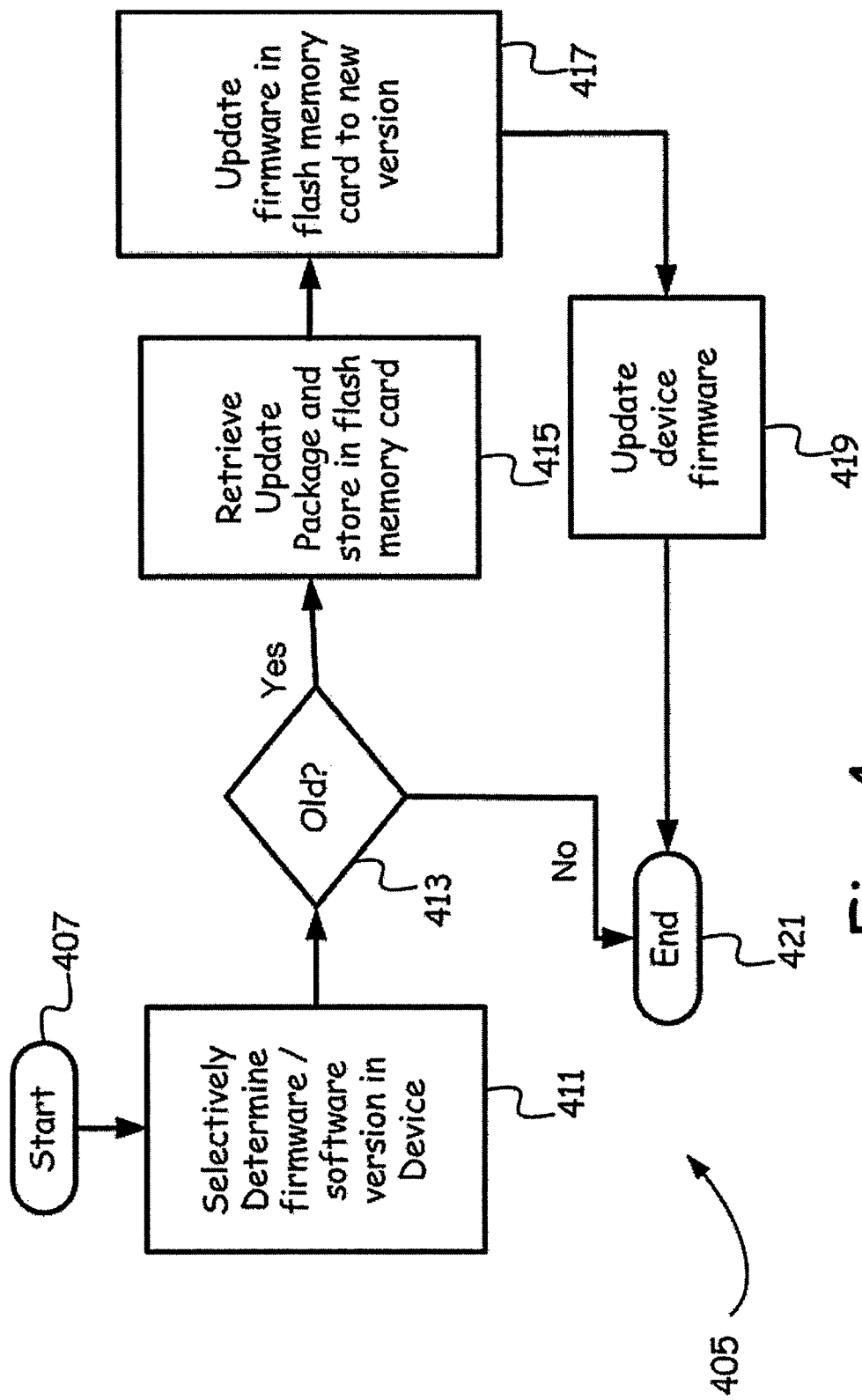
FIG. 4 is a flow chart illustrating an example of update-related actions of an electronic device that may correspond to, for example, the electronic device with the flash memory card, of FIG. 1, and the distribution network to which it is communicatively coupled, in accordance with a representative embodiment of the present invention.

FIG. 4 is a flow chart illustrating an example of update-related actions of an electronic device that may correspond to, for example, the electronic device 109 with the flash memory card 123, of FIG. 1, and a distribution network such as the distribution network 107 to which the electronic device 109 is communicatively coupled, in accordance with a representative embodiment of the present invention. As an aid to understanding the update process, the following discussion of the actions of FIG. 4 makes reference to the elements of FIG. 1. The illustration of FIG. 4 begins at a start block 407, at some time after power-up or restart of an electronic device such as the electronic device 109, for example. The electronic device 109 may, at block 411, detect/identify the firmware/software version in the electronic device 109. Such information may be provided to a server in the update network 105 such as, for example, a server within the distribution network 107. Next, at a decision block 413, a server in the distribution network 107 may determine whether the firmware/software currently employed by the electronic device 109 is an older/out-of-date version. If it is determined that the firmware/software in the electronic device 109 is not old/out-of-date, but is rather an updated or newer version, then the processing of FIG. 4 may terminate, at the end block 421. If, however, it is determined (at the decision block 413) that the firmware/software currently employed by the electronic device 109 is an older/out-of-date version to be updated to a newer/updated version then, at a next block 415, the distribution network 107 may retrieve appropriate update package(s) for updating the firmware/software in the electronic device 109 to a newer/updated version. The retrieved update package(s) may be stored in the flash memory card 123 that may, for example, comprise removable media.

Next, at block 417, the update agent 127 in the flash memory card 123 may employ the update package(s) to create the newer/updated version of firmware/software for the electronic device 109. The update agent 127 may also set/reset appropriate flags to indicate when the update is completed. For example, the update agent 127 may set address values of where the updated firmware/software is resident, how big the newer/updated firmware/software is, what security values (e.g., CRCs, digital signatures, etc.) must be verified, and other values/parameters.

Later, at block 419, the update agent 125 in the electronic device 109 may update the firmware/software of the electronic device 109 by retrieving and copying the newer/updated version of firmware/software from the flash memory card 123 into the NV memory 135. In one representative embodiment of the present invention, the retrieved firmware may be employed to create a newer/updated version of the update agent 125, that may then be stored in the NV memory 135. Finally, processing terminates in the end block 421.

In a representative embodiment of the present invention, an electronic device such as, for example, the electronic device 109 may be capable of updating an update agent by employing update packages provided by a flash memory card/MMC card such as the flash memory card 123. A representative embodiment of the present invention may be capable of first updating an update agent such as the update agent 125, and then updating firmware/software in the electronic device, employing the newer/updated update agent.

Although the present application is described with reference to a flash memory card, it must be understood that other types of flash memory card technologies such as, for example, Sony Memory Stick/Memory Stick Pro, MMC, Secure Digital (SD), SmartMedia (SMC), CompactFlash, type device may also be employed without departing from the spirit and scope of the present invention.

Aspects of the present invention may be found in a method of updating an electronic device comprising at least one of firmware and software, where the electronic device may be capable of operatively coupling to a removable memory card. Such a method may comprise retrieving update information, authenticating update information in the removal memory card, and creating an updated version of the at least one of: firmware and software in the removable memory card using update agent code in the removable memory card based upon the update information. The method may also comprise copying the updated version of the at least one of: firmware and software to the non-volatile memory of the electronic device. Creating an updated version may comprise executing the update agent code on a controller in the removable memory card, thereby consuming the update information to upgrade at least a portion of the at least one of: firmware and software in the non-volatile memory of the electronic device. Executing the update agent code may comprise initializing parameters of the update agent code, referencing at least a portion of the at least one of: firmware and software, in a bank-by-bank fashion according to a bank order, and accessing at least a portion of the update information. The executing may also comprise sequentially updating in a bank-by-bank fashion according to the bank order, the at least a portion of the at least one of: firmware and software, and storing, in the removable memory card in a bank-by-bank fashion according to the bank order, the sequentially updated at least a portion of the firmware and software.

In a representative embodiment of the present invention. retrieving may comprise receiving update information from a server, and transferring the update information to the removable memory card. The update information may be resident in the removable memory card before the removable memory card is operatively coupled to the electronic device. The removable memory card may comprise a controller capable of executing the update agent code in the removable memory card. In addition, the removable memory card may comprise the update agent code and the update information. The update agent code may be executable by the controller to cause updating of the at least one of: firmware and software, using the update information. The controller may perform initialization as part of an initial bootstrap following operative coupling of the removable memory card to the electronic device and prior to the retrieving. The controller may establish access for the update agent code to the at least one of: firmware and software of the electronic device.

In a representative embodiment in accordance with the present invention, the copying may comprise determining that the update agent code has successfully completed creating the updated version of the at least one of: firmware and software, and soliciting user approval for updating the at least one of: firmware and software. The copying may also comprise transferring, upon obtaining user approval, the updated version of the at least one of: firmware and software from the removable memory card to the non-volatile memory of the electronic device. In various representative embodiments of the present invention, the removable memory card may comprise one of: a Multi-Media Card (MMC), a Compact Flash (CF) card, a Secure Digital (SD) card, a memory stick, an integrated circuit card, and a smart card. The electronic device may comprise one of: a mobile handset, a cellular telephone, a pager, and a personal digital assistant (PDA), and the update information may comprise a set of executable instructions for converting a first version of code to an updated version of code.

Other aspects of the present invention may be seen in a method of updating an electronic device comprising non-volatile memory containing at least one of: firmware and software, using first update agent code resident in the non-volatile memory. Such a method may comprise determining whether the first update agent code is a current version, and replacing the first update agent code with an updated version of the first update agent code from a removable memory card operatively coupled to the electronic device. The method may also comprise updating at least one of firmware and software in the electronic device using the updated version of the first update agent code, and first update information associated with the at least one of firmware and the software. In a representative embodiment of the present invention, replacing may comprise creating, in the removable memory card, the updated version of first update agent code, using second update information associated with the first update agent code and a second update agent resident in the removable memory card. Updating may comprise detecting whether an update of the at least one of: firmware and software is to be performed, and processing the first update information to update the at least one of firmware and software. The first update information may be stored in the non-volatile memory of the electronic device to be used in place of an older version of update information available in the removable memory card. In some representative embodiments of the present invention, the electronic device, instead of replacing the first update agent code with an updated version of the first update agent code from the removable memory card, may update the first update agent code using update information provided by the removable flash memory card, prior to other updating activity.

A representative embodiment of the present invention may also comprise deleting the updated version of the first update agent code from the removable memory card after updating the at least one of: firmware and software. The replacing may comprise verifying authenticity of the updated version of the first update agent code provided in the removable flash memory card, copying the updated version of the first update agent code in the non-volatile memory to an appropriate location for the updated version of the first update agent code in the non-volatile memory, and validating the success of copying of the updated version. The electronic device may comprise one of a mobile handset, a cellular telephone, a pager, and a personal digital assistant (PDA), and update information may comprise a set of executable instructions for converting a first version of code to an updated version of code. The removable memory card may comprise one of: a Multi-Media Card (MMC), a Compact Flash (CF) card, a Secure Digital (SD) card, a memory stick, an integrated circuit card, and a smart card.

Yet other aspects of the present invention may be found in an electronic device comprising non-volatile memory containing firmware, and a removable memory card having stored therein update agent code and update information. The update agent code may be executable to cause the updating of the firmware in the non-volatile memory to produce an updated firmware using the update information. The removable memory card may comprise a controller capable of executing the update agent code in the flash memory card, and the controller may be capable of updating at least a portion of the firmware of the electronic device employing the update agent code. The electronic device may comprise one of: a mobile handset, a cellular telephone, a pager, and a personal digital assistant (PDA), and update information may comprise a set of executable instructions for converting a first version of code to an updated version of code. The removable memory card may comprise one of: a Multi-Media Card (MMC), a Compact Flash (CF) card, a Secure Digital (SD) card, a memory stick, an integrated circuit card, and a smart card.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of updating an electronic device comprising non-volatile memory containing at least one of: firmware and software, using first update agent code resident in the non-volatile memory, the method comprising: determining whether the first update agent code is a current version; replacing the first update agent code with an updated version of the first update agent code from a removable memory card operatively coupled to the electronic device; and updating at least one: firmware and software in the electronic device using the updated version of the first update agent code, and first update information associated with the at least one of: firmware and the software, wherein the replacing comprises: creating the updated version of the first update agent code in the removable memory card, using second update information associated with the first update agent code and a second update agent resident in the removable memory card.

2. The method according to claim 1, wherein updating comprises:
detecting whether an update of the at least one of: firmware and software is to be performed; and
processing the first update information to update the at least one of: firmware and software.

3. The method according to claim 1, wherein the first update information is stored in the non-volatile memory of the electronic device to be used in place of an older version of update information available in the removable memory card.

4. The method according to claim 3, wherein the electronic device, instead of replacing the first update agent code with an updated version of the first update agent code from the removable memory card, updates the first update agent code using update information provided by the removable flash memory card, prior to other updating activity.

5. The method according to claim 1, further comprising:
deleting the updated version of the first update agent code from the removable memory card after updating the at least one of: firmware and software.

6. The method according to claim 1 wherein replacing comprises:
verifying authenticity of the updated version of the first update agent code provided in the removable flash memory card;
copying the updated version of the first update agent code in the non-volatile memory to an appropriate location for the updated version of the first update agent code in the non-volatile memory; and
validating the success of copying of the updated version.

7. The method according to claim 1 wherein the electronic device comprises one of: a mobile handset, a cellular telephone, a pager, and a personal digital assistant (PDA).

8. The method according to claim 1 wherein update information comprises a set of executable instructions for converting a first version of code to an updated version of code.

9. The method according to claim 1 wherein the removable memory card comprises one of a Multi-Media Card (MMC), a Compact Flash (CT) card, a Secure Digital (SD) card, a memory stick, an integrated circuit card, and a smart card.

10. The method according to claim 1, wherein the replacing comprises storing the first update information in the non-volatile memory to be used in place of an older version of update information.

11. An electronic device comprising non-volatile memory containing at least one of: firmware and software, the electronic device updating by: determining whether first update agent code resident in the non-volatile memory is a current version; replacing the first update agent code with an updated version of the first update agent code from a removable memory card operatively coupled to the electronic device; and updating at least one: firmware and software in the electronic device using the updated version of the first update agent code, and first update information associated with the at least one of: firmware and the software, wherein the replacing comprises: creating the updated version of the first update agent code in the removable memory card, using second update information associated with the first update agent code and a second update agent resident in the removable memory card.

12. The electronic device according to claim 11, wherein updating comprises:
   detecting whether an update of the at least one of: firmware and software is to be performed; and
   processing the first update information to update the at least one of: firmware and software.

13. The electronic device according to claim 11, wherein the first update information is stored in the non-volatile memory of the electronic device to be used in place of an older version of update information available in the removable memory card.

14. The electronic device according to claim 13, wherein the electronic device, instead of replacing the first update agent code with an updated version of the first update agent code from the removable memory card, updates the first update agent code using update information provided by the removable flash memory card, prior to other updating activity.

15. The electronic device according to claim 11, further comprising:
   deleting the updated version of the first update agent code, from the removable memory card after updating the at least one of: firmware and software.

16. The electronic device according to claim 11 wherein replacing comprises:
   verifying authenticity of the updated version of the first update agent code provided in the removable flash memory card;
   copying the updated version of the first update agent code in the non-volatile memory to an appropriate location for the updated version of the first update agent code in the non-volatile memory; and
   validating the success of copying of the updated version.

17. The electronic device according to claim 11 wherein the electronic device comprises one of a mobile handset, a cellular telephone, a pager, and a personal digital assistant (PDA).

18. The electronic device according to claim 11 wherein update information comprises a set of executable instructions for converting a first version of code to an updated version of code.

19. The electronic device according to claim 11 wherein the removable memory card comprises one of: a Multi-Media Card (MMC), a Compact Flash (CF) card, a Secure Digital (SD) card, a memory stick, an integrated circuit card, and a smart card.

20. The electronic device according to claim 11, wherein the replacing comprises storing the first update information in the non-volatile memory to be used in place of an older version of update information.

* * * * *

UNITED STATES PATENT AND TRADEMARK OFFICE
CERTIFICATE OF CORRECTION

PATENT NO. : 8,578,361 B2  Page 1 of 1
APPLICATION NO. : 13/035987
DATED : November 5, 2013
INVENTOR(S) : Chris Cassapakis et al.

It is certified that error appears in the above-identified patent and that said Letters Patent is hereby corrected as shown below:

In the Specification

In column 1, line 4, after "APPLICATIONS" insert -- AND PRIORITY CLAIM --.

In the Claims

In column 14, line 48, in Claim 9, delete "of" and insert -- of: --, therefor.

In column 14, line 49, in Claim 9, delete "(CT)" and insert -- (CF) --, therefor.

In column 15, line 23, in Claim 15, delete "code," and insert -- code --, therefor.

In column 16, line 10, in Claim 17, delete "of" and insert -- of: --, therefor.

Signed and Sealed this
Fourth Day of February, 2014

Michelle K. Lee
*Deputy Director of the United States Patent and Trademark Office*